US009649701B2

(12) United States Patent
Horiike et al.

(10) Patent No.: US 9,649,701 B2
(45) Date of Patent: May 16, 2017

(54) CUTTING INSERT AND INDEXABLE INSERT-TYPE CUTTING TOOL

(71) Applicant: MITSUBISHI MATERIALS CORPORATION, Tokyo (JP)

(72) Inventors: Nobukazu Horiike, Joso (JP); Yuji Takagi, Joso (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 231 days.

(21) Appl. No.: 14/348,198

(22) PCT Filed: Sep. 27, 2012

(86) PCT No.: PCT/JP2012/074844
§ 371 (c)(1),
(2) Date: Mar. 28, 2014

(87) PCT Pub. No.: WO2013/051449
PCT Pub. Date: Apr. 11, 2013

(65) Prior Publication Data
US 2014/0234037 A1    Aug. 21, 2014

(30) Foreign Application Priority Data

Oct. 4, 2011    (JP) .................................. 2011-220253
Jul. 17, 2012    (JP) .................................. 2012-158963

(51) Int. Cl.
*B23B 5/02*    (2006.01)
*B23C 5/20*    (2006.01)
(Continued)

(52) U.S. Cl.
CPC ............ *B23C 5/207* (2013.01); *B23B 27/145* (2013.01); *B23B 27/1611* (2013.01);
(Continued)

(58) Field of Classification Search
CPC .......... B23B 2200/0423; B23B 27/145; B23B 27/1611; B23C 2200/0416;
(Continued)

(56) References Cited

U.S. PATENT DOCUMENTS 4,074,949 A    2/1978    Hochmuth et al.
5,145,295 A    9/1992    Satran
(Continued)

FOREIGN PATENT DOCUMENTS

CN    1284415 A    2/2001
CN    1445038 A    10/2003
(Continued)

OTHER PUBLICATIONS

JP 2011-62814 Machine Translation, pp. 9-21, Jan. 7, 2016.*
(Continued)

*Primary Examiner* — Daniel Howell
*Assistant Examiner* — Nicole N Ramos
(74) *Attorney, Agent, or Firm* — Locke Lord LLP

(57) ABSTRACT

A cutting insert and an indexable insert-type cutting tool includes a cutting edge (6A) formed on each of a pair of side ridge portions of at least one of the side faces, wherein an insert main body (1) is formed in the shape of having front-back inversion symmetry which is 180° rotationally symmetrical with respect to a line of symmetry (N) passing through the center of the side faces; a flank face adjacent to the cutting edge (6A) is formed on the side face in the vicinity of each of the pair of polygonal faces (2); each of the flank faces is formed in the shape of a twisted face; the pair of side ridge portions on which the cutting edge (6A) is formed intersect each other in such a manner that the second corner portion (B) of one side ridge portion protrudes outside the other side ridge portion.

20 Claims, 29 Drawing Sheets

(51) Int. Cl.
  *B23C 5/10* (2006.01)
  *B23B 27/16* (2006.01)
  *B23C 5/22* (2006.01)
  *B23B 27/14* (2006.01)

(52) U.S. Cl.
  CPC .............. *B23C 5/109* (2013.01); *B23C 5/202* (2013.01); *B23C 5/205* (2013.01); *B23C 5/22* (2013.01); *B23B 2200/0423* (2013.01); *B23C 2200/0416* (2013.01); *B23C 2200/0494* (2013.01); *B23C 2200/085* (2013.01); *B23C 2200/125* (2013.01); *B23C 2200/128* (2013.01); *B23C 2210/045* (2013.01); *B23C 2210/0457* (2013.01); *B23C 2210/168* (2013.01); *B23C 2210/50* (2013.01); *Y10T 407/1924* (2015.01); *Y10T 407/1934* (2015.01); *Y10T 407/23* (2015.01); *Y10T 407/235* (2015.01); *Y10T 407/24* (2015.01)

(58) Field of Classification Search
  CPC ...... B23C 2200/0494; B23C 2200/085; B23C 2200/125; B23C 2200/128; B23C 2210/045; B23C 2210/0457; B23C 2210/168; B23C 2210/50; B23C 5/109; B23C 5/202; B23C 5/205; B23C 5/207; B23C 5/22; Y10T 407/1924; Y10T 407/1934; Y10T 407/235; Y10T 407/24; Y10T 407/1936; Y10T 407/2274; Y10T 407/23; Y10T 407/245
  USPC .............................. 407/42, 48, 47, 113, 116
  See application file for complete search history.

(56) References Cited

U.S. PATENT DOCUMENTS

| | | | | |
|---|---|---|---|---|
| 5,466,097 | A * | 11/1995 | Wallstrom | B23C 5/207 407/113 |
| 5,586,845 | A * | 12/1996 | Arai | B23C 5/2221 407/113 |
| 6,196,770 | B1 * | 3/2001 | Astrom | B23C 5/109 407/114 |
| 6,872,034 | B2 | 3/2005 | Satran et al. | |
| 6,921,233 | B2 | 7/2005 | Duerr et al. | |
| 6,979,154 | B2 | 12/2005 | Mina | |
| 7,040,844 | B1 | 5/2006 | Daiguji | |
| 7,063,489 | B2 | 6/2006 | Satran | |
| 7,073,987 | B2 | 7/2006 | Hecht | |
| 7,452,167 | B2 | 11/2008 | Nishio et al. | |
| 7,905,687 | B2 | 3/2011 | Dufour et al. | |
| 2003/0152430 | A1 * | 8/2003 | Mina | B23C 5/109 407/113 |
| 2004/0208713 | A1 * | 10/2004 | Duerr | B23C 5/2221 407/34 |
| 2008/0187403 | A1 | 8/2008 | Ertl et al. | |
| 2008/0304924 | A1 * | 12/2008 | Engstrom | B23C 5/202 407/114 |
| 2010/0003090 | A1 * | 1/2010 | Johansson | B23C 5/202 407/113 |
| 2010/0129166 | A1 * | 5/2010 | Hartlohner | B23B 27/1618 407/102 |
| 2010/0202839 | A1 | 8/2010 | Fang et al. | |
| 2010/0247252 | A1 * | 9/2010 | Hatta | B23C 5/109 407/42 |
| 2011/0129309 | A1 | 6/2011 | Kovac et al. | |
| 2011/0170963 | A1 | 7/2011 | Smilovici et al. | |
| 2012/0057943 | A1 | 3/2012 | Zastrozynski et al. | |
| 2012/0121345 | A1 | 5/2012 | Neiman et al. | |

FOREIGN PATENT DOCUMENTS

| | | | |
|---|---|---|---|
| CN | 101998890 | A | 3/2011 |
| EP | 0956921 | A2 | 11/1999 |
| EP | 1344595 | A2 | 9/2003 |
| EP | 2014398 | A1 | 1/2009 |
| EP | 2143515 | A1 | 1/2010 |
| EP | 2604369 | A1 | 6/2013 |
| JP | 62-084904 | A | 4/1987 |
| JP | 08-071834 | A | 3/1996 |
| JP | 2000-084708 | A | 3/2000 |
| JP | 2004-284010 | A | 10/2004 |
| JP | 2004-314301 | A | 11/2004 |
| JP | 2006-508810 | A | 3/2006 |
| JP | 2006062048 | A * | 3/2006 |
| JP | 2006088284 | A * | 4/2006 |
| JP | 2006-305649 | A | 11/2006 |
| JP | 2007-253299 | A | 10/2007 |
| JP | 2008-229744 | A | 10/2008 |
| JP | 2008-229745 | A | 10/2008 |
| JP | 2008254128 | A * | 10/2008 |
| JP | 2009-541074 | A | 11/2009 |
| JP | 2011062814 | A * | 3/2011 |
| JP | 2012-525984 | A | 10/2012 |
| JP | 2013-517143 | A | 5/2013 |
| WO | WO-2004/050283 | A1 | 6/2004 |
| WO | WO-2007/149242 | A2 | 12/2007 |
| WO | WO-2010/127743 | A1 | 11/2010 |
| WO | WO-2011/046121 | A1 | 4/2011 |
| WO | WO-2011/121780 | A1 | 10/2011 |
| WO | WO 2011122676 | A1 * | 10/2011 |
| WO | WO-2012/020784 | A1 | 2/2012 |
| WO | WO-2012/046556 | A1 | 4/2012 |

OTHER PUBLICATIONS

Machine Translation JP 200688284, pp. 4-9, Jul. 25, 2016.*
International Search Report dated Dec. 11, 2012, issued for PCT/JP2012/074844.
Office Action dated Apr. 8, 2015, issued for the Chinese patent application No. 201280048194.1 and English translation thereof.
International Search Report mailed Apr. 15, 2015, issued for the European patent application No. 12838740.4.
Notice of Allowance mailed Apr. 19, 2016, issued for the Japanese patent application No. 2011220252 and English translation thereof.
Final Office Action mailed May 17, 2016, issued for U.S. Appl. No. 14/230,459.
Office Action mailed on Jan. 5, 2016 issued for corresponding Japanese Patent Application No. 2012-158963.
Office Action dated on Jan. 21, 2016 issued for related U.S. Appl. No. 14/230,459.
Notice of Reasons for Rejection mailed Jun. 23, 2015, issued for the Japanese patent application No. 2011-220252 and English translation thereof.

* cited by examiner

CUTTING INSERT AND INDEXABLE INSERT-TYPE CUTTING TOOL

FIELD OF THE INVENTION

The present invention relates to a cutting insert which is attached in a detachable manner to an indexable insert-type cutting tool used for a tool rotating cutting work and also to an indexable insert-type cutting tool to which the cutting insert is attached.

Priority is claimed on Japanese Patent Application No. 2011-220253 filed in Japan on Oct. 4, 2011 and Japanese Patent Application No. 2012-158963 filed in Japan on Jul. 17, 2012, the content of which is incorporated herein by reference.

DESCRIPTION OF THE RELATED ART

As a cutting insert which is attached to a indexable insert-type cutting tool for a tool rotating cutting work and a indexable insert-type cutting tool to which the cutting insert is attached, there have been known those described, for example, in Patent Document 1 (Japanese Published Unexamined Patent Application No. 2004-284010). The cutting insert described in Patent Document 1 is provided with a rectangular plate-like insert main body, and a cutting edge is formed at a side ridge portion on a pair of rectangular faces of the insert main body. On a first rectangular face of the pair of rectangular faces, there is formed a groove extending in a direction along one of the diagonal lines of the first rectangular face (a first diagonal line) and an inclined face descending toward the groove from two corners positioned on the other diagonal line (a second diagonal line).

Further, on a second rectangular face, there are formed a groove extending in a direction along the second diagonal line of the first rectangular face when seen in a perspective manner from a side of the first rectangular face and an inclined face descending toward the groove from two corners aligned in the direction along the first diagonal line. That is, the insert main body is formed so as to be orthogonal to a central line connecting the center of the first rectangular face with that of the second rectangular face and also, formed in a twisted shape with being centered around two axis lines, each of which is orthogonal to four side faces of the insert main body, and also formed in the shape of having front-back inversion symmetry with respect to these axis lines.

The cutting insert is attached in a detachable manner to an insert seat formed on a tool main body of an indexable insert-type cutting tool. A base of the insert seat faces in a tool rotating direction, and the base is configured to be a supporting face complementary to the first rectangular face, and the first rectangular face is supported by the base. Further, on two flat wall faces which face to a tip side and an outer circumference side of the tool main body of the insert seat, two side faces of the insert main body which intersect with the groove on the first rectangular face and which are flat or curved in the shape of a convex curved surface are supported.

On the other hand, as a cutting insert which is configured so that an insert main body is formed in a twisted shape as described above, there has been known a cutting insert disclosed in, for example, Patent Document 2 (Japanese Published Unexamined Patent Application No. S62-84904). The cutting insert disclosed in Patent Document 2 is a cutting insert in which a flank face is formed between an upper face used as a rake face and a lower face used as a placing face, and a major cutting edge is formed at an intersecting portion of the upper face with the flank face. The cutting insert is such that the upper face is formed in the shape of a twisted face in which an angle formed between a reference plane parallel to the lower face and the upper face at the major cutting edge increases gradually from the tip of the cutting edge of the major cutting edge to the rear end of the cutting edge and the flank face is formed in the shape of a twisted face in which an angle formed between the reference plane and the flank face at the major cutting edge decreases gradually from the tip of the cutting edge of the major cutting edge to the rear end of the cutting edge, by which a flank angle with respect to the cutting edge increases gradually in a positive angle side.

According to the cutting insert disclosed in Patent Document 2, the upper face, which is used as a rake face, and the flank face are formed in the shape of a twisted face as described above. Thus, when the cutting insert is attached to a indexable insert-type cutting tool such as an end mill so as to give a positive axial rake angle to the major cutting edge, it is possible to suppress a change in rake angle and flank angle of the major cutting edge in a diameter direction from the tip of the cutting edge to the rear end thereof and to provide an appropriate rake angle and a sufficient flank amount over an entire length of the major cutting edge. Further, in the cutting insert disclosed in Patent Document 2, since the major cutting edge can be made substantially constant in wedge angle, it is possible to maintain the strength of the edge over the entire length of the major cutting edge.

However, when the configuration of the rake face and the flank face, each of which is formed in the shape of a twisted face in the cutting insert of Patent Document 2 having the above-described effects, is applied as it is to the cutting insert formed in the shape of having front-back inversion symmetry that is disclosed in Patent Document 1, a problem that needs to be solved arises with respect to the flank face in particular.

That is, in the cutting insert disclosed in Patent Document 1, both where the side face, which is used as a flank face adjacent to the cutting edge, is flat as described above and where the side face is curved like a convex curved surface, a pair of cutting edges formed at a pair of side ridge portions to which the side faces oppose are overlap with each other on a straight line when the rectangular face is viewed from the front thereof. Further, in the cutting insert disclosed in Patent Document 1 in which the insert main body is formed in the shape of having front-back inversion symmetry, the cutting edges formed at the pair of side ridge portions to which the side faces oppose are arranged at corner portions located alternately where the tip of the cutting edge and the rear end of the cutting edge are placed on a diagonal line of the side face, that is, arranged at corner portions located alternately in a circumferential direction of the pair of rectangular faces.

However, on the other hand, where the flank face is formed in the shape of a twisted face as described in the cutting insert of Patent Document 2, an angle formed between the reference plane and the flank face decreases gradually from the tip of the cutting edge to the rear end of the cutting edge. Thereby, the amount of protrusion of the flank face gradually decreases toward the outside of the insert main body at the center of the side face spaced away from the cutting edge. Therefore, if such flank faces extend to the center of the side face from the pair of cutting edges at which the tip of the cutting insert and the rear end thereof are arranged so as to overlap on a straight line at the alternate corner portions of the side face when the rectangular face is viewed from the front thereof, as described in the cutting insert of Patent Document 1, the position at which these flank faces intersect each other will deviate at the center of the side face.

As a result, where the above-disclosed cutting insert of Patent Document 2 is applied to the cutting insert disclosed in Patent Document 1, a step is developed between the flank faces on the side face of the insert main body, thus resulting in a failure of smoothly forming the side face. Alternatively, there is a fear that an angle formed between the reference plane and the flank face will not decrease gradually and continuously from the tip of the cutting edge to the rear end thereof at the cutting edge, by which the above-described effects will not be obtained. Further, where the side face is attached to the cutting insert by being supported by a wall face of the insert seat as described in the cutting insert of Patent Document 1, if the side face is not smoothly formed as described above, attachment of the cutting insert may become unstable.

PRIOR ART LITERATURE

Patent Documents

[Patent Document 1] Japanese Published Unexamined Patent Application No. 2004-284010
[Patent Document 2] Japanese Published Unexamined Patent Application No. S62-84904

SUMMARY OF THE INVENTION

Problems to be Solved by the Invention

The present invention has been made in view of the above-described background, an object of which is to provide a cutting insert which is provided with an insert main body formed in the shape of having front-back inversion symmetry with respect to a symmetrical line passing through the center of at least one side face, and the cutting insert which is capable of smoothly forming a side face by preventing an occurrence of a step or the like, between flank faces even if formation of the flank faces which is in the shape of a twisted face at which a flank angle with respect to the cutting edge thereof gradually increases toward a positive angle side along the cutting edge, when there are formed on the side face the flank faces of the pair of cutting edges formed at a pair of side ridge portions to which the side face opposes, and which is also capable of achieving stable attachment even when the side face is supported by a wall face of an insert seat, thereby securing a sufficient flank amount over an entire length of the cutting edge. Another object of the present invention is to provide an indexable insert-type cutting tool to which the cutting insert is attached.

Means for Solving the Problems

An aspect of the cutting insert of the present invention is a cutting insert which is attached in a detachable manner to an insert seat of an indexable insert-type cutting tool and has any one of the following configurations.
(1) A cutting insert which is attached in a detachable manner to an insert seat of an indexable insert-type cutting tool, the cutting insert being provided with a polygonal plate-like insert main body having a pair of polygonal faces and a plurality of side faces arranged on the periphery of the pair of polygonal faces, in which of the pair of polygonal faces, one polygonal face is used as a rake face and the other polygonal face is used as a seating face seated on a base of the insert seat; a cutting edge is formed on each of a pair of side ridge portions of at least one of the side faces, the pair of side ridge portions being a portion intersecting the side face and the pair of polygonal faces; the insert main body is formed in the shape of having front-back inversion symmetry which is 180° rotationally symmetrical with respect to a line of symmetry passing through the center of at least one of the side faces; on at least one of the side faces, a flank face adjacent to the cutting edge is formed on the side face in the vicinity of each of the pair of polygonal faces, when the pair of polygonal faces are used as rake faces; each of the flank faces is formed in the shape of a twisted face in which a flank angle with respect to the cutting edge gradually increases in a positive angle side while each of the flank faces becoming close to the other of the corner portions (a second corner portion) from one of the corner portions (a first corner portion), the first corner portion and the second corner portion being alternately located in a circumferential direction of the pair of polygonal faces in at least one of the side faces; and the pair of side ridge portions of the side face on which the cutting edge is formed intersect each other in such a manner that the second corner portion of one side ridge portion protrudes outside the other side ridge portion, when the polygonal face is viewed from the front thereof.

That is, an aspect of the cutting insert of the present invention is a cutting insert used in a indexable insert-type cutting tool, and the cutting insert is provided with a polygonal plate-like insert main body which has a first polygonal face, a second polygonal face which faces a direction different from that of the first polygonal face, and a plurality of side faces arranged on the periphery of the first and the second polygonal faces, a first major cutting edge which is formed at a first side ridge portion at which at least one first side face of the plurality of side faces intersects with the first polygonal face, and the first polygonal face is used as a rake face, a first flank face which is formed on the first side face behind the first side ridge portion, a second major cutting edge which is formed at a second side ridge portion at which the first side face intersects with the second polygonal face, and the second polygonal face is used as a rake face, and a second flank face which is formed on the first side face behind the second side ridge portion, in which the insert main body is formed in the shape of having front-back inversion symmetry which is 180° rotationally symmetrical with respect to a line of symmetry passing through the center of the first side face, the first flank face is formed in the shape of a twisted face at which a flank angle with respect to the first major cutting edge gradually increases in a positive angle side while the first flank face becoming close to a second corner portion of the first polygonal face from a first corner portion thereof on the first side face, the second flank face is formed in the shape of a twisted face at which a flank angle with respect to the second major cutting edge gradually increases to the positive angle side while the second flank face becoming close to a second corner portion of the second polygonal face from a first corner portion thereof on the first side face, the first side ridge portion intersects with the second side ridge portion in such a manner that the second corner portion of the first polygonal face protrudes outside the second major cutting edge when the first polygonal face is viewed from the front thereof, and the second side ridge portion intersects with the first side ridge portion in such a manner that the second corner portion of the second polygonal face protrudes outside the first major cutting edge when the second polygonal face is viewed from the front thereof.

(2) The cutting insert according to (1), wherein each of the polygonal faces of the insert main body is formed in a quadrilateral shape; the insert main body is provided with a pair of long side faces which are arranged so as to face each other and a pair of short side faces which are arranged so as to face each other; a major cutting edge is formed at each of the pair of side ridge portions of the pair of long side faces, each of the pair of side ridge portions being a portion intersecting the pair of long side faces and the pair of polygonal faces; and each flank face adjacent to the major cutting edges is formed in the shape of a twisted face and the pair of side ridge portions on which the major cutting edge is formed intersect each other when the polygonal face is viewed from the front thereof.

(3) The cutting insert according to (2), in which the major cutting edge gradually inclines downward toward the second corner portion of the polygonal face from the first corner portion thereof with respect to a direction of an insert central line passing through the centers of the pair of polygonal faces, and inclines toward the other polygonal face on the opposite side of the polygonal face on which the major cutting edge is formed, when the long side face is viewed from the front thereof.

(4) The cutting insert according to (2) or (3), in which the polygonal face of the insert main body is formed in the shape of a parallelogram which has a pair of obtuse angle corner portions and a pair of acute angle corner portions; in which a corner edge continuing to the major cutting edge is formed at each of the acute angle corner portions on each of the polygonal faces; a minor cutting edge continuing to the corner edge is formed at each of the acute angle corner portions of a side ridge portion of each of the polygonal faces, the side ridge portion being a portion intersecting each of the polygonal faces and each of the short side faces; the flank face is formed in the shape of a twisted face in which a flank angle with respect to the major cutting edge gradually increases in a positive angle side while the flank face becoming close to the obtuse angle corner portion from the acute angle corner portion; and the pair of side ridge portions on which the major cutting edge is formed intersect each other in such a manner that the obtuse angle corner portion of one side ridge portion protrudes outside the other side ridge portion when the pair of polygonal faces is viewed from the front thereof.

(5) The cutting insert according to (4), in which the major cutting edge gradually inclines downward toward the obtuse angle corner portion of the polygonal face formed in the shape of a parallelogram from the acute angle corner portion thereof with respect to a direction of the insert central line passing through the centers of the pair of polygonal faces, and inclines so as to move toward the other polygonal face on the opposite side of the polygonal face on which the major cutting edge is formed, when the long side face is viewed from the front thereof.

(6) The cutting insert according to (4) or (5), in which the minor cutting edge gradually inclines downward from the corner edge toward a location separating from the corner edge with respect to the direction of the insert central line passing through the centers of the pair of polygonal faces, and inclines toward the other polygonal face on the opposite side of the polygonal face on which the minor cutting edge is formed, when the short side face is viewed from the front thereof.

(7) The cutting insert according to any one of (4) to (6), in which of the side ridge portion of each of the polygonal faces, the side ridge portion being a portion intersecting each of the polygonal faces and each of the short side faces, a part continuing to the opposite side of the corner edge of the minor cutting edge is used as a ramping edge, and of the short side face, a part continuing to the ramping edge gradually inclines toward inside the insert main body while the part extending away from the ramping edge and becoming close to the other polygonal face on the opposite side of the polygonal face on which the ramping edge is formed.

(8) The cutting insert according to any one of (1) to (7), in which the insert main body is formed in the shape of 180° rotationally symmetrical with respect to the insert central line passing through the centers of the pair of polygonal faces and provided with at least the pair of side faces on which the cutting edge is formed, and of the pair of side faces, when the cutting edge of one side face is used for cutting, a contact portion which is in contact with a contacted portion formed on a wall face of the insert seat is formed on the other side face.

(9) The cutting insert according to (1), the insert main body is formed in the shape of rotationally symmetrical with respect to the insert central line passing through the centers of the pair of polygonal faces and provided with at least the two side faces on which the cutting edge is formed, and of the side faces, when the cutting edge of one of the side faces is used for cutting, a contact portion in contact with a contacted portion formed on a wall face of the insert seat is formed on at least one side face of remaining side faces.

(10) The cutting insert according to (8) or (9), a convex curved surface portion continuing to a flank face adjacent to the cutting edge is formed on the side face, and the convex curved surface portion is curved in the shape of a convex curved surface which is raised in the direction of the insert central line. The contact portion is formed on the convex curved surface portion, and a curvature radius of the convex curved surface portion is kept constant in a direction at which the cutting edge extends.

Further, an indexable insert-type cutting tool of the present invention is provided with the following configurations:

(11) The indexable insert-type cutting tool of the present invention is an indexable insert-type cutting tool which is provided with a tool main body rotating around an axis; and the cutting insert described in any one of (1) to (10) attached in a detachable manner to an outer circumference of a tip portion of the tool main body. One or more of the insert seats to each of which the cutting insert is attached are formed on the tool main body, with the base facing in a tool rotating direction; and the cutting insert is attached to the insert seat in such a manner that at least one of the side faces faces in an outer circumference direction of the tool main body, the first corner portion of a side ridge portion of the side face is arranged at the tip of the tool main body, the side ridge portion of the side face being a portion intersecting the side face and the polygonal face used as a rake face, the cutting edge formed at the side ridge portion is given a positive axial rake angle, and a side ridge portion of the side face in which the side face and the polygonal face used as a seating face intersect is arranged inside a rotational locus around the axis line of the cutting edge.

(12) The indexable insert-type cutting tool according to (11), the cutting edge gradually inclines toward the opposite side of the polygonal face in the direction of the insert central line passing through the centers of the pair of polygonal faces while the cutting edge becoming close to the second corner portion of the polygonal face from the first corner portion thereof, when at least one of the side faces is viewed from the front thereof, and the cutting insert is attached to the insert seat in such a manner that the insert central line inclines toward the rear end side of the tool main body while the insert central line becoming close to the polygonal face used as a seating face.

In the cutting insert or the indexable insert-type cutting tool which is constituted as described above, at a pair of side ridge portions having a cutting edge at least on one side face, a flank face adjacent to the cutting edge is formed in the shape of a twisted face on which a flank angle with respect to the cutting edge gradually increases in a positive angle side while the flank face adjacent to the cutting edge becoming close to the other of the corner portions (second corner portion) from one of the corner portions (first corner portion) which are alternately located in a circumferential direction of the pair of polygonal faces. Therefore, as described above, the cutting insert is attached in such a manner that the cutting edge is given a positive axial rake angle, with one of the corner portions arranged at the tip of the tool main body. Thereby, as with the cutting insert disclosed in Patent Document 2, it is possible to suppress a change in flank angle of the cutting edge and secure a sufficient flank amount over an entire length of the cutting edge. It is also possible to prevent an increase in cutting resistance due to a partial shortage of the flank amount.

The flank face is thus formed in the shape of a twisted face, as described above, by which, at the center of the side face spaced away from the cutting edge, the flank face protruding outward to the insert main body gradually decreases from one of the corner portions to the other of the corner portions. However, at the other of the corner portions, a pair of side ridge portions at which the cutting edge of the side face is formed are allowed to intersect with each other in such a manner that one of the side ridge portions protrudes outside the other of the side ridge portions. As a result, a position at which the flank face protrudes at the center of the side face can be made substantially equal between the flank faces of the pair of cutting edges.

Therefore, according to the above-constituted cutting insert, the flank faces of the pair of cutting edges are allowed to smoothly continue without any step etc., at the center of the side face, thus making it possible to secure the above-described flank amount reliably and facilitate stable cutting. Further, for example, where the cutting insert is attached by being supported, with the side face brought into contact with a wall face of the insert seat, it is possible to improve attachment stability of the cutting insert even when the cutting insert is attached.

Further, in the above-constituted cutting insert, the insert main body is formed in the shape of having front-back inversion symmetry which is 180° rotationally symmetrical with respect to a symmetrical line passing through the center of at least one of the above-described side faces. Thereby, a cutting edge is formed at a pair of side ridge portions on one side face intersecting with each of the pair of polygonal faces on the front and back faces and attached again to the insert seat by reversely rotating the insert main body. Then, the polygonal faces are given alternately as a rake face and a seating face, and thus making it possible to use the cutting edge formed at the side ridge portion at which the side face intersects with the polygonal face used as a rake face at least twice in one insert main body.

Further, every polygonal face of the insert main body is formed in a quadrilateral shape, and the insert main body is provided with a pair of long side faces which are arranged on the opposite side from each other and a pair of short side faces which are arranged on opposite sides from each other. A major cutting edge is formed at each of the pair of side ridge portions intersecting with the pair of polygonal faces of the pair of long side faces, a flank face adjacent to the major cutting edge is formed in the shape of a twisted face and the pair of side ridge portions at which the major cutting edge is formed are allowed to intersect with each other when the polygonal face is viewed from the front thereof. Thereby, it is possible to use in one insert main body a total of four major cutting edges formed at the side ridge portions intersecting with each of the pair of polygonal faces of the pair of long side faces.

The polygonal face is formed in a quadrilateral shape and the insert main body is provided with a pair of long side faces and the pair of short side faces. In this case, where the major cutting edge is inclined so as to move to the polygonal face on the opposite side of the polygonal face on which the major cutting edge is formed with gradually inclining toward the direction of the insert central line passing through the centers of the pair of polygonal faces while the major cutting edge becoming close to the other of the corner portions of the polygonal face from one of the corner portions thereof, when the long side face is viewed from the front thereof, the polygonal face is formed into a face twisted in a complicated manner due to a difference in height in the direction of the insert central line between the first corner portion and the second corner portions. However, even in the case that the cutting insert is composed of a twisted polygonal face in a complicated manner, the flank face adjacent to the major cutting edge is formed in the shape of a twisted face, and the pair of side ridge portions at which the major cutting edge is formed are allowed to intersect with each other when the polygonal face is viewed from the front thereof, thus making it possible to attain the above-described functions.

In particular, when the polygonal face of the insert main body is formed in a quadrilateral shape, the quadrilateral-shaped polygonal face is formed in the shape of a parallelogram having a pair of obtuse angle corner portions and a pair of acute angle corner portions. Moreover, a corner edge continuing to the major cutting edge is formed at each of the acute angle corner portions on each of the polygonal faces, a minor cutting edge continuing to the corner edge is formed at the acute angle corner portion of the side ridge portion intersecting with each of the short side faces on each of the polygonal faces, and the flank face is formed in the shape of a twisted face in which a flank angle with respect to the major cutting edge gradually increases in a positive angle side, when moving from the acute angle corner portion to the obtuse angle corner portion. The pair of side ridge portions at which the major cutting edge is formed are allowed to intersect each other in such a manner that the obtuse angle corner portion of one of the side ridge portions protrudes outside the other of the side ridge portions, when the pair of polygonal faces is viewed from the front thereof. Thereby, when the minor cutting edge of one of the parallelogram faces used as a rake face which is arranged at the tip of the tool main body and used for cutting is placed on a flat face perpendicular to an axis line of the tool main body, a side ridge portion of the short side face continuing to the opposite side of the corner edge of the minor cutting edge is arranged so as to incline downward toward the rear end side while the side ridge portion of the short side face becomes close to an inner circumference side of the tool main body with respect to the flat face.

Therefore, the side ridge portion continuing to the minor cutting edge and used for cutting can be reliably prevented from interfering with a finished face formed by a minor cutting edge. It is, thus, possible to improve the accuracy of the finished face.

When the polygonal face of the insert main body is formed in the shape of a parallelogram, the major cutting edge gradually inclines downward toward the obtuse angle corner portion of the polygonal face in the shape of a parallelogram from the acute angle corner portion thereof with respect to the direction of the insert central line passing through the centers of the pair of polygonal faces and inclines toward the other polygonal face side on the opposite side of the polygonal face on which the major cutting edge is formed, when the long side face is viewed from the front thereof. Thereby, when the major cutting edge is used for cutting, with the acute angle corner portion arranged at the tip of the tool main body, the insert main body can be attached to the major cutting edge by inclining toward the insert central line so as to move toward the rear end side of the tool main body in a direction of the parallelogram face used as a seating face, while a positive axial rake angle is secured for the major cutting edge.

Therefore, when the minor cutting edge to be used for cutting is placed on a flat face perpendicular to the axis line of the tool main body in a similar manner, as described above, the pair of parallelogram faces are constituted so that the pair of side ridge portions at which the major cutting edge is formed intersect each other when the parallelogram face is viewed from the front thereof. Even in this case, the minor cutting edge formed at an acute angle corner portion on the parallelogram face used as a seating face which is arranged at the tip side of the tool main body can be placed at the rear end side of the tool main body with respect to the flat face. Thereby, it is possible to prevent interference of the minor cutting edge with a finishing face. It is also possible to prevent interference of the minor cutting edge on the side of the seating face, when the tool main body is fed in the axis line direction thereof as well to carry out ramping performing an oblique drilling of a workpiece.

Further, when the polygonal face of the insert main body is also formed in the shape of a parallelogram, the minor cutting edge gradually inclines downward from the corner edge toward a location separating away from the corner edge with respect to the direction of the insert central line passing through the centers of the pair of polygonal faces and also inclined toward the other polygonal face on the opposite side of the polygonal face on which the minor cutting edge is formed, when the short side face is viewed from the front thereof. It is, thereby, possible to increase a radial rake angle of the minor cutting edge in a positive angle side and also prevent an increase in cutting resistance.

On the other hand, in carrying out the above-described ramping, of the side ridge portion intersecting with each of the short side faces on each of the polygonal faces, a part continuing to the opposite side of the corner edge of the minor cutting edge is to be used for cutting as a ramping edge. Therefore, of the above-described short side face, a part continuing to the ramping edge gradually inclines downward toward inside the insert main body while the part extending away from the ramping edge and inclines toward the other polygonal face on the opposite side of the polygonal face on which the ramping edge is formed. Thereby, when the cutting insert is attached to the insert seat, a short side face part continuing to the ramping edge is allowed to escape largely with respect to a rotational locus of the ramping edge around the axis line of the tool main body. It is, therefore, possible to prevent the short side face part from interfering with a workpiece on ramping and also carry out ramping more smoothly.

Further, the insert main body is formed in the shape of 180° rotationally symmetrical with respect to an insert central line passing through the centers of the pair of polygonal faces and provided with at least the pair of side faces on which the cutting edge is formed. Also, each of the pair of side faces is such that when the cutting edge of one of the side faces is used for cutting, a contact portion in contact with a contacted portion formed on a wall face of the insert seat is formed on the other of the side faces. In this case, as described above, it is possible to form a contact portion without, for example, a step, such that the flank face continues smoothly on the other of the side faces. Therefore, the contact portion is allowed to be reliably in contact with the contacted portion on the wall face of the insert seat, thus making it possible to attach the insert main body more stably.

The cutting insert of the present invention is applicable to the polygonal face is formed not only in the shape of a parallelogram, as described above, but also in the shape of a square or a regular triangle in which the insert main body is formed in the shape of rotationally symmetrical with respect to an insert central line passing through the centers of the pair of polygonal faces and there are provided at least two side faces at which the cutting edge is formed.

Moreover, on each of these side faces, when the cutting edge of one of the side faces is used for cutting, a contact portion in contact with a contacted portion formed on a wall face of the insert seat is formed at least on one of the remaining side faces. Thereby, the cutting insert can be stably attached to the cutting edge used for cutting by allowing at least one of the contact portions of the remaining side faces to be in contact with the contacted portion, with the above-described functions attained.

Further, when the contact portion is formed on the side face of the insert main body as described above, a convex curved surface portion continuing to the flank face adjacent to the cutting edge is formed on the side face, the convex curved surface portion is curved in the shape of a convex curved surface so as to be raised in a direction of the insert central line, thereby forming the contact portion on the convex curved surface portion, and a curvature radius of the convex curved surface portion is kept constant in a direction at which the cutting edge extends. Thereby, the contacted portion of the insert seat, which is formed in the shape of a flat face, is able to attach the cutting insert reliably by allowing the contact portion to be in contact stably, and the contacted portion can be formed easily. Still further, even where the contact portion is formed so as to incline slightly toward a curvature of the convex curved surface portion due to manufacturing errors and so on of the cutting insert, the contact portion is allowed to be reliably in contact with the contacted portion.

Effects of the Invention

As described so far, according to the cutting insert and the indexable insert-type cutting tool of the present invention, while smoothly continuing formation of the side face on which the flank face is formed, a sufficient flank amount can be secured reliably over an entire length of the cutting edge in attachment of the cutting insert to the indexable insert-type cutting tool. It is also possible to prevent an increase in cutting resistance and so on, and to attach the cutting insert stably.

DETAILED DESCRIPTION OF THE INVENTION

Figure 1:
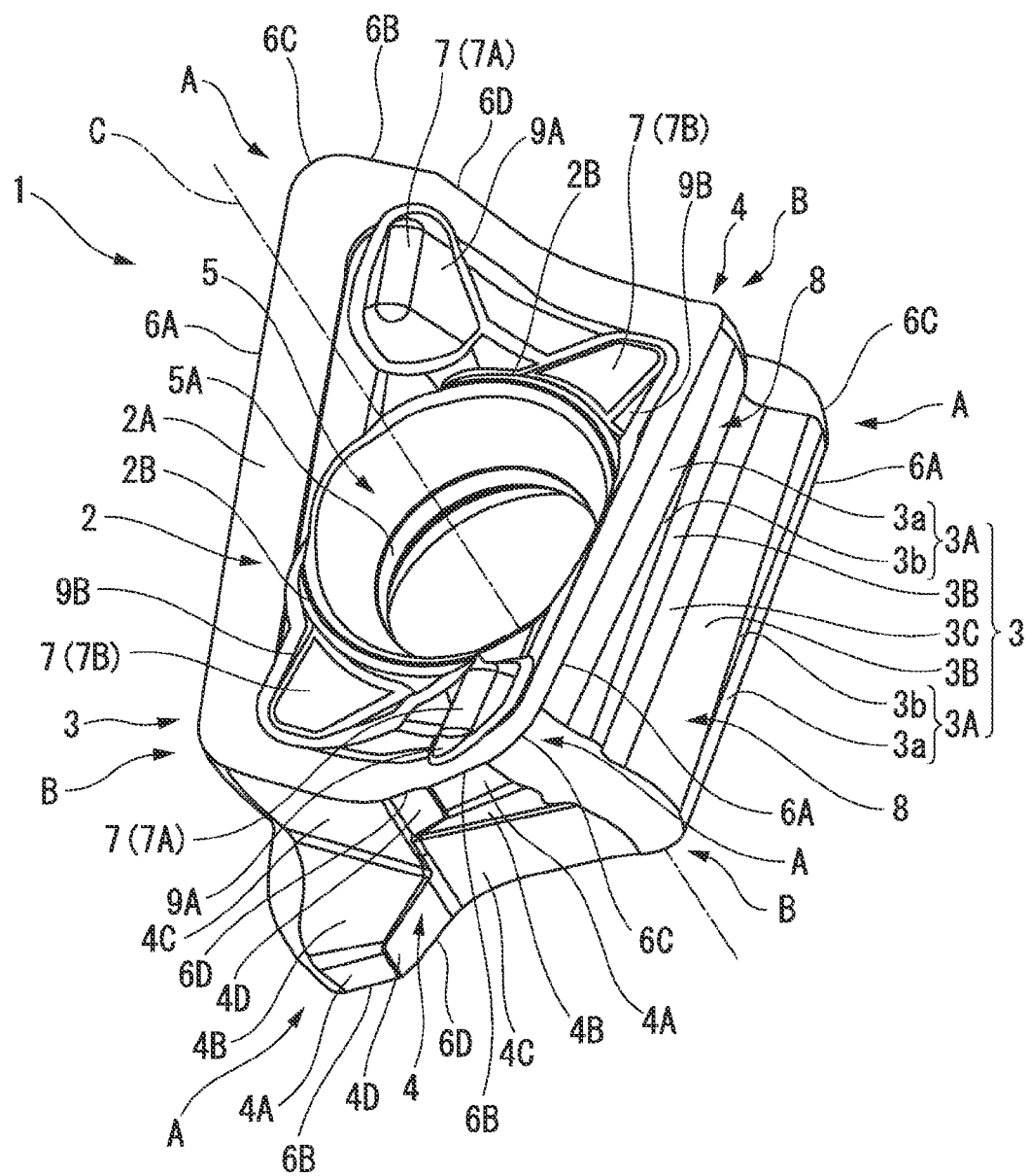
FIG. 1 is a perspective view which shows a cutting insert of a first embodiment of the present invention.

FIG. 1 to FIG. 4 show an appearance of the cutting insert of a first embodiment in the present invention, and FIG. 5 to FIG. 8 show an appearance of one embodiment of the indexable insert-type cutting tool in the present invention to which the cutting insert of a first embodiment is attached. Further, FIG. 9 to FIG. 12 show an appearance of the tool main body in which the cutting insert is detached from the indexable insert-type cutting tool of one embodiment.

The cutting insert of the present embodiment is provided with an insert main body 1. The insert main body 1 is formed in the shape of a polygonal plate, is, more specifically, formed like a plate in which a polygonal face is in a quadrilateral shape, and even more specifically, like a plate in which the polygonal face is formed substantially in the shape of a parallelogram with the use of a hard material selected from any one of cemented carbide, cermet, surface-coated cemented carbide and surface-coated cermet. The insert main body 1 is provided with a pair of parallelogram faces 2 on which a pair of acute angle corner portions A and a pair of obtuse angle corner portions B are alternately arranged in a circumferential direction as well as a pair of long side faces 3 and a pair of short side faces 4 which connect between the side ridge portions thereof.

When one of the parallelogram faces (first polygonal face) 2 is used as a rake face, the other of the parallelogram faces (second polygonal face) 2 is used as a seating face which is seated on a base of an insert seat to be described later. When the other of the parallelogram faces 2 is used as a rake face, one of the parallelogram faces 2 is used as a seating face. The insert main body 1 of this example is provided with a parallelogram-like polygonal face. It is, however, acceptable that the polygonal face is formed in a rectangular shape. In this case, it is acceptable that both ends of one of the diagonal lines are used as obtuse angle corner portions of the parallelogram face 2, while both ends of the other of the diagonal lines are regarded as acute angle corner portions.

Figure 14:
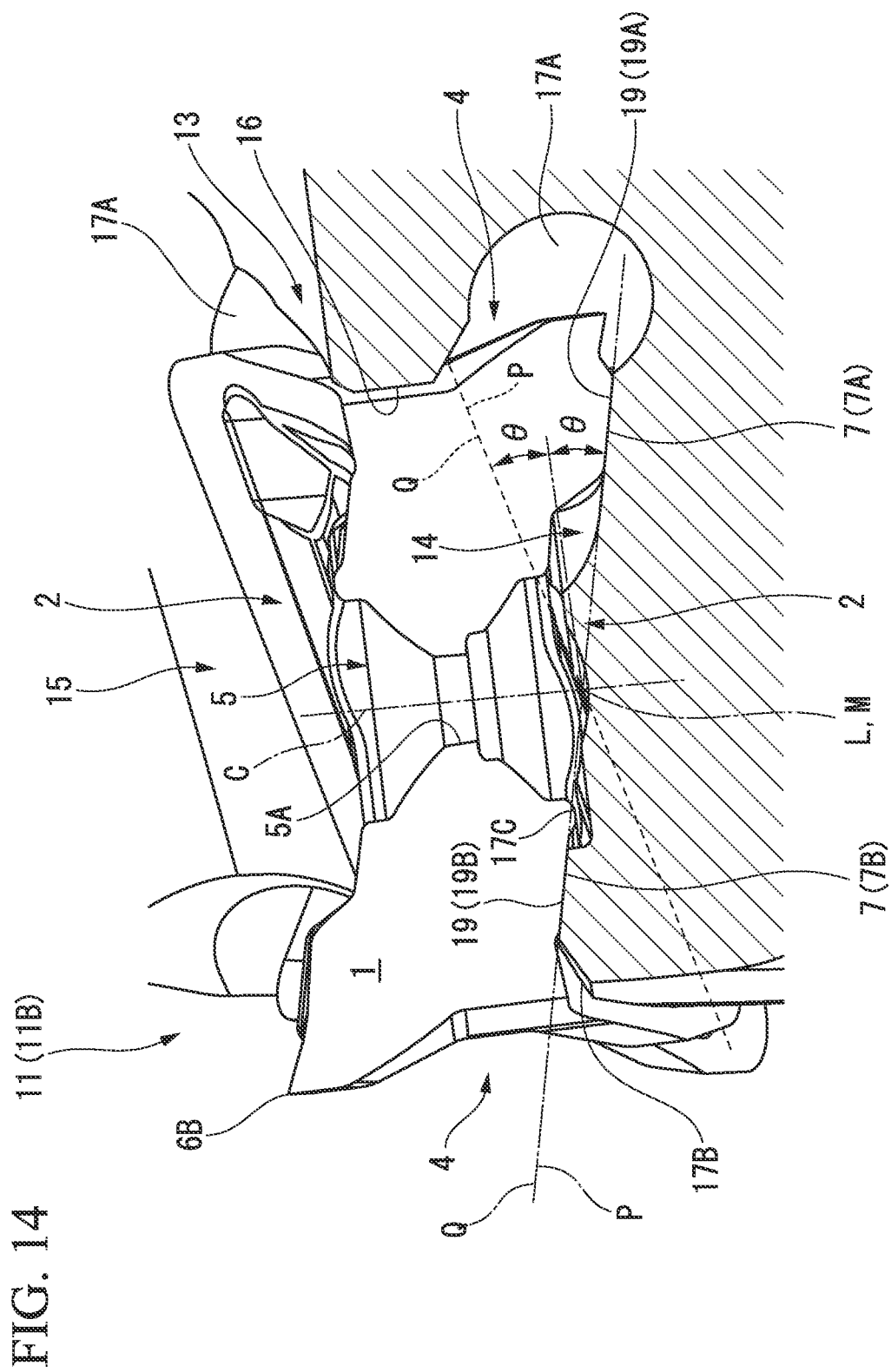
FIG. 14 is an enlarged sectional view of a part taken along an A-A line in FIG. 13 (a sectional view orthogonal to an imaginary straight line of the cutting insert and an imaginary straight line of the insert seat of a parallelogram face which is used as a seating face).
Figure 15:
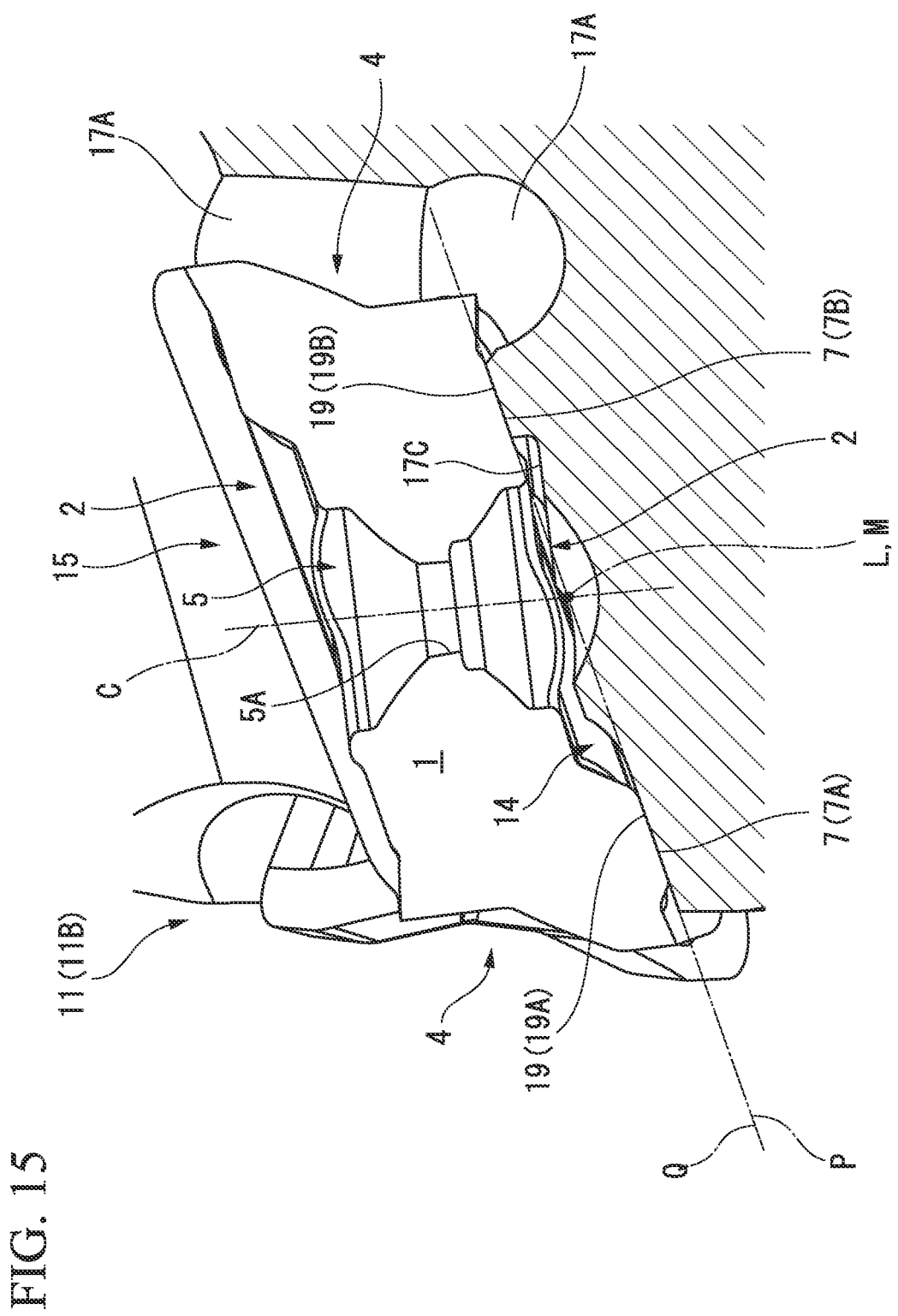
FIG. 15 is a partially enlarged sectional view of a part taken along a B-B line in FIG. 13 (a sectional view orthogonal to an imaginary straight line of the cutting insert and an imaginary straight line of the insert seat of a parallelogram face used as a seating face).

An attachment hole 5 is formed on the insert main body 1. The attachment hole 5 is formed to be a circular cross section at the center of an insert central line C which connects the centers of the pair of parallelogram faces 2 and penetrates through the insert main body 1 in a direction of the insert central line C (in a thickness direction of the insert main body 1). As shown in FIG. 14 and FIG. 15, there is formed at the center of the attachment hole 5 an annular diameter-reducing portion 5A which is reduced in diameter by one step and constant in width and protrusion amount. The diameter-reducing portion 5A is formed in the shape of a cylindrical face at the center of the insert central line C which is narrow at the center in a direction of the insert central line C. Moreover, on both sides of the cylindrical face, there is formed a part whose cross section along the insert central line C is in the shape of a convex curve.

Figure 2:
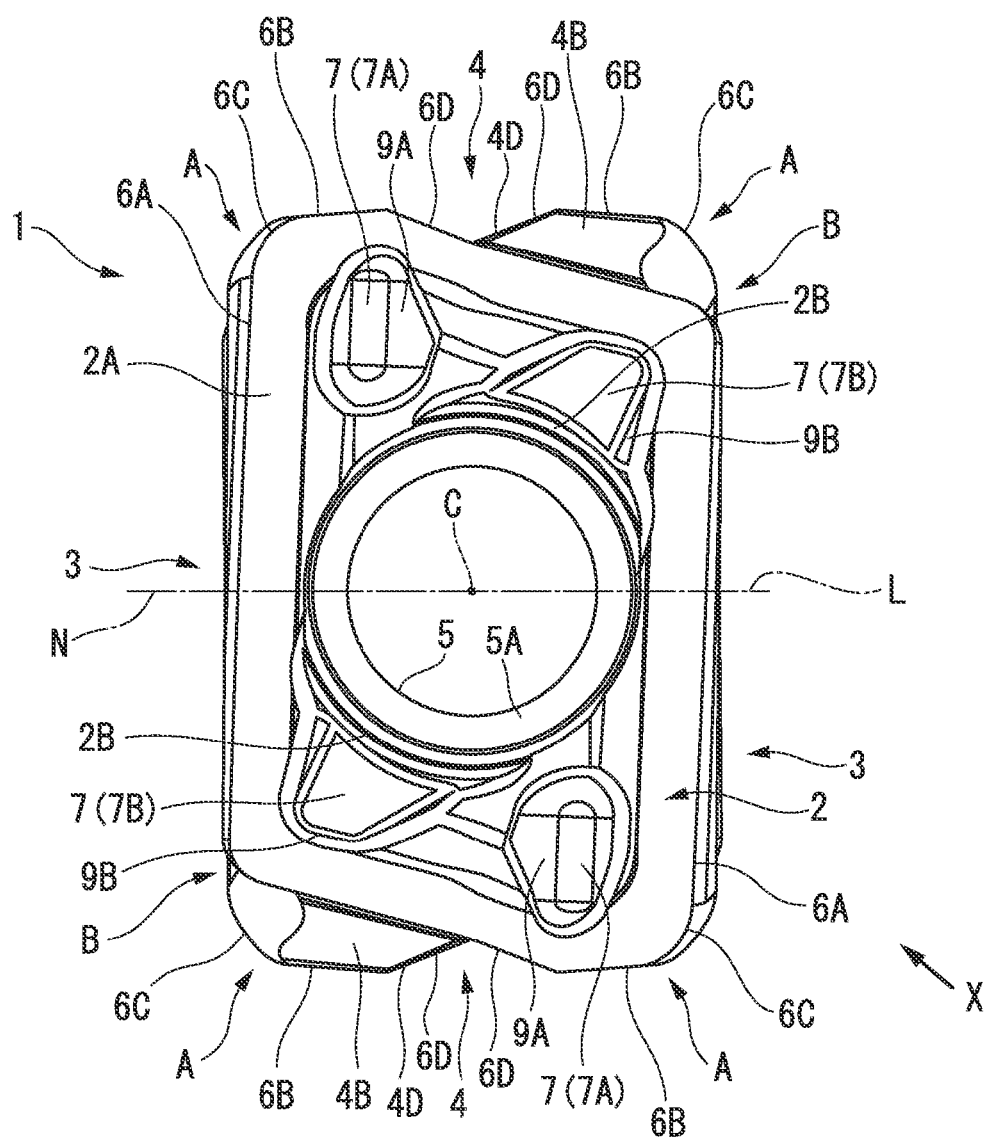
FIG. 2 is a plan view of the embodiment shown in FIG. 1.

The insert main body 1 is formed in the shape of 180° rotationally symmetrical with respect to a line of symmetry (not shown) orthogonal to the insert central line C at the center of the insert main body 1 in the direction of the insert central line C and extending substantially in parallel with a long side face 3 and also with respect to a symmetrical line N orthogonal to the symmetrical line and the insert central line C and passing through the center of the long side face 3. That is, the insert main body 1 is formed in the shape of having front-back inversion symmetry. The insert main body 1 is formed in the shape of 180° rotationally symmetrical with respect to the insert central line C as well. Therefore, as shown in FIG. 2, when one of the parallelogram faces 2 is viewed from the front thereof, an obtuse angle corner portion B of the other of the parallelogram faces 2 is placed at a position of an acute angle corner portion A of one of the parallelogram faces 2. Further, an acute angle corner portion A of the other of the parallelogram faces 2 is placed at a position of an obtuse angle corner portion B of one of the parallelogram faces 2.

A major cutting edge (first major cutting edge) 6A as a cutting edge of the present embodiment is formed at one of the long side ridge portions (first side ridge portion) on one of the parallelogram faces 2. In addition, a major cutting edge (second major cutting edge) 6A as a cutting edge of the present embodiment is formed at one of the long side ridge portions (second side ridge portion) on the other of the parallelogram faces 2. A major cutting edge (first major cutting edge) 6A as a cutting edge of the present embodiment is formed also at the other of the long side ridge portions (first side ridge portion) on the other of the parallelogram faces 2. Moreover, a major cutting edge (second major cutting edge) 6A as a cutting edge of the present embodiment is formed also at the other of the long side ridge portions (second side ridge portion) on one of the parallelogram faces 2.

When the parallelogram face 2 is viewed from the front thereof in the direction of the insert central line C, the major cutting edge 6A is formed in a substantially straight line. Further, a minor cutting edge 6B is formed at an acute angle corner portion A (first corner portion) of one of the short side ridge portions on one of the parallelogram faces 2. In addition, a minor cutting edge 6B is also formed at an acute angle corner portion A (first corner portion) of the other of the short side ridge portions on one of the parallelogram faces 2.

Still further, a minor cutting edge 6B is also formed at an acute angle corner portion A (first corner portion) of one of the short side ridge portions on the other of the parallelogram faces 2. Moreover, a minor cutting edge 6B is also formed at an acute angle corner portion A (first corner portion) of the other of the short side ridge portions on the other of the parallelogram faces 2. When the parallelogram face 2 is viewed from the front thereof in the direction of the insert central line C, the minor cutting edge 6B is formed in a straight line extending in a direction slightly intersecting at an obtuse angle with respect to the major cutting edge 6A.

Further, a ridge line portion between the long side face 3 and the short side face 4 is chamfered like a circular-arc cross section over an entire length thereof. Moreover, a corner edge 6C is formed at the part chamfered like a circular-arc cross section at the acute angle corner portion A of the side ridge portion on the parallelogram face 2. The corner edge 6C is formed substantially like a quarter circular arc when the parallelogram face 2 is viewed from the front thereof in the direction of the insert central line C and continues so as to be in contact with the major cutting edge 6A and the minor cutting edge 6B. An obtuse angle corner portion B of the parallelogram face 2 is also chamfered like a circular arc.

Figure 3:
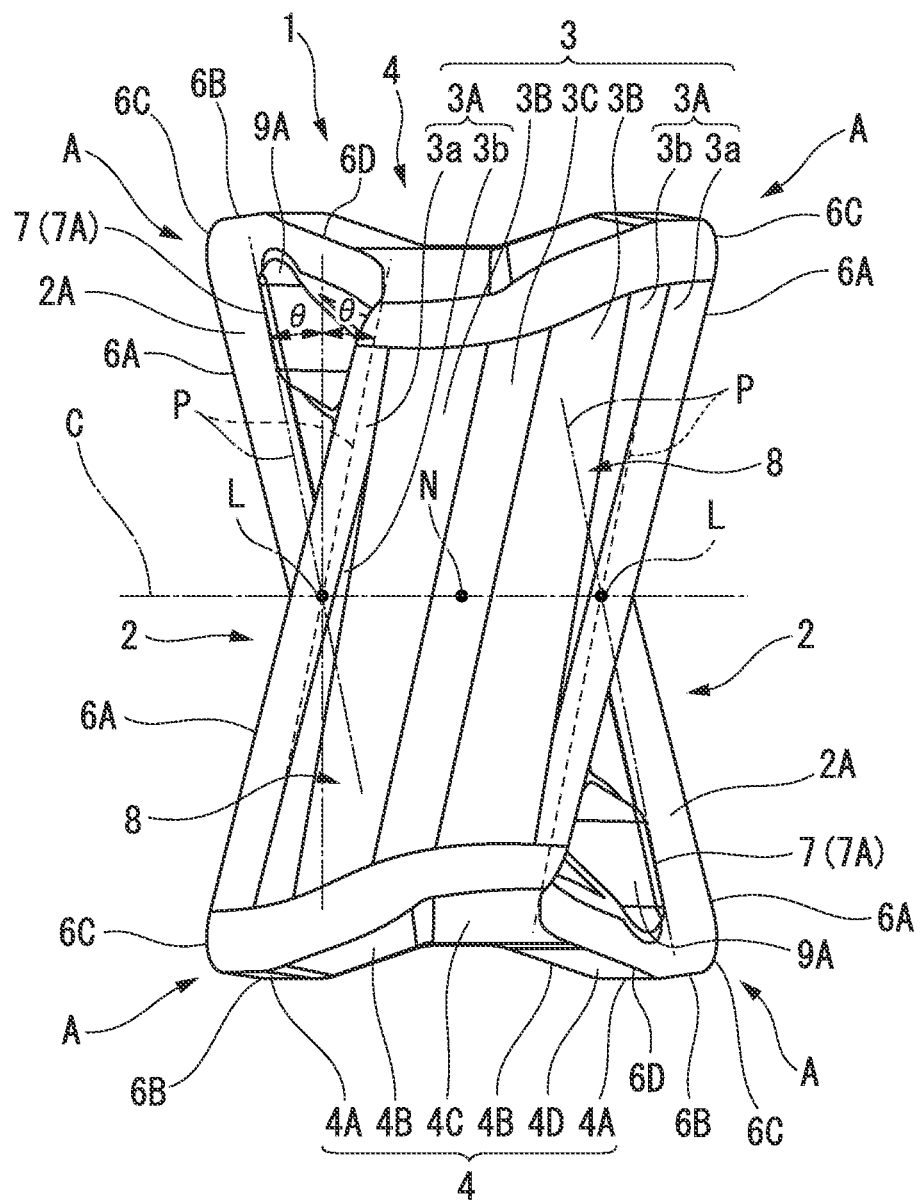
FIG. 3 is a side view of the embodiment shown in FIG. 1.

When seen in a lateral view in which the long side face 3 is viewed from the front thereof, as shown in FIG. 3, the major cutting edge 6A is inclined substantially in a straight line almost at a constant inclination angle with gradually inclining downward with extending away from the corner edge 6C (the acute angle corner portion A) toward the obtuse angle corner portion B, with respect to the direction of the insert central line C that is, when moving to the parallelogram face 2 on the opposite side of the parallelogram face 2 on which the major cutting edge 6A is formed at a side ridge portion. Therefore, as shown in FIG. 3, the long side face 3 is also formed substantially in a parallelogram shape and inclines in the direction of the insert central line C while the long side face 3 becoming close to a longitudinal direction thereof (in the vertical direction in FIG. 3). Further, when seen in a lateral view in which the long side face 3 is viewed from the front thereof, the pair of major cutting edges 6A formed on one parallelogram face 2 are disposed so as to intersect each other in an X letter shape.

Figure 4:
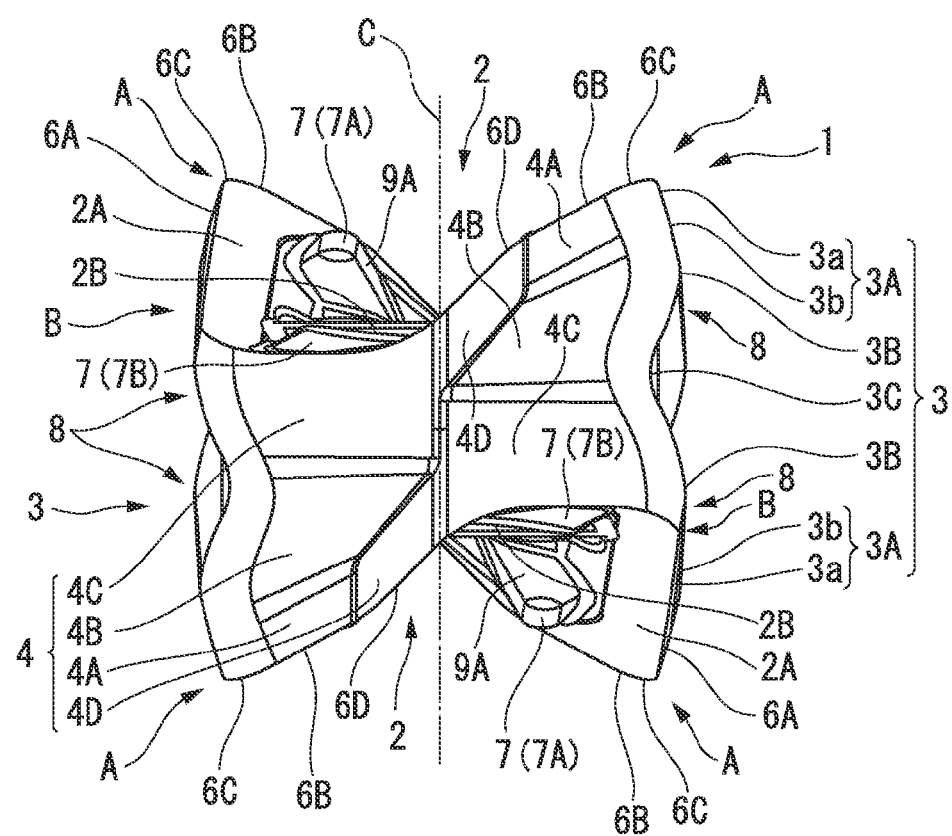
FIG. 4 is a front view of the embodiment shown in FIG. 1.
Figure 5:
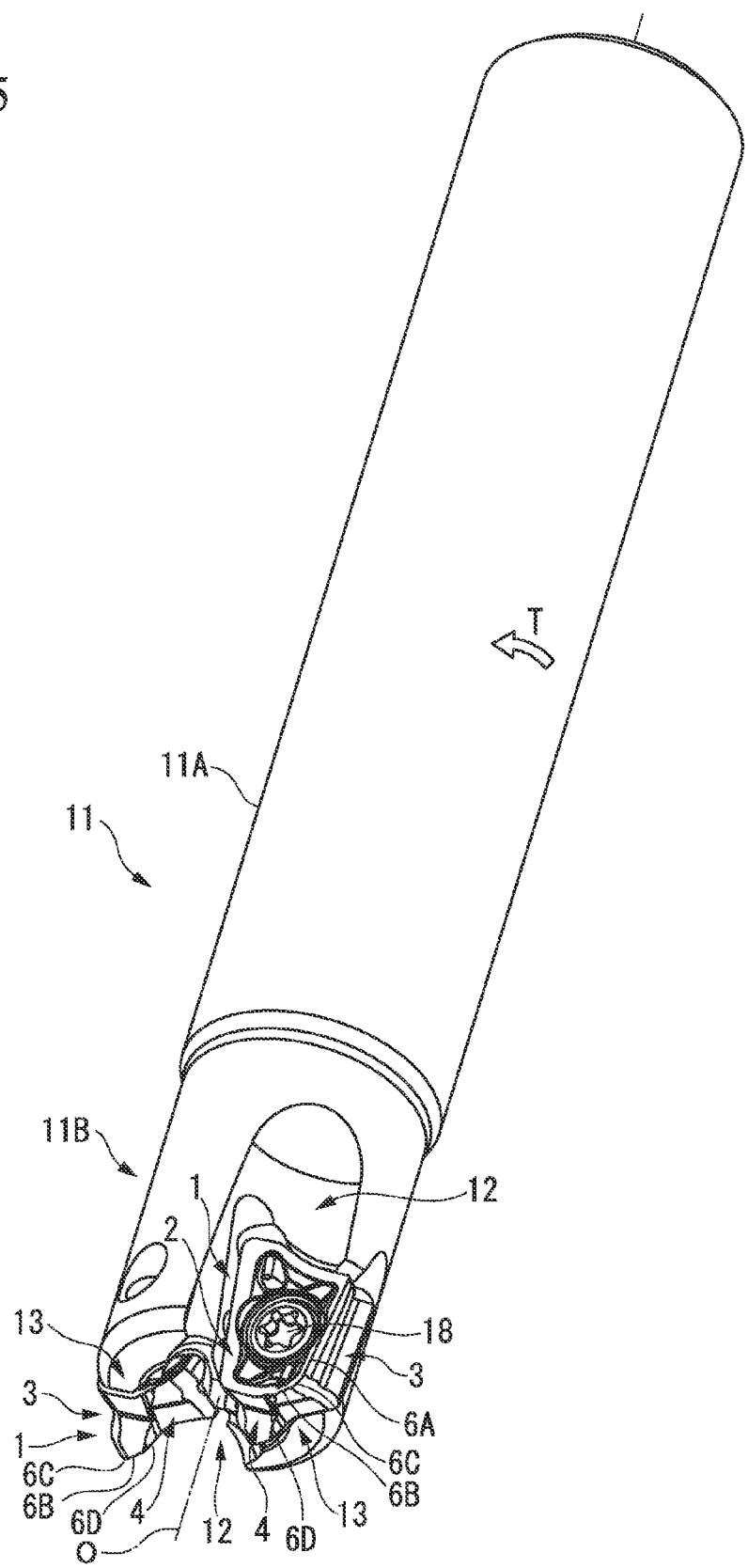
FIG. 5 is a perspective view which shows one embodiment of an indexable insert-type cutting tool of the present invention to which the cutting insert of the first embodiment is attached.
Figure 6:
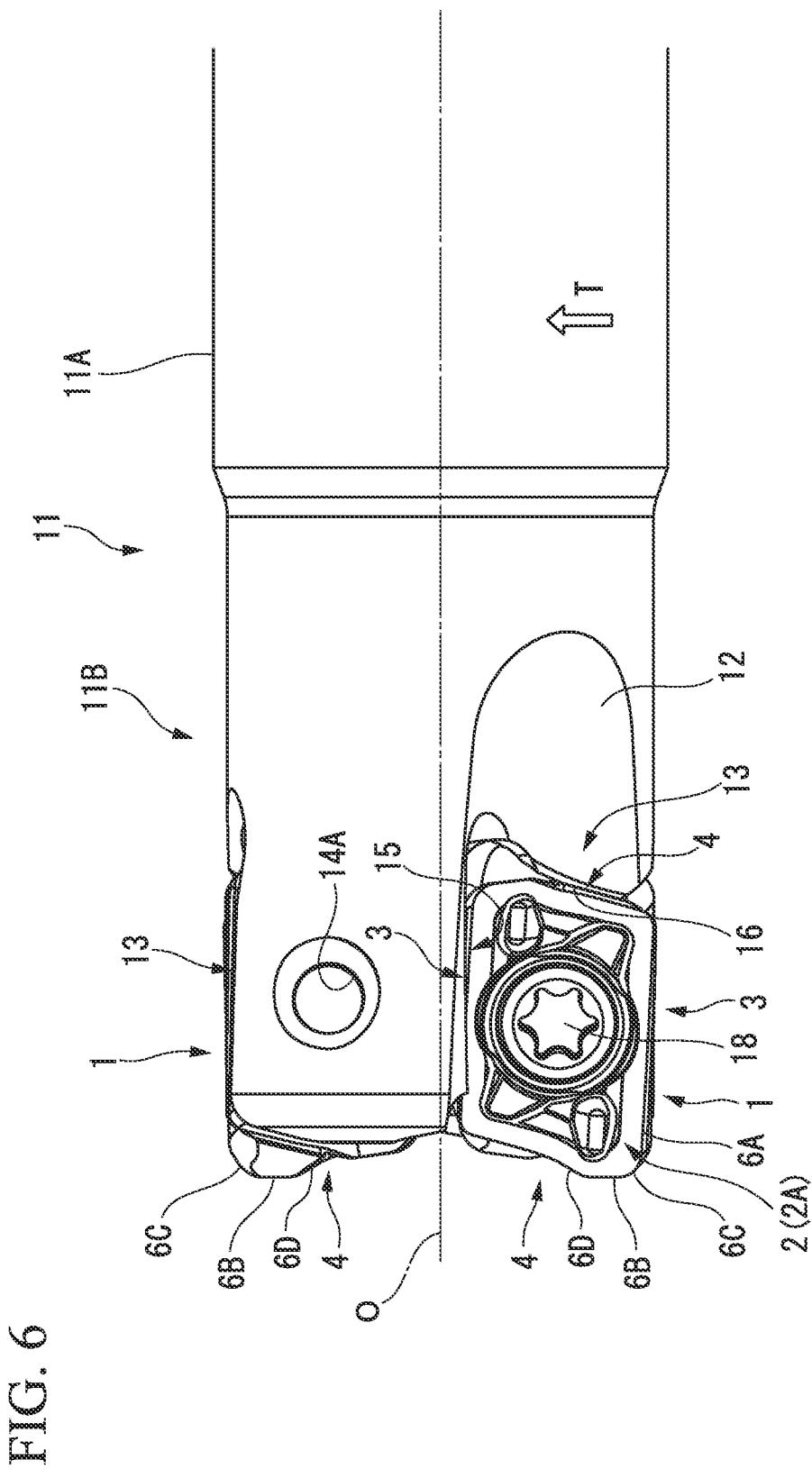
FIG. 6 is an enlarged plan view of a tip portion of the embodiment shown in FIG. 5.
Figure 7:
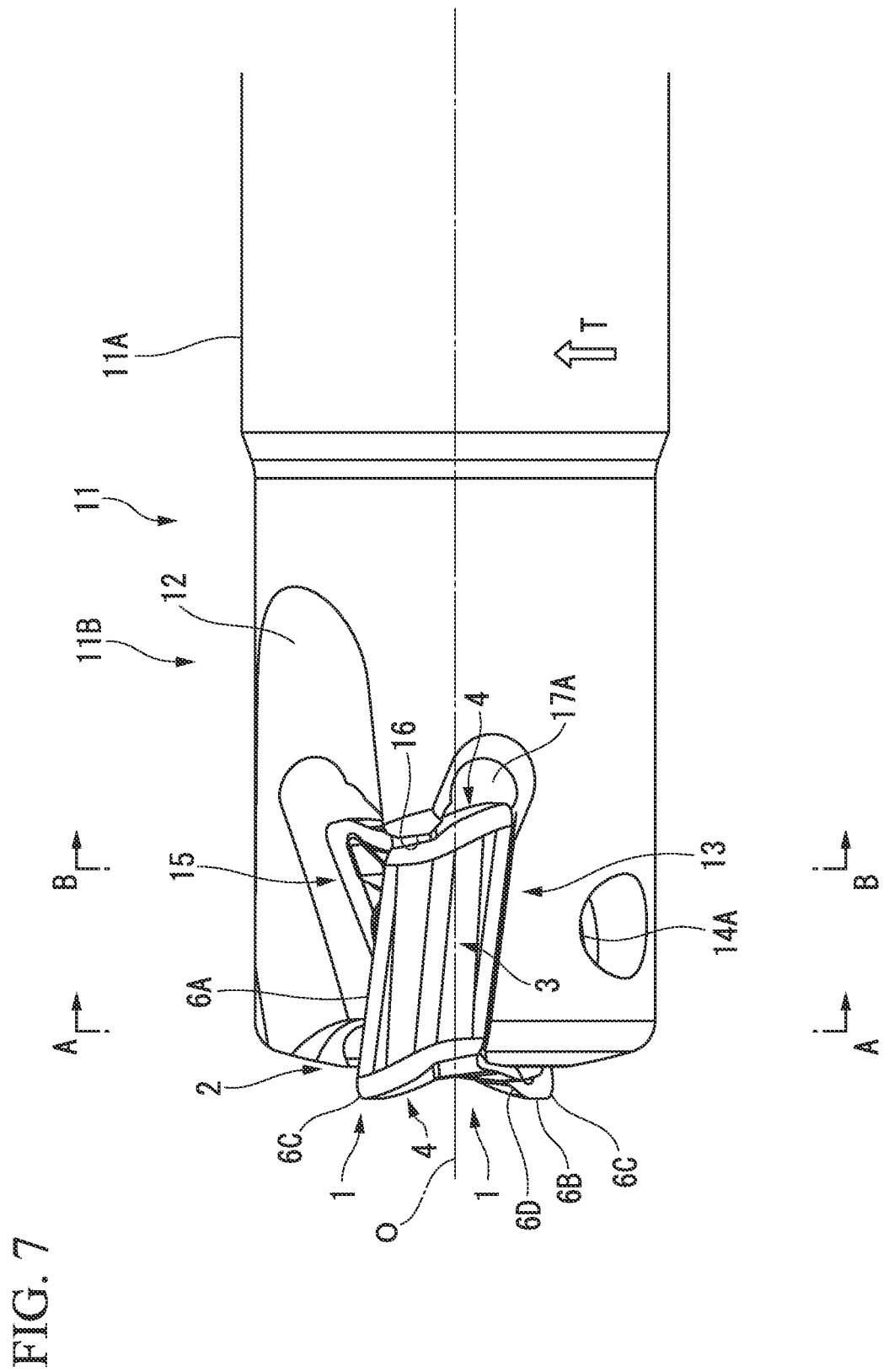
FIG. 7 is an enlarged side view of the tip portion of the embodiment shown in FIG. 5.
Figure 8:
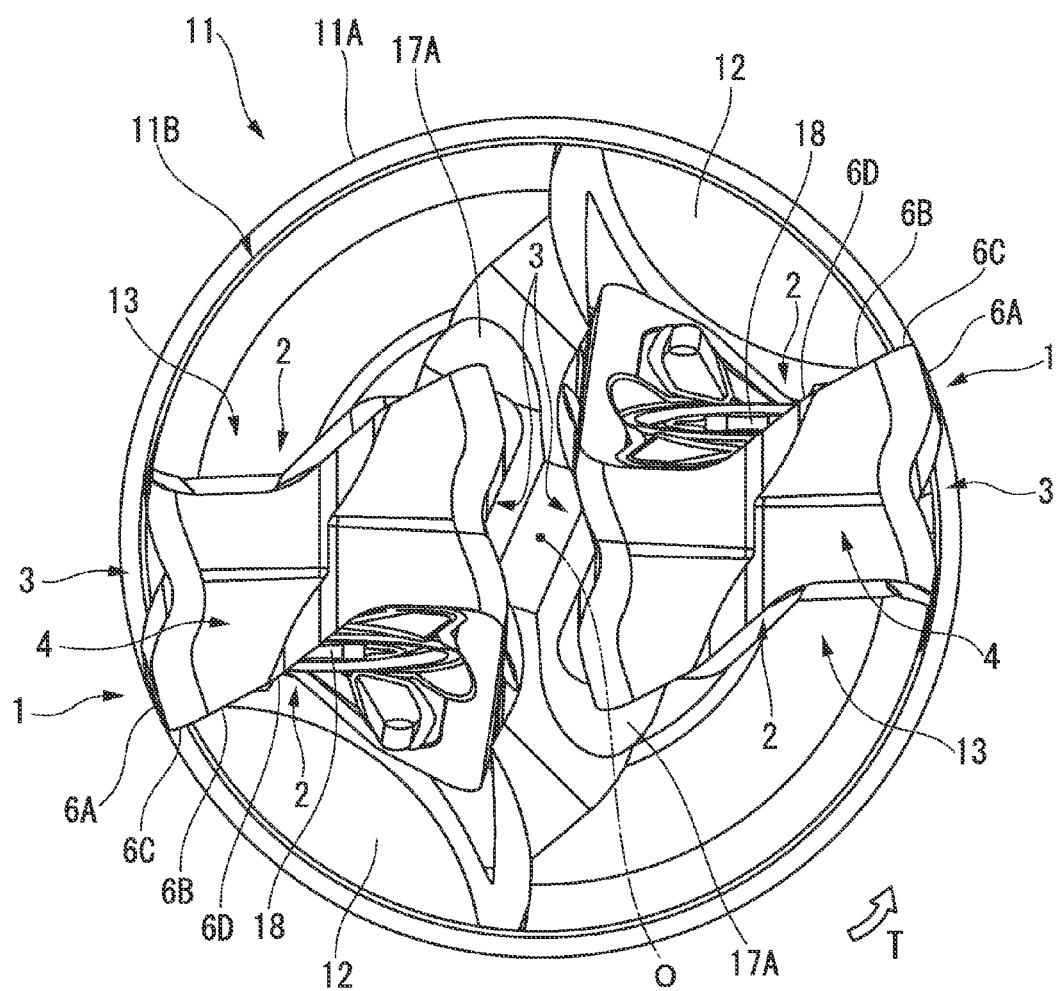
FIG. 8 is an enlarged front view of the embodiment shown in FIG. 5.

When seen in a lateral view in which the short side face 4 is viewed from the front thereof, as shown in FIG. 4, the minor cutting edge 6B is also inclined substantially in a straight line approximately at a constant inclination angle toward the other parallelogram face 2 on the opposite side of the parallelogram face 2 on which the minor cutting edge 6B is formed with gradually inclining downward from the corner edge 6C (acute angle corner portion A) toward a location separating away from the corner edge 6C with respect to the direction of the insert central line C. Further, when seen in a lateral view, the corner edge 6C is formed like a convex curve which has a projected point in the direction of the insert central line C at a position which substantially bisects the quarter circular arc and continues so as to be in contact with the major cutting edge 6A and the minor cutting edge 6B.

Of a ridge line portion between the parallelogram face 2 and the short side face 4, a part other than the minor cutting edge 6B is formed substantially like a straight line which intersects with the minor cutting edge 6B at an obtuse angle and is in contact with a circular arc chamfer formed on an obtuse angle corner portion B of the parallelogram face 2 as shown in FIG. 2, when the parallelogram face 2 is viewed from the front thereof. Further, when seen in a lateral view in which the short side face 4 is viewed from the front thereof, as shown in FIG. 4, the part gradually inclines downward with respect to the direction of the insert central line C like a straight line at a steeper inclination than the inclination angle formed by the minor cutting edge 6B also when seen in the lateral view while separated from the minor cutting edge 6B. Thereafter, the part extends in a direction substantially perpendicular to the insert central line C via a recessed curve portion so as to continue to the obtuse angle corner portion B. Moreover, of the part, a part continuing to the opposite side of the corner edge 6C of the minor cutting edge 6B is used as a ramping edge 6D.

Further, on the pair of parallelogram faces 2, a positive rake face 2A is formed inside the major cutting edge 6A, the minor cutting edge 6B, the corner edge 6C and the ramping edge 6D. The positive rake face 2A is formed so as to gradually incline downward toward the inside of the parallelogram face 2 with respect to the direction of the insert central line C. In the present embodiment, the positive rake face 2A is formed so as to be substantially constant in width all over a circumference of the parallelogram face 2. On a cross section orthogonal to the minor cutting edge 6B and the corner edge 6C when the parallelogram face 2 is viewed from the front thereof along the insert central line C, an inclination angle with respect to a direction perpendicular to the insert central line C of the positive rake face 2A is kept substantially constant.

On the other hand, on a cross section orthogonal to the major cutting edge 6A when the parallelogram face 2 is viewed from the front thereof along the insert central line C, an inclination angle with respect to a direction perpendicular to the insert central line C of the positive rake face 2A is gradually decreased while separated from the corner edge 6C (the acute angle corner portion A) along the major cutting edge 6A. That is, the positive rake face 2A is formed in the shape of a twisted face which is gradually decreased in rake angle with respect to the major cutting edge 6A while the positive rake face 2A becoming close to the obtuse angle corner portion B from the acute angle corner portion A.

Further, on the pair of parallelogram faces 2, a pair of contact surfaces 7 are formed between the positive rake face 2A and an opening part of the attachment hole 5. Moreover, each of the pair of contact surfaces 7 is disposed along a pair of imaginary flat faces P of the cutting insert on each of the parallelogram faces 2. Each of the pair of imaginary flat faces P of the cutting insert extends on the parallelogram face 2 on which the pair of contact surfaces 7 are formed and includes one imaginary straight line L of the cutting insert for one parallelogram face 2. As shown in FIG. 3 when seen in a direction along the imaginary straight line L of the cutting insert, each of the pair of imaginary flat faces P of the cutting insert is arranged in a direction intersecting with each other in an X letter shape, with setting the imaginary straight line L of the cutting insert as an intersection point.

That is, the pair of imaginary flat faces P of the cutting insert are constituted in such a manner that one flat face which includes the imaginary straight line L of the cutting insert is divided into two so as to have a divided line intersecting with the imaginary straight line L of the cutting insert, the divided two flat faces are twisted around the imaginary straight line L of the cutting insert and given an angle so as to intersect in an X letter shape when seen in a direction of the imaginary straight line L of the cutting insert. Moreover, each of the pair of contact surfaces 7 is disposed so as to be placed on the pair of imaginary flat faces P of the cutting insert.

Further, of the long side face 3 and the short side face 4 of the insert main body 1, a contact portion 8 is formed on one side face with respect to one parallelogram face 2 which faces one direction of two directions at which the imaginary straight lines L of the cutting insert extend on the imaginary flat face P of the cutting insert on which the pair of contact surfaces 7 are disposed. In addition, the contact portion 8 is allowed to be in contact with a contacted portion formed on one wall face of an insert seat to be described later. In the present embodiment, as shown in FIG. 3, when the parallelogram face 2 is viewed from the front thereof, the imaginary straight line L of the cutting insert extends between the pair of long side faces 3. Therefore, the contact portion 8 is formed on the long side face 3.

Still further, in the present embodiment, the insert main body 1 is formed in the shape of 180° rotationally symmetrical with respect to the insert central line C. Therefore, each of the pair of imaginary straight lines L of the cutting insert extending on the pair of parallelogram faces 2 is orthogonal to the insert central line C. Moreover, as described above, in the cutting insert of the present embodiment which is formed in the shape of 180° rotationally symmetrical with respect to the insert central line C, the other of the contact portions 8 is formed also on one of the other of the long side faces 3 with respect to one parallelogram face 2 and which faces the other direction of two directions at which the imaginary straight lines L of the cutting insert extend. The other of the contact portions 8 is also allowed to be in contact with the contacted portion, when the insert main body 1 is rotated at 180° around the insert central line C.

Still further, in the cutting insert of the present embodiment, the imaginary straight line L of the cutting insert of each of the parallelogram faces 2 extends in a direction orthogonal to the long side face 3, when the parallelogram face 2 is viewed from the front thereof along the insert central line C. Therefore, the imaginary straight line L of the cutting insert overlaps the symmetrical line N passing through the center of the long side face 3 as shown in FIG. 2, when the parallelogram face 2 is viewed from the front thereof along the insert central line C.

In addition, each of the pair of imaginary flat faces P of the cutting insert on which a pair of contact surfaces 7 are disposed is arranged so as to be adjacent to a pair of major cutting edges 6A formed at a ridge line portion intersecting with the long side face 3 on each of the parallelogram faces 2. Further, when seen in a direction of the imaginary straight line L of the cutting insert, an inclination direction of each lines of X-letter formed by the pair of imaginary flat faces P of the cutting insert is the same as an inclination direction of each lines of X-letter formed by the major cutting edges 6A on the side to which each of the imaginary flat faces P of the cutting insert is adjacent when the long side face 3 is viewed from the front thereof.

Still further, each of the pair of contact surfaces 7 in the present embodiment is constituted with a plurality of contact surface portions 7A, 7B (two in the present embodiment) which are arranged along the pair of imaginary flat faces P of the cutting insert and spaced away from each other. In this case, the contact surface portions 7A, 7B are disposed at a pair of acute angle corner portions A and a pair of obtuse angle corner portions B of the parallelogram face 2 between a substantially inner border of the positive rake face 2A and an opening part of the attachment hole 5. That is, on each of the pair of imaginary flat faces P of the cutting insert, the contact surface portions 7A, 7B are disposed behind the imaginary straight line L of the cutting insert on both sides thereof. Therefore, each of the pair of contact surfaces 7 is also installed in a protruding manner astride the imaginary straight line L of the cutting insert on both sides thereof.

In this case, a first contact surface portion 7A, which is arranged on the side protruding in a direction of insert central line C of the X-letter formed by the pair of imaginary flat faces P of the cutting insert when seen in a direction of the imaginary straight line L of the cutting insert, is formed on a first convex portion 9A. The first convex portion 9A is formed at an acute angle corner portion A of the parallelogram face 2 and protrudes with respect to an inner border of the positive rake face 2A at the acute angle corner portion A. Further, as shown in FIG. 2 when the parallelogram face 2 is viewed from the front thereof, the first convex portion 9A is formed so as to extend substantially in parallel with the major cutting edge 6A continuing to the acute angle corner portion A on the side where each of the first convex portions 9A is formed from the inside of an end portion on the opposite side of the corner edge 6C of the minor cutting edge 6B to the front of an opening part of the attachment hole 5.

Figure 16:
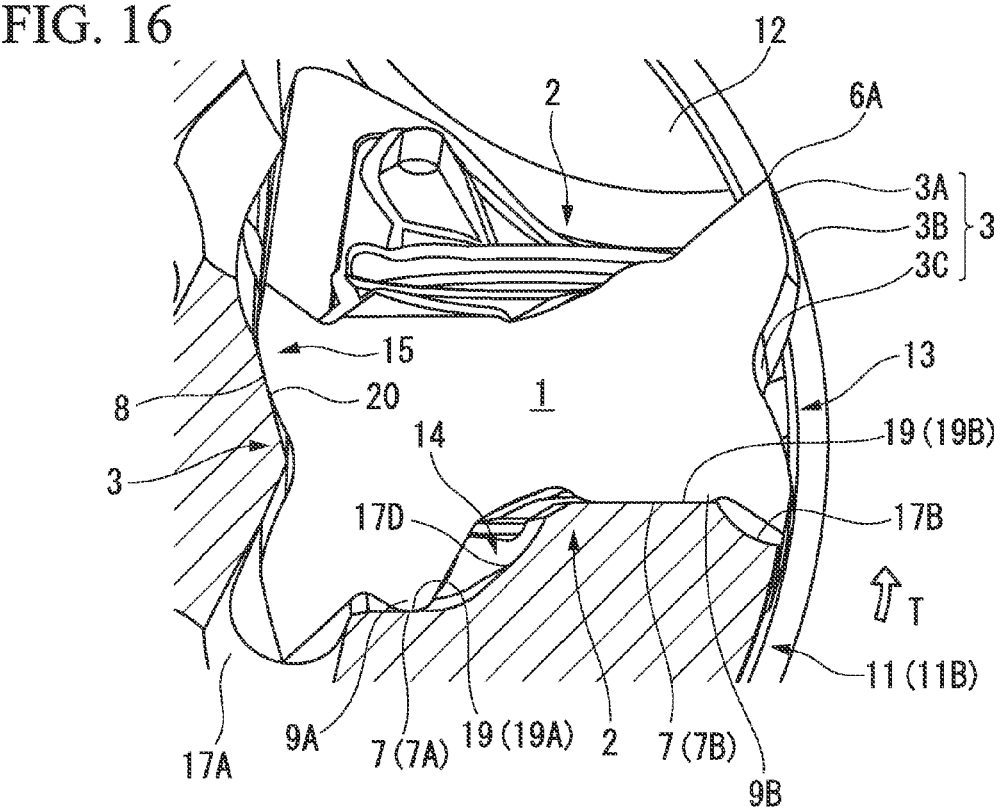
FIG. 16 is a partially enlarged sectional view of a part taken along an A-A line in FIG. 7.
Figure 17:
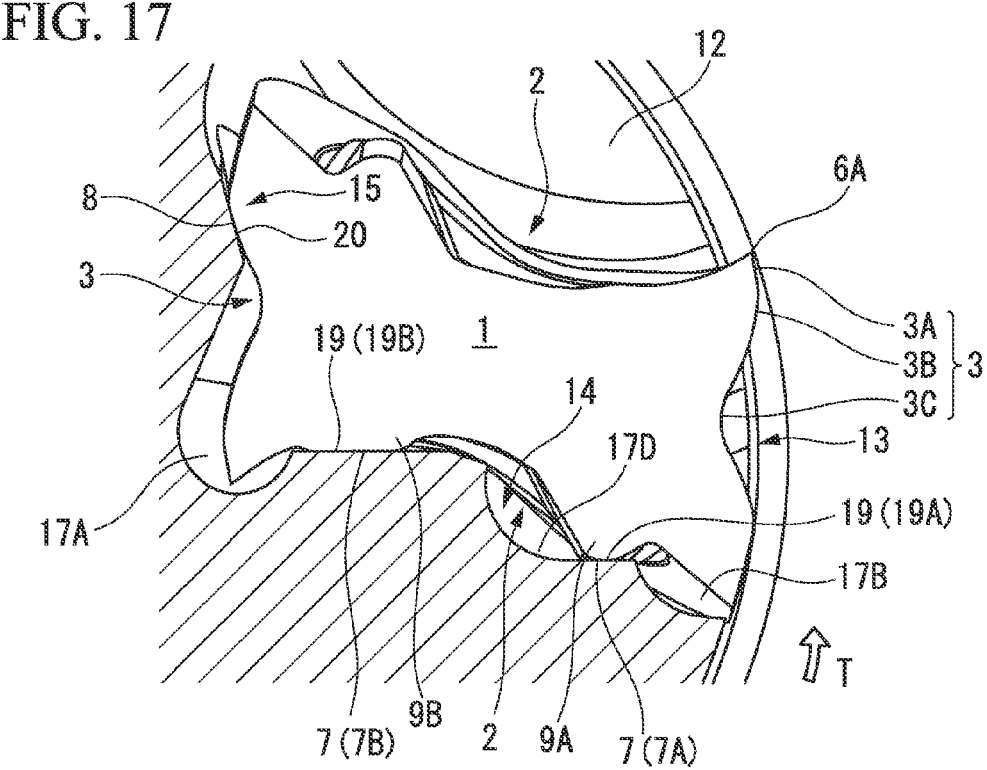
FIG. 17 is a partially enlarged sectional view of a part taken along a B-B line in FIG. 7.

More specifically, both ends of the first convex portion 9A in a direction substantially in parallel with the major cutting edge 6A are formed in such a shape that a circular truncated cone is bisected along a central line thereof. Moreover, the first convex portion 9A is formed between the both ends in such a manner that a cross section orthogonal to a direction at which the first convex portion 9A extends is formed substantially in the shape of an isosceles trapezoid as shown in FIG. 16 and FIG. 17 and the both ends smoothly connect to the surface. Moreover, a projected point face portion of the first convex portion 9A in the direction of the insert central line C is used as the first contact surface portion 7A. The first contact surface portion 7A is formed in the shape of a flat face along the imaginary flat face P of the cutting insert or in the shape of a curve face in which a cross section orthogonal to a direction at which the first convex portion 9A extends forms a convex curve great in curvature radius and a projected point of the convex curve runs along the imaginary flat face P of the cutting insert.

Further, a second contact surface portion 7B arranged on the side inclining downward with respect to the direction of the insert central line C in the above-described X letter shape is formed on a second convex portion 9B. On an obtuse angle corner portion B of the parallelogram face 2, the second convex portion 9B protrudes to an inner border of a positive rake face 2A at the obtuse angle corner portion B. However, the second convex portion 9B protrudes to the inner border of the positive rake face 2A at the obtuse angle corner portion B to a smaller amount than the first convex portion 9A which protrudes to the inner border of the positive rake face 2A at the acute angle corner portion A.

More specifically, the second convex portion 9B extends in a direction of a diagonal line which connects the pair of obtuse angle corner portions B of the parallelogram face 2 when the parallelogram face 2 is viewed from the front thereof. Further, the second convex portion 9B is formed in the shape of an isosceles trapezoid in which a cross section orthogonal to a direction at which the first convex portion 9A extends is made flatter in the direction of the insert central line C than the first convex portion 9A, as shown in FIG. 16 and FIG. 17. Further, a flat face-like protected point face of the second convex portion 9B is used as a second contact surface portion 7B. Still further, the second contact surface portion 7B and the second convex portion 9B are formed in the shape of a trapezoid which gradually becomes wider while becoming close to inward in the direction of the diagonal line, when the parallelogram face 2 is viewed from the front thereof.

Moreover, the first and the second contact surface portions 7A, 7B formed on the first and the second convex portions 9A, 9B are, as shown in FIG. 14 to FIG. 17, arranged individually on one imaginary flat face P of the cutting insert along the major cutting edge 6A on the side to which each of them is adjacent and, thereby, each of them constitutes a pair of contact surfaces 7. An opening part of the attachment hole 5 is formed at an intermediate position between the first and the second contact surface portions 7A, 7B in the direction of the insert central line C. Moreover, a boss portion 2B, an outer shape of which is substantially a circular conical face at the center of the insert central line C, is formed between the second contact surface portion 7B and the opening part of the attachment hole 5.

Here, as shown in FIG. 14, inclination angles θ with respect to the pair of imaginary flat faces P of the cutting insert when seen in a direction along the imaginary straight line L of the cutting insert are equal to each other to a flat face orthogonal to the insert central line C and in a range of 5° to 25°. When seen also in a direction along the imaginary straight line L of the cutting insert, an inclination angle with respect to the flat face orthogonal to the insert central line C of the major cutting edge 6A on the side to which the pair of imaginary flat faces P of the cutting insert are adjacent, is also in a range of 5° to 25°. However, it is acceptable that the inclination angle of the major cutting edge 6A is equal to or not equal to the inclination angle θ of the imaginary flat face P of the cutting insert. In the present embodiment, the inclination angle is to be a slightly different angle.

On the other hand, as described above, a flank face adjacent to the major cutting edge 6A (major flank face or first and second flank faces in the present invention) is formed on the long side face 3 of the insert main body 1 in which the contact portion 8 is formed. Further, a flank face adjacent to the minor cutting edge 6B (minor flank face) is formed on the short side face 4. In this case, a first minor flank face 4A, a second minor flank face 4B and a negative face 4C are sequentially formed on the short side face 4 from the minor cutting edge 6B of one of the parallelogram faces 2 to the other of the parallelogram faces 2 on each of the pair of parallelogram faces 2. Further, a ramping flank face 4D is formed at a part continuing to a ramping edge 6D of the short side face 4.

The first minor flank face 4A continues to the minor cutting edge 6B of one of the parallelogram faces 2 and is inclined so as to gradually protrude slightly outside the insert main body 1 while the first minor flank face 4A becoming close to the other of the parallelogram faces 2. The second minor flank face 4B is formed so as to gradually incline downward toward inside the insert main body 1 at an inclination steeper than the inclination of the first minor flank face 4A also while becoming close to the other of the parallelogram faces 2. Therefore, the first and the second minor flank faces 4A, 4B are formed substantially in the shape of a convex curved surface as shown in FIG. 3 when the long side face 3 is viewed from the front thereof. It is, however, acceptable that the first minor flank face 4A extends in parallel with the insert central line C.

Further, the negative face 4C extends substantially in parallel with the insert central line C from the second minor flank face 4B and intersects with the negative face 4C extending from the minor cutting edge 6B of the other of the parallelogram faces 2 via the first and the second minor flank faces 4A, 4B and is also allowed to intersect with the ramping flank face 4D continuing to the ramping edge 6D of the other of the parallelogram faces 2. Still further, in the present embodiment, the ramping flank face 4D also extends in parallel with the insert central line C. Two ramping flank faces 4D formed on one short side face 4 and the ramping edges 6D to which the ramping flank faces 4D continue are formed to be a recessed V-letter shape as shown in FIG. 2, when the parallelogram face 2 is viewed from the front thereof.

As shown in FIG. 4, when seen in a lateral view in which the short side face 4 is viewed from the front thereof, a ridge line portion between the first minor flank face 4A and the second minor flank face 4B extends substantially in parallel with the minor cutting edge 6B. On the other hand, a ridge line portion between the second minor flank face 4B and the negative face 4C extends in a direction perpendicular to the insert central line C. Further, when also seen laterally, a ridge line portion between the first minor flank face 4A and the ramping flank face 4D extends substantially in parallel with the insert central line C from an intersection point between the minor cutting edge 6B and the ramping edge 6D. Further, a ridge line portion between the negative faces 4C and a ridge line portion between the negative face 4C and the ramping flank face 4D extend on a straight line along the insert central line C. Further, a ridge line portion between the second minor flank face 4B and the ramping flank face 4D extends obliquely with respect to the insert central line C, when seen in the lateral view, in such a manner that both ends of the ridge line portion between the negative faces 4C are connected to an end portion of the ridge line portion between the first minor flank face 4A and the ramping flank face 4D.

On the other hand, there are formed on the long side face 3 sequentially from the pair of parallelogram faces 2 to the respective centers in the direction of the insert central line C a pair of major flank faces 3A continuing to the major cutting edges 6A of the pair of parallelogram faces 2, a pair of convex curved surface portions 3B continuing to the major flank faces 3A and one recessed curved surface portion 3C continuing to the convex curved surface portions 3B and placed at the center of the long side face 3 in the direction of the insert central line C. When seen in a lateral view in which the short side face 4 is viewed from the front thereof, the convex curved surface portion 3B is curved in the shape of a convex curved surface which is raised outside the insert main body 1, and the recessed curved surface portion 3C is, on the other hand, curved in the shape of a recessed curved surface which is recessed inside the insert main body 1.

Moreover, the contact portion 8 of the present embodiment is formed at the convex curved surface portion 3B on the long side face 3. Further, when one of the parallelogram faces 2 is used as a rake face and, of the pair of major cutting edges 6A formed on the long side ridge portion, one of the major cutting edges 6A is used for cutting, of the pair of convex curved surface portions 3B formed on one long side face 3, a contact portion 8 which is formed at the convex curved surface portion 3B continuing via the major flank face 3A to the other of the major cutting edges 6A on the opposite side of one of the major cutting edges 6A on one of the parallelogram faces 2 is allowed to be in contact with a contacted portion to be described later.

Further, as shown in FIG. 3 when seen in a lateral view in which the long side face 3 is viewed from the front thereof, the major flank face 3A is gradually decreased in width in the direction of the insert central line C while the major flank face 3A becoming close to an obtuse angle corner portion B of the major cutting edge 6A from an acute angle corner portion A thereof along the major cutting edge 6A to which the major flank face 3A continues. Moreover, the pair of convex curved surface portions 3B are slightly increased gradually in width in the direction of the insert central line C when moving from the acute angle corner portion A of the major cutting edge 6A to which each of the convex curved surface portions 3B continues via the major flank face 3A to the obtuse angle corner portion B. Further, the above-described one recessed curved surface portion 3C is kept constant in width in the direction of the insert central line C.

The major flank face 3A, the convex curved surface portion 3B and the recessed curved surface portion 3C are as a whole inclined in the direction of the insert central line C while becoming close to a longitudinal direction of the long side face 3, as with the long side face 3. It is noted that a curvature radius formed by the convex curved surface portion 3B and a curvature radius formed by the recessed curved surface portion 3C are individually kept constant in the longitudinal direction of the long side face 3, which is a direction at which the major cutting edge 6A extends. That is, the convex curved surface portion 3B and the recessed curved surface portion 3C are formed respectively in the shape of a convex cylindrical face and a concave cylindrical face.

On the other hand, on a cross section orthogonal to the major cutting edge 6A when the parallelogram face 2 is viewed from the front thereof along the insert central line C, the major flank face 3A is inclined so as to slightly protrude outside the insert main body 1 while the major flank face 3A extending away from the major cutting edge 6A. However, an inclination angle in the direction of the insert central line C thereof is gradually decreased while separated from the corner edge 6C (acute angle corner portion A) along the major cutting edge 6A.

That is, as described above, on a cross section orthogonal to the major cutting edge 6A when the parallelogram face 2 is viewed from the front thereof along the insert central line C, an angle formed by the major flank face 3A with respect to a straight line in parallel with the insert central line C and passing through the major cutting edge 6A is gradually decreased while becoming close to the obtuse angle corner portion B from the corner edge 6C (acute angle corner portion A) along the major cutting edge 6A. Moreover, the major flank face 3A is formed in the shape of a twisted face which has a flank angle which gradually increases with respect to the major cutting edge 6A in a positive angle side while becoming close to the obtuse angle corner portion B from the acute angle corner portion A. Therefore, in the present embodiment, the convex curved surface portion 3B is formed in the shape of a convex curved surface which once protrudes toward the outside of the insert main body 1 from the major flank face 3A to the center in the direction of the insert central line C and thereafter moves toward the inside thereof.

Figure 24:
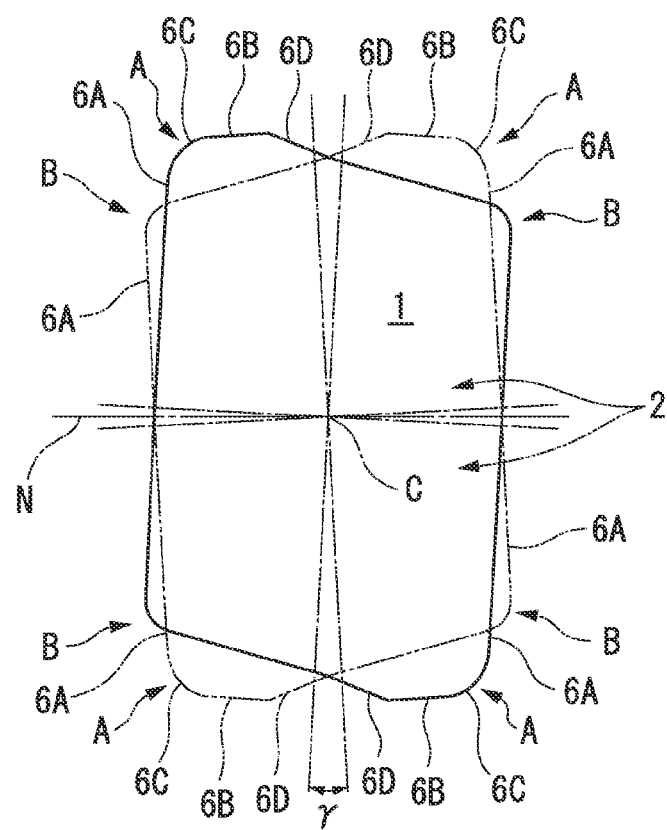
FIG. 24 is a plan view which shows contours of a pair of polygonal faces of the embodiment shown in FIG. 1.
Figure 25:
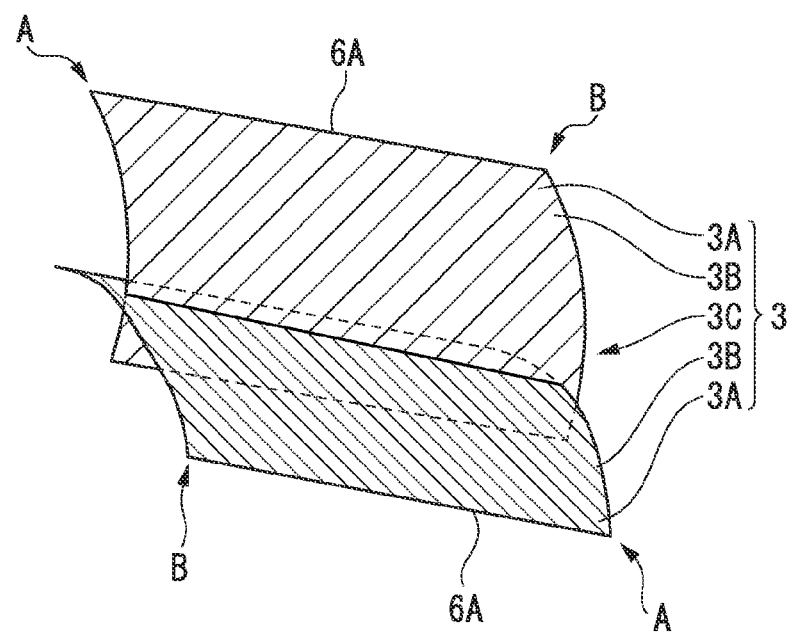
FIG. 25 is a schematic view which shows a flank face formed on one long side face of the embodiment shown in FIG. 1.

Moreover, in the above-constituted cutting insert, as shown in FIG. 2 and FIG. 24 when the parallelogram face 2 is viewed from the front thereof along the insert central line C, the pair of parallelogram faces 2 are formed as twisted by being slightly rotated around the insert central line C. Thereby, the major cutting edges 6A intersect with each other in a deviating manner on the pair of parallelogram faces 2. More specifically, as shown in FIG. 24, when the parallelogram face 2 is viewed from the front thereof, the long side ridge portions at which the major cutting edge 6A is formed are allowed to intersect with each other in such a manner that on each of the pair of parallelogram faces 2, the obtuse angle corner portion B of the other of the parallelogram faces 2 protrudes slightly outside the insert main body 1 from the major cutting edge 6A at the acute angle corner portion A of one of the parallelogram faces 2.

In other words, a major cutting edge (first major cutting edge) 6A intersects with a major cutting edge (second major cutting edge) 6A in such a manner that when one of the parallelogram faces 2 is viewed from the front thereof, an obtuse angle corner portion (second corner portion) B of the parallelogram face 2 protrudes outside the major cutting edge (the second major cutting edge) 6A of the other of the parallelogram faces 2. On the other hand, the major cutting edge (second major cutting edge) 6A intersects with the major cutting edge (first major cutting edge) 6A in such a manner that when the other of the parallelogram faces 2 is viewed from the front thereof, the obtuse angle corner portion (second corner portion) B of the parallelogram face 2 protrudes outside the major cutting edge (first major cutting edge) 6A of one of the parallelogram faces 2.

Figure 18:
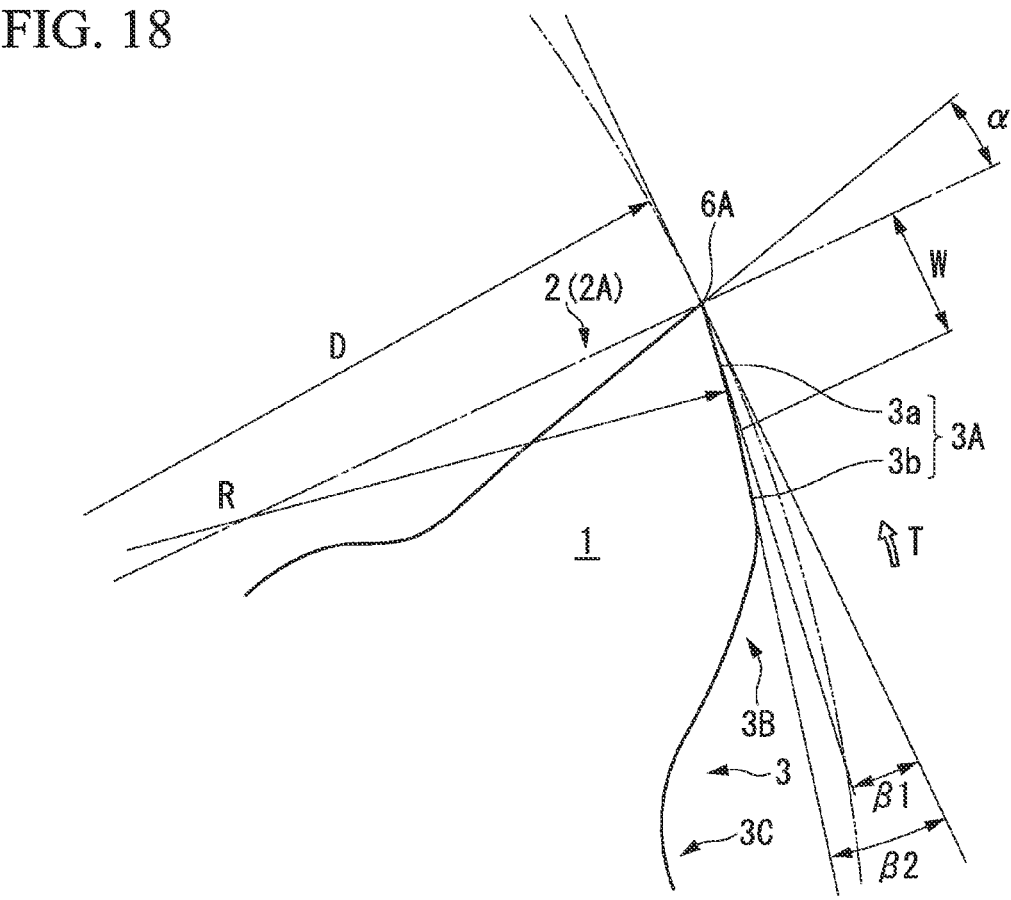
FIG. 18 is an enlarged sectional view of a major cutting edge shown in FIG. 17 (a major cutting edge right above in FIG. 17).

Further, as shown in FIG. 18, the major flank face 3A itself is constituted with a first major flank face 3a formed in the shape of a convex circular arc continuing to the major cutting edge 6A and a second major flank face 3b which has a straight-line cross section continuing to the center of the first major flank face 3a in the direction of the insert central line C. In the present embodiment, the first major flank face 3a is substantially constant in width in the direction of the insert central line C, and the second major flank face 3b gradually decreases in width in the direction of the insert central line C while becoming close to the obtuse angle corner portion B from the acute angle corner portion A. Thereby, the major flank face 3A in its entirety decreases in width when moving from the acute angle corner portion A to the obtuse angle corner portion B.

Figure 21:
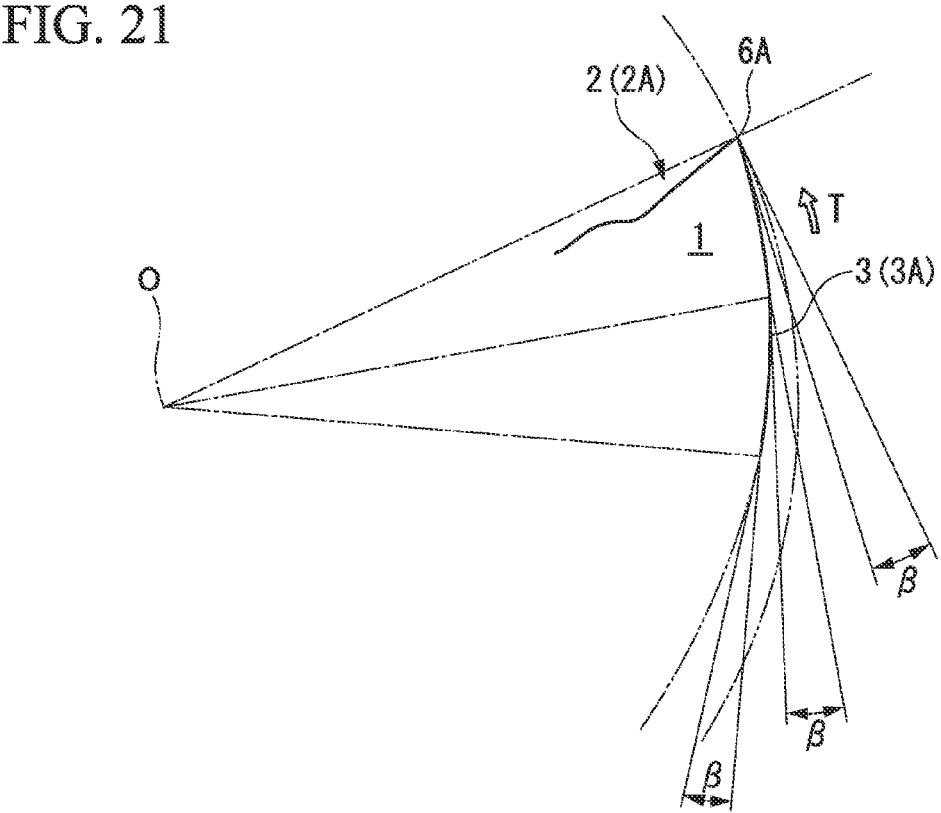
FIG. 21 is a sectional view which shows a modified example of a flank face adjacent to the major cutting edge shown in FIG. 18.
Figure 22:
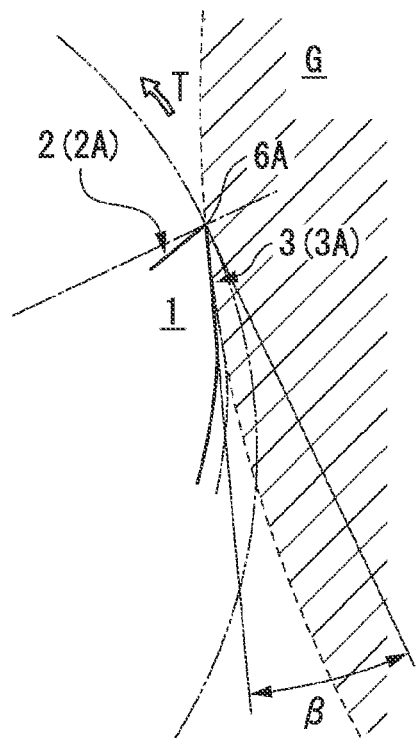
FIG. 22 is a sectional view which shows another modified example of a flank face adjacent to the major cutting edge shown in FIG. 18.
Figure 23:
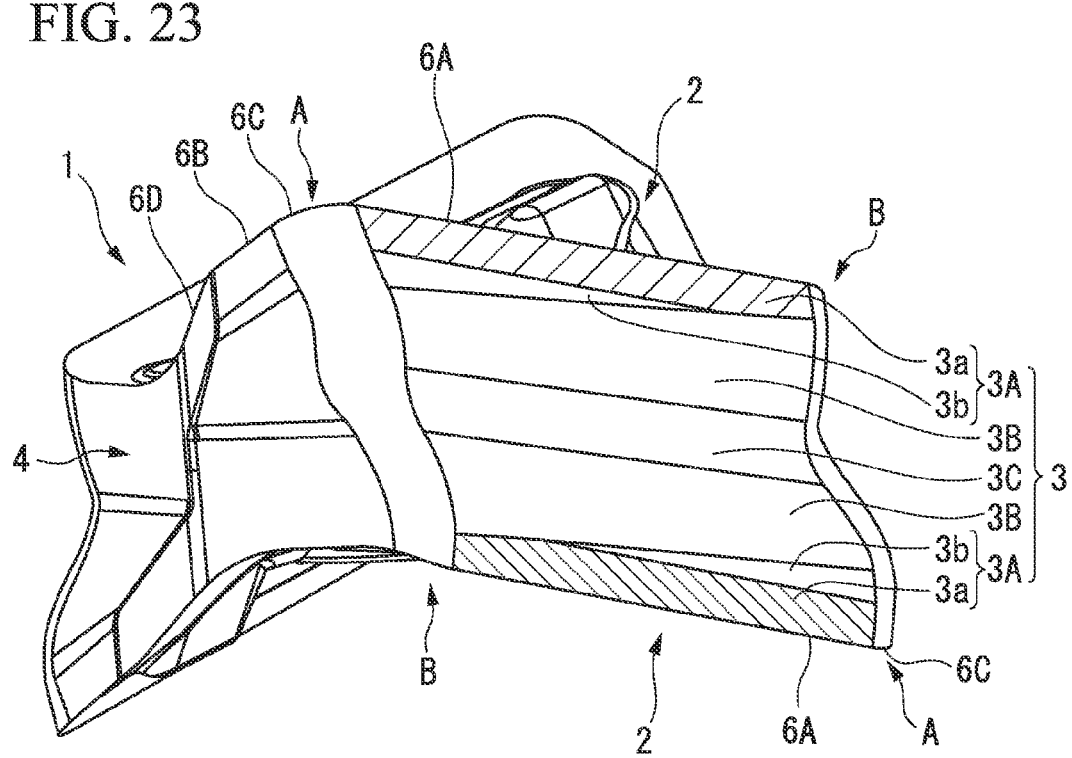
FIG. 23 is a side view of the embodiment shown in FIG. 1 when seen in a direction indicated with an arrow X in FIG. 2.

It is acceptable that only if being formed in the shape of the above-described twisted face, the major flank face 3A is what is called an eccentric flank face in which a flank angle β is constant at any position on the major flank face 3A on a cross section orthogonal to an axis line O in a state of being attached to the tool main body 11, as shown in FIG. 21. It is also acceptable that the major flank face 3A is what is called a concave flank face which is formed like a recessed curve formed with an outer circumferential face of a circular-disk magnet G, as shown by using an alternate long and two short dashed line in FIG. 22 or a straight second face which is formed on a straight line, as shown by a solid line in FIG. 22.

It is acceptable that on a cross section orthogonal to the major cutting edge (first major cutting edge) 6A when one of the parallelogram faces 2 is viewed from the front thereof along the insert central line C, one of the major flank faces (first flank face) 3A is formed in the shape of a twisted face which inclines toward the inside of the insert main body 1 while one of the major flank faces 3A extending away from the major cutting edge 6A; however, on the condition that an inclination angle (flank angle) with respect to a straight line in parallel with the insert central line C is gradually increased while separated from a corner edge 6C (acute angle corner portion A) along the major cutting edge 6A and a flank angle with respect to the major cutting edge 6A gradually increases in a positive angle side. That is, it is acceptable that one of the major flank faces 3A is a twisted face in which the flank angle gradually increases in the positive angle side within a positive angle range. It is also acceptable that one of the major flank faces 3A is formed in the shape of a twisted face which inclines so as to protrude outside the insert main body 1 while one of the major flank faces 3A extending away from the major cutting edge 6A at the acute angle corner portion A, with the flank angle increased in the positive angle side toward the obtuse angle corner portion B, and also inclines so as to move to the inside of the insert main body 1 while one of the major flank faces 3A extending away from the major cutting edge 6A at the obtuse angle corner portion B.

Further, it is acceptable that on a cross section orthogonal to the major cutting edge (second major cutting edge) 6A when the other of the parallelogram faces 2 is viewed from the front thereof along the insert central line C, the other of the major flank faces (second flank face) 3A is formed in the shape of a twisted face which inclines toward the inside of the insert main body 1 while the other of the major flank faces 3A extending away from the major cutting edge 6A, however, on the condition that an inclination angle (flank angle) with respect to a straight line in parallel with the insert central line C is gradually increased while separating away from a corner edge 6C (acute angle corner portion A) along the major cutting edge 6A and a flank angle with respect to the major cutting edge 6A is gradually increased in the positive angle side. That is, it is acceptable that the other of the major flank faces (second flank face) 3A is a twisted face in which the flank angle is gradually increased to the positive angle side in a positive angle range. It is also acceptable that the other of the major flank face 3A is formed in the shape of a twisted face which inclines so as to protrude outside the insert main body 1 while the other of the major flank face 3A extends away from the major cutting edge 6A at the acute angle corner portion A, with the flank angle increased to the positive angle side toward the obtuse angle corner portion B, and which inclines so as to move to the inside of the insert main body 1 while the other of the major flank face 3A extending away from the major cutting edge 6A at the obtuse angle corner portion B.

FIG. 5 to FIG. 8 show one embodiment of the indexable insert-type cutting tool of the present invention which is provided with the cutting insert in a detachable manner. FIG. 9 to FIG. 12 show a state where the cutting insert is detached from the indexable insert-type cutting tool. The indexable insert-type cutting tool is a rotating tool with an indexable edge, in particular an end mill, and provided with a tool main body 11. The tool main body 11 is made of, for example, steel, and formed in the shape of a multiple-stage cylinder at the center of an axis line O. A rear end side part of the tool main body 11 (an upper part in FIG. 5 and FIG. 9, and a right side part in FIG. 6, FIG. 7, FIG. 10, and FIG. 11) is used as a shank portion 11A, and a tip portion is used as a cutting edge portion 11B.

In the above-described indexable insert-type cutting tool, the shank portion 11A is gripped by a main shaft of a machine tool and the tool main body 11 is rotated around the axis line O in a tool rotating direction T and fed in a direction intersecting with the axis line O (usually a direction perpendicular to the axis line O). Moreover, a workpiece is cut by a major cutting edge 6A, a minor cutting edge 6B and a corner edge 6C of the cutting insert attached to the cutting edge portion 11B.

On an outer circumference of the cutting edge portion 11B at the tip portion of the tool main body 11, a plurality of chip pockets 12 are formed in a circumferential direction (two in the present embodiment), with an equal interval kept. That is, they are formed on the opposite side from each other behind the axis line O. The chip pocket 12 is opened at a tip face of the cutting edge portion 11B, that is, at a tip face of the tool main body 11, extending to the rear end side thereof. Further, an insert seat 13 to which the cutting insert is attached is formed on a wall face of the chip pocket 12 which faces the tool rotating direction T. As shown in FIG. 9 to FIG. 12, the insert seat 13 is opened on the tip face and the outer circumferential face of the cutting edge portion 11B and formed so as to be recessed by one step from the wall face of the chip pocket 12 to the rear end in the tool rotating direction T.

The insert seat 13 is provided with a base 14 which faces the tool rotating direction T, a wall face 15 which faces to an outer circumference side of the tool main body 11 and a wall face 16 which faces to the tip side of the tool main body 11. Of a pair of parallelogram faces 2 of the insert main body 1, when one of the parallelogram faces 2 is used as a rake face and faces in the tool rotating direction T, the other of the parallelogram faces 2 is used as a seating face and seated on the base 14. The wall face 15 rises from a border of the base 14 on an inner circumference side of the tool main body 11 to an outer circumference side thereof, continuing to the wall face of the chip pocket 12 which faces the tool rotating direction T. The wall face 16 rises from a border of the base 14 on the rear end of the tool main body 11 in the tool rotating direction T, continuing to the wall face of the chip pocket 12 which faces the tool rotating direction T.

However, a ridge line portion between the base 14 and the wall faces 15, 16 and a ridge line portion between the wall faces 15, 16 are notched by a flank portion 17A which is formed like a recessed groove for the purpose of preventing individual interference with a major cutting edge 6A of the other of the parallelogram faces 2 used as the seating face which is arranged on an inner circumference side of the tool main body 11, a minor cutting edge 6B arranged at the rear end side of the tool main body 11, a corner edge 6C arranged on an inner circumference side of the rear end thereof as well as a major flank face 3A of the long side face 3 continuing to the major cutting edge 6A on the other of the parallelogram faces 2, a convex curved surface portion 3B and a recessed curved surface portion 3C.

At the base 14 and a ridge line portion between an outer circumferential face of the cutting edge portion 11B and the tip face thereof, a chamfered flank portion 17B is formed for the purpose of preventing interference with a major cutting edge 6A of the parallelogram face 2 used as a seating face which is arranged on the outer circumference side of the tool main body 11, a minor cutting edge 6B arranged at the tip thereof, a corner edge 6C arranged at the tip of the outer circumference side thereof, a positive rake face 2A on the inside thereof, and so on.

Figure 10:
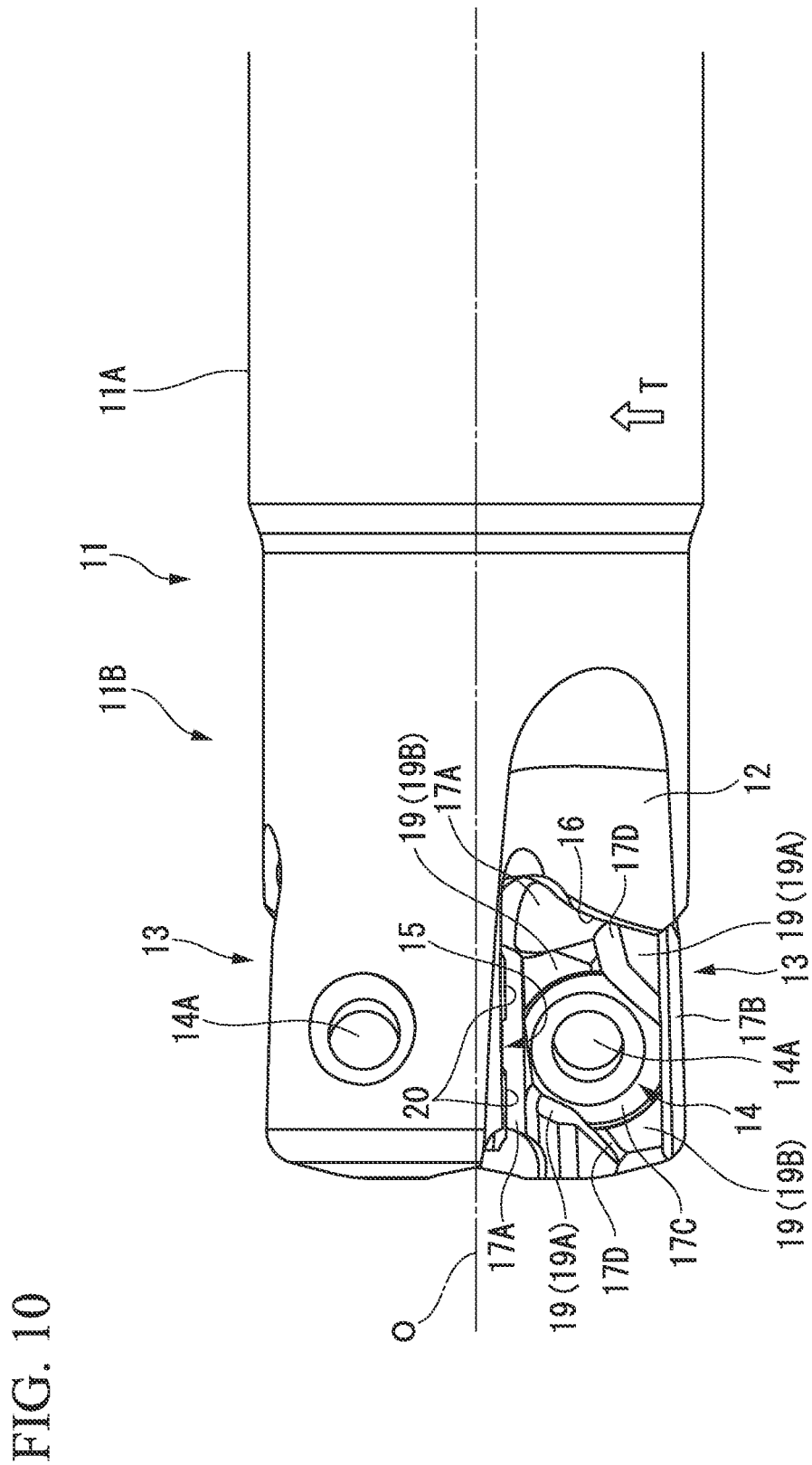
FIG. 10 is an enlarged plan view of a tip portion of the tool main body shown in FIG. 9.

A thread hole 14A is formed at the center of the base 14. A clamp screw 18 which is inserted into an attachment hole 5 from one of the parallelogram faces 2 used as the rake face is screwed into the thread hole 14A in a state that the insert main body 1 is seated on the insert seat 13, as described above. As shown in FIG. 10, the thread hole 14A is slightly inclined toward the rear end side of the tool main body 11 while the thread hole 14A becoming close to a hole bottom (the rear in the tool rotating direction T) from an opening part of the base 14. The insert main body 1 is attached to the insert seat 13 due to the fact that a head rear face of the clamp screw 18 screwed into the thread hole 14A presses a diameter reducing portion 5A of the attachment hole 5. A recessed flank portion 17C is formed also at the periphery of the thread hole 14A of the base 14 for the purpose of preventing interference with a boss portion 2B on the parallelogram face 2 side which is used as the seating face.

As shown in FIG. 14 and FIG. 15, a pair of contacted surfaces 19 are formed on the base 14 along each of a pair of imaginary flat faces Q of the insert seat. The pair of contact surfaces 7 on the parallelogram face 2 used as a seating face of the cutting insert are allowed to be in contact with the pair of contacted surfaces 19. Here, in the present embodiment, as with the contact surface 7 of the cutting insert of the first embodiment, as shown in FIG. 9 and FIG. 10 or FIG. 14 and FIG. 15, the pair of contacted surfaces 19 are also constituted with a plurality of contacted surface portions 19A, 19B (two in the present embodiment) which are spaced away from each other and arranged along the pair of imaginary flat faces Q of the insert seat.

Further, as with the pair of imaginary flat faces P of the cutting insert, each of the pair of imaginary flat faces Q of the insert seat also includes one imaginary straight line M of the insert seat extending on the base 14 and disposed in a direction intersecting with each other in an X-letter shape when seen along the imaginary straight line M of the insert seat. Moreover, as described above, an inclination direction and an intersection angle of the pair of imaginary flat faces Q of the insert seat when seen in a direction of the imaginary straight line M of the insert seat are made equal to an inclination direction and an intersection angle of the pair of imaginary flat faces P of the cutting insert on the parallelogram face 2 used as a seating face when seen in a direction of the imaginary straight line L of the cutting insert. That is, an X letter shape formed by the pair of imaginary flat faces Q of the insert seat is an X letter shape complementary to an X letter shape formed by the pair of imaginary flat faces P of the cutting insert.

Further, one imaginary straight line M of the insert seat included in the pair of imaginary flat faces Q of the insert seat extends so as to be orthogonal to the central line of the thread hole 14A and also extends so as to intersect with one wall face of wall faces 15, 16 rising from the base 14, when the base 14 is viewed from the front thereof. In the present embodiment, the imaginary straight line M of the insert seat extends so as to intersect with the wall face 15 which faces an outer circumference side of the tool main body 11, thereby forming on the wall face 15 a contacted portion 20 which is allowed to be in contact with the contact portion 8 of the cutting insert.

Figure 11:
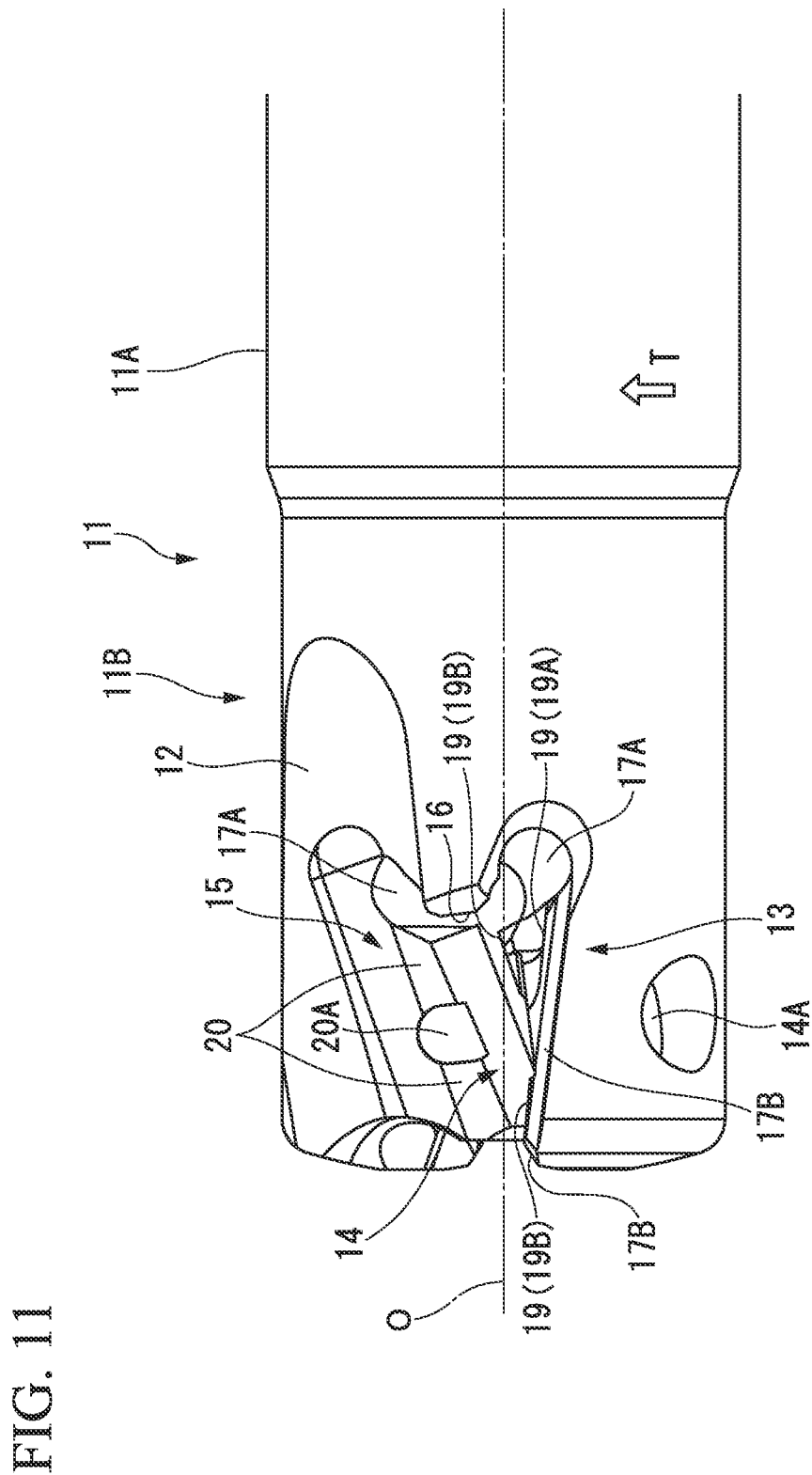
FIG. 11 is an enlarged side view of the tip portion of the tool main body shown in FIG. 9.
Figure 12:
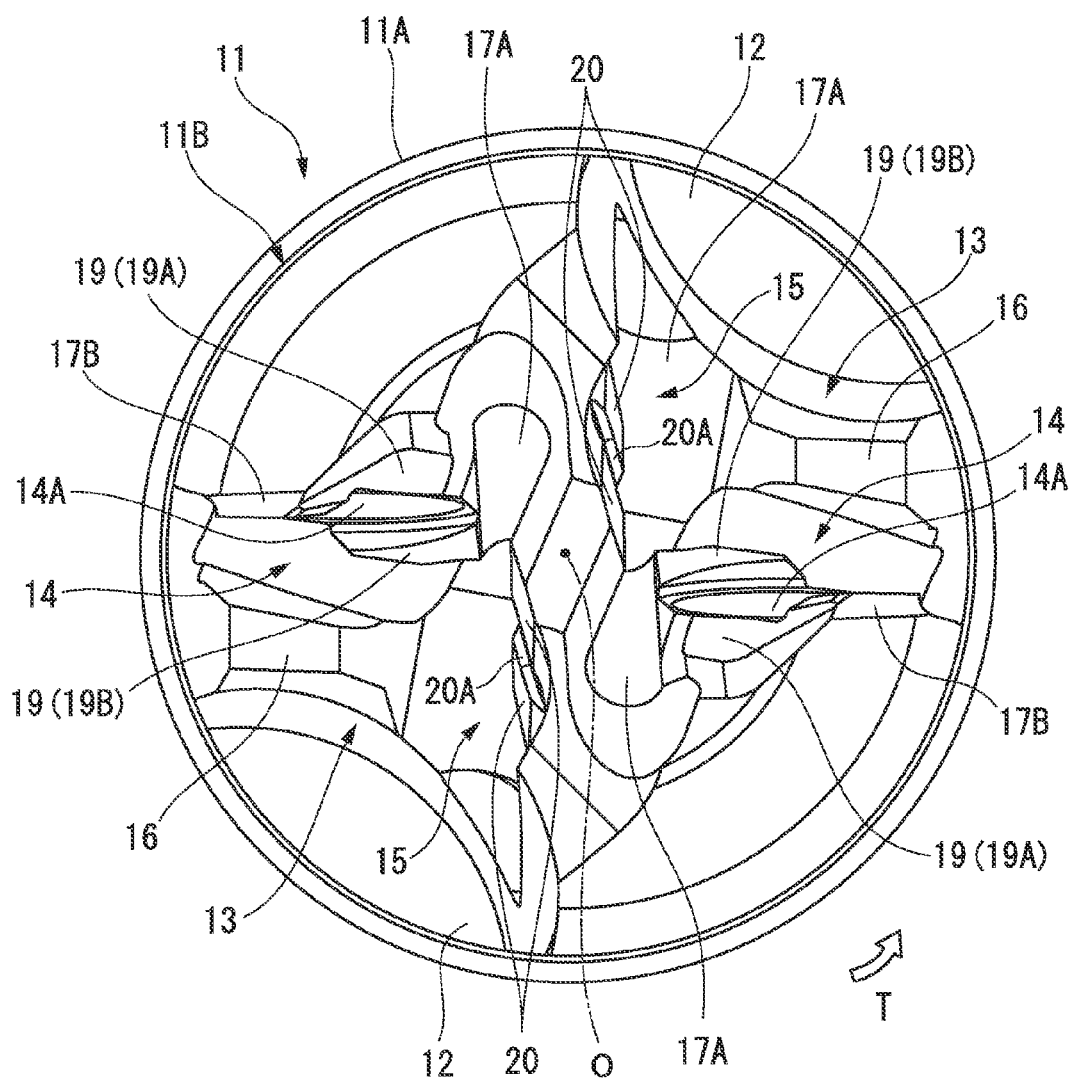
FIG. 12 is an enlarged front view of the tool main body shown in FIG. 9.
Figure 13:
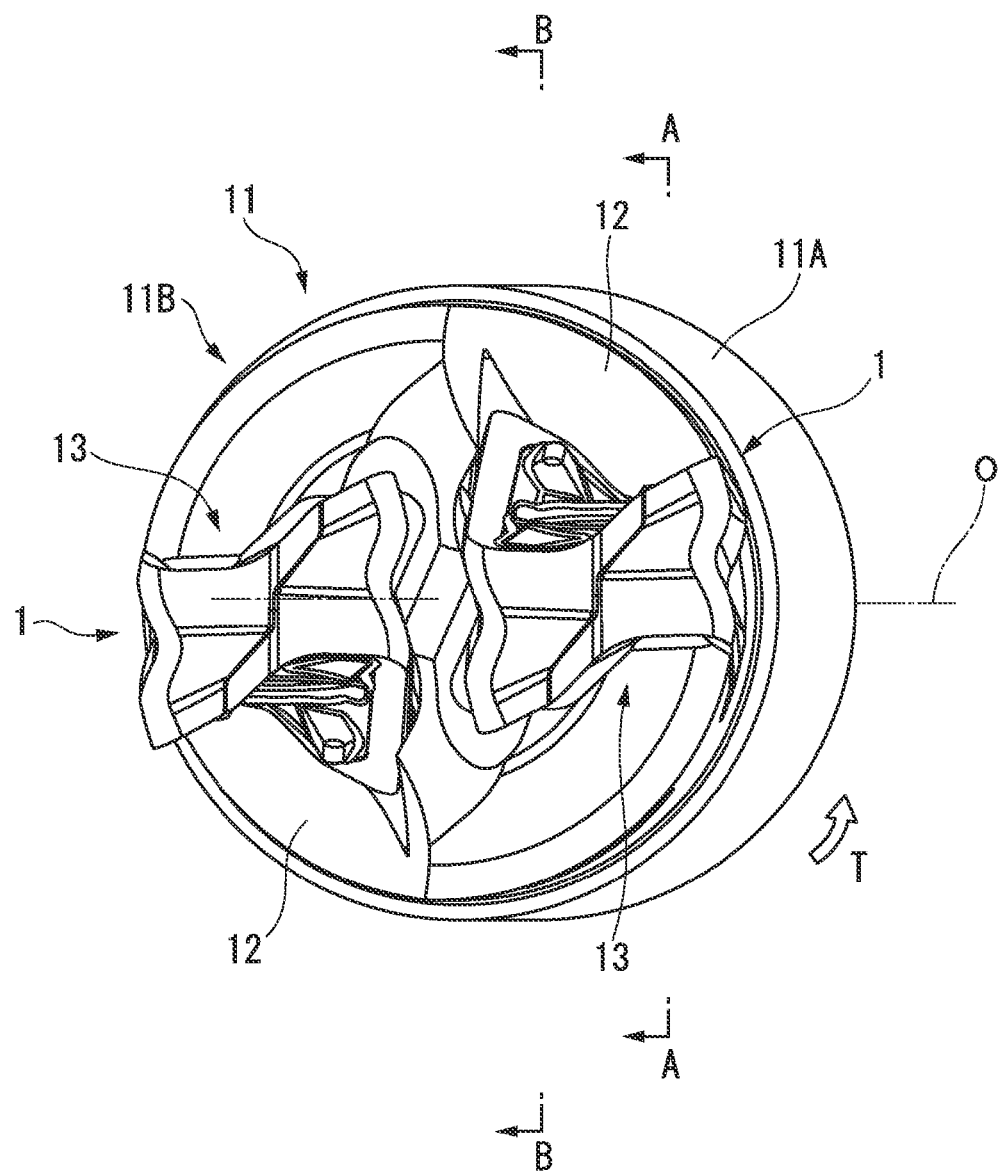
FIG. 13 is an enlarged front view in which the embodiment shown in FIG. 8 is seen in a direction perpendicular to an imaginary straight line of the cutting insert on a polygonal face (parallelogram face) which is used as a seating face of one of cutting inserts (a cutting insert on the right side of FIG. 8).

The contacted portion 20 is formed substantially at the center of the wall face 15 rising from a border of the base 14 on the inner circumference side the tool main body 11 to the outer circumference side thereof in a diameter direction of the tool main body 11. The contacted portion 20 is formed in the shape of a flat face and extending so as to incline toward the outer circumference side thereof while the contacted portion 20 becoming close to the rear end side of the tool main body 11 from the tip side thereof as shown in FIG. 11 when the wall face 15 is viewed from the front thereof. The contacted portion 20 is also formed so as to slightly incline in the tool rotating direction T while the contacted portion 20 becoming close to the outer circumference side of the tool main body 11 from the inner circumference side thereof, as shown in FIG. 12. Here, the contacted portion 20 is inclined with respect to the central line of the thread hole 14A when the wall face 15 is viewed from the front thereof so as to be reverse in inclination direction and substantially equal in inclination angle, to the contact portion 8 (convex curved surface portion 3B) with respect to the insert central line C when the long side face 3 of the insert main body 1 is viewed from the front thereof. It is noted that a notch 20A is formed at the center of the contacted portion 20.

Further, the imaginary straight line M of the insert seat extends so as to incline significantly slightly toward the tip side thereof while the imaginary straight line M of the insert seat becoming close to a direction substantially orthogonal to the axis line O of the tool main body 11 or becoming close to the inner circumference side of the tool main body 11, when the base 14 is viewed from the front thereof along the central line of the thread hole 14A. Moreover, the contacted portion 20 extends in a direction orthogonal to the imaginary straight line M of the insert seat. An intersection angle formed by the imaginary straight line M of the insert seat with respect to the contacted portion 20 when seen in a direction of the central line of the thread hole 14A is made equal to an intersection angle formed by an imaginary straight line L of the cutting insert on the parallelogram face 2 side used as a seating face when seen in a direction of the insert central line C from the parallelogram face 2 used as a rake face of the cutting insert with respect to a convex curved surface portion 3B (a convex curved surface portion 3B on the parallelogram face 2 side used as a rake face) on which there is formed the contact portion 8 with respect to the seating face.

Therefore, in the present embodiment, the pair of contacted surfaces 19 are disposed at the base 14 on an outer circumference side and an inner circumference side of the tool main body 11. Moreover, as shown in FIG. 11 and FIG. 14, the contacted surface 19 on the outer circumference side inclines slightly rearward in the tool rotating direction T while the contacted surface 19 becoming close to the rear end side of the tool main body 11. On the other hand, as shown in FIG. 11 and FIG. 15, the contacted surface 19 on the inner circumference side inclines forward in the tool rotating direction T (the outer circumference side of the tool main body 11) while the contacted surface 19 becoming close to the rear end side of the tool main body 11 at an angle greater than an angle of the contacted surface 19 on the outer circumference side.

Further, the contacted surface portions 19A, 19B, two for each of the pair of contacted surfaces 19, are disposed individually in the thread hole 14A of the base 14 at the tip of the outer circumference side of the tool main body 11 and the rear end side of the outer circumference side thereof as well as at the rear side end of the inner circumference side thereof and the tip side of the inner circumference side thereof. That is, on each of the pair of imaginary flat faces Q of the insert seat, the contacted surface portions 19A, 19B are disposed behind the imaginary straight line M of the insert seat on both sides thereof. Therefore, each of the pair of contacted surfaces 19 is also disposed astride the imaginary straight line M of the insert seat on both sides thereof. Between the contacted surface portions 19A, 19B of each of the pair of contacted surfaces 19 at the tip of the tool main body 11 and between the contacted surface portions 19A, 19B at the rear end of the tool main body 11, as shown in FIG. 16 and FIG. 17, a flank portion 17D is formed for the purpose of preventing interference with the first and the second convex portions 9A, 9B of the insert main body 1.

The cutting insert is seated on the thus formed insert seat 13 in such a manner that, as described above, one of the parallelogram faces 2 of the insert main body 1 is used as a rake face and faces in the tool rotating direction T, one of the long side faces 3 faces in an outer circumference direction of the tool main body 11, one of the short side faces 4 faces the tip side of the tool main body 11, and the other of the parallelogram faces 2 faces the base 14. At this time, in the present embodiment, a total of four contact surface portions 7A, 7B on the other of the parallelogram faces 2 are allowed to be individually in contact with a total of four contacted surface portions 19A, 19B on the base 14. That is, the pair of contact surfaces 7 are allowed to be in contact with the pair of contacted surfaces 19 in such a manner that each of the imaginary flat faces P of the cutting insert and each of imaginary straight lines L of the cutting insert are in alignment with the imaginary flat face Q of the insert seat and the imaginary straight line M of the insert seat.

In this state, the insert main body 1 is, with the insert central line C being in parallel with the central line of the thread hole 14A, allowed to move only in a direction along the imaginary straight line M of the insert seat and the imaginary straight line L of the cutting insert on the other of the parallelogram faces 2 which are aligned with each other but restricted from moving in other directions. Thus, the insert main body 1 is allowed to move, with the insert main body 1 being seated, along the imaginary straight line L of the cutting insert on the other of the parallelogram faces 2 toward the other of the long side faces 3 on the opposite side of one of the long side faces 3, that is, toward an inner circumference side of the tool main body 11. Moreover, as shown in FIG. 16 and FIG. 17, the contact portion 8 of the other of the long side faces 3 on one of the parallelogram faces 2 is in contact with the contacted portion 20 of the wall face 15, by which the insert main body 1 is positioned.

That is, (1) an intersection angle formed by the contact portion 8 of the other of the long side faces 3 on one of the parallelogram faces 2 and the imaginary straight line L of the cutting insert of the other of the parallelogram faces 2 when seen in a direction of the insert central line C is made equal to an intersection angle formed by the contacted portion 20 formed on the wall face 15 of the insert seat 13 and the imaginary straight line M of the insert seat, when seen in a direction of the central line of the thread hole 14A. (2) The convex curved surface portion 3B at which the contact portion 8 is formed is a convex curved surface in which a cross section thereof forms a convex curve substantially constant in curvature radius all over in the longitudinal direction of the long side face 3. Moreover, the contacted portion 20 is formed in the shape of an inclined flat face which inclines slightly in the tool rotating direction T while the contacted portion 20 becoming close to an outer circumference side of the tool main body 11. Due to the above-described reasons of (1) and (2), as shown in FIG. 16 and FIG. 17, the convex curved surface-like contact portion 8 is in contact with the inclined flat face-like contacted portion 20 all over the long side face 3, except for the notch 20A, by which the insert main body 1 is positioned stably.

Further, in the thus positioned state, the insert central line C which is the central line of the attachment hole 5 on the insert main body 1 is made slightly eccentric to the outer circumference side of the tool main body 11 with respect to the central line of the thread hole 14A. Therefore, when the clamp screw 18 is inserted through the attachment hole 5 and screwed into the thread hole 14A, of the diameter reducing portion 5A of the attachment hole 5, a part on the inner circumference side of the tool main body 11 is pressed by a head rear face of the clamp screw 18. Therefore, the insert main body 1 is pressed to the base 14, and attached to the insert seat 13 in a detachable manner, as the contact portion 8 formed at the convex curved surface portion 3B of the other of the long side faces 3 on one of the parallelogram faces 2 is also pressed to the contacted portion 20 on the wall face 15.

As described so far, in a state of being fixed to the insert seat 13, a symmetrical line N passing through the center of the long side face 3 is placed further to the side of the tool rotating direction T than a straight line which is parallel with the symmetrical line N and intersects with the axis line O. Further, the major cutting edge 6A of one of the parallelogram faces 2 used as a rake face which faces in the outer circumference direction of the tool main body 11 and used for cutting is substantially placed on a cylindrical face at the center of the axis line O of the tool main body 11 or given a significantly small back taper and given a positive axial rake angle and a radial rake angle which is preferably positive or zero degrees by the positive rake face 2A. Further, the major flank face 3A continuing to the major cutting edge 6A is also given a positive or zero-degree flank angle. The major cutting edge 6A of the other of the parallelogram faces 2 used as a seating face which is at the back of the major cutting edge 6A and faces in an outer circumference direction of the tool main body 11 is arranged inside the cylindrical face which is a rotational locus around the axis line O of the major cutting edge 6A used for the cutting so as not to interfere with a worked face of a workpiece, and not used for cutting.

On the other hand, the minor cutting edge 6B used for cutting and continuing via a corner edge 6C to the major cutting edge 6A used for cutting is placed substantially on a flat face perpendicular to the axis line O and given an approximately zero-degree radial rake angle and a positive axial rake angle by a positive rake face 2A. Further, the first and the second minor flank faces 4A, 4B are given a positive flank angle. Therefore, in the present embodiment, the minor cutting edge 6B used for cutting is a flat cutting edge. The minor cutting edge 6B of the other of the parallelogram faces 2 used as a seating face which faces in the tip direction of the tool main body 11 is placed further to the side of the rear end of the tool main body 11 than a flat face which is perpendicular to the axis line O at which the minor cutting edge 6B used for cutting is positioned and which is not used for cutting either.

Figure 19:
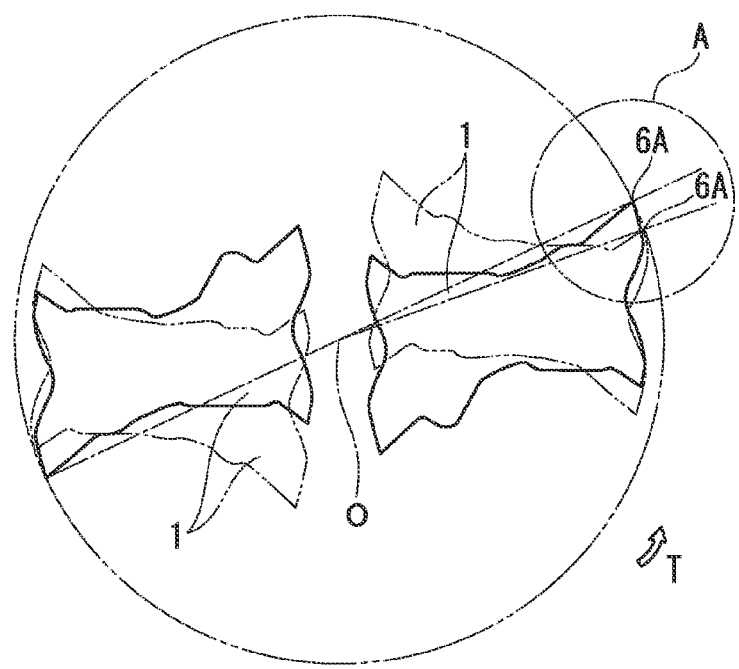
FIG. 19 is a view in which a cross section of the insert main body shown in FIG. 16 is allowed to overlap on that shown in FIG. 17.
Figure 20:
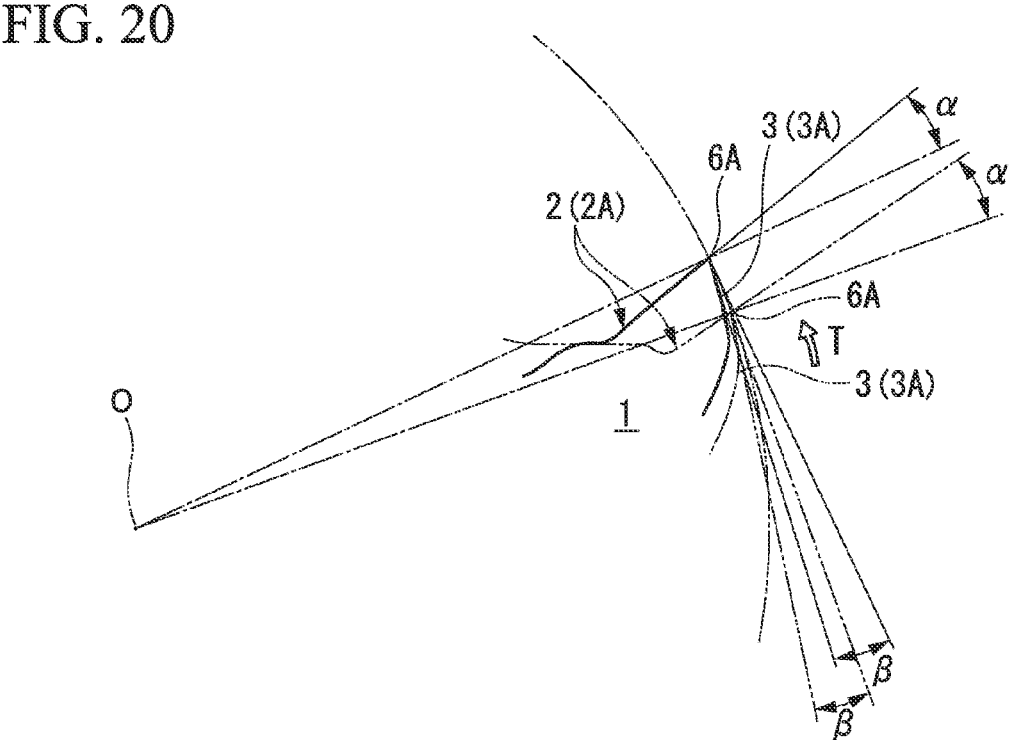
FIG. 20 is a view which shows a rake angle and a flank angle of the major cutting edge in FIG. 19 (an enlarged view of an A part shown in FIG. 19).

In the cutting insert of the first embodiment and the indexable insert-type cutting tool of one embodiment to which the cutting insert is attached, the major flank face 3A is formed in the shape of a twisted face with a flank angle which gradually increases with respect to the major cutting edge 6A in a positive angle side while the major flank face 3A becoming close to an obtuse angle corner portion B from an acute angle corner portion A which are an alternate corner portion on the long side face 3 in a circumferential direction of each of a pair of parallelogram faces 2. Therefore, as described above, when the acute angle corner portion A of the parallelogram face 2 used as a rake face arranged at the tip side of the tool main body 11 and the major cutting edge 6A used for cutting is given a positive axial rake angle and the insert main body 1 is attached thereto, as shown in FIG. 19 and FIG. 20, the major cutting edge 6A can be kept substantially constant in flank angle β all over the major cutting edge 6A. It is, therefore, possible to prevent a partial increase in cutting resistance due to a shortage of a flank amount.

Further, in the present embodiment, the positive rake face 2A continuing to a major cutting edge 6A is formed in the shape of a twisted face which is gradually decreased in rake angle with respect to the major cutting edge 6A while the positive rake face 2A becoming close to the obtuse angle corner portion B from the acute angle corner portion A. Therefore, when the major cutting edge 6A is given a positive axis direction rake angle and the insert main body 1 is attached thereto in a similar manner, as shown in FIG. 19 and FIG. 20, the major cutting edge 6A can also be kept substantially constant in radial rake angle α over an entire length of the major cutting edge 6A. As a result, the major cutting edge 6A is kept substantially constant in sharpness over the entire length thereof. It is, further, possible to prevent an increase in cutting resistance due to partial decrease in sharpness.

Still further, as described above, the major cutting edge 6A is kept substantially constant in radial rake angle α and flank angle β, by which a wedge angle of the major cutting edge 6A formed by the positive rake face 2A and the major flank face 3A can also be kept substantially constant over the entire length of the major cutting edge 6A. Thus, it is possible to prevent the major cutting edge 6A from being damaged due to a partial decrease in edge strength.

Figure 26:
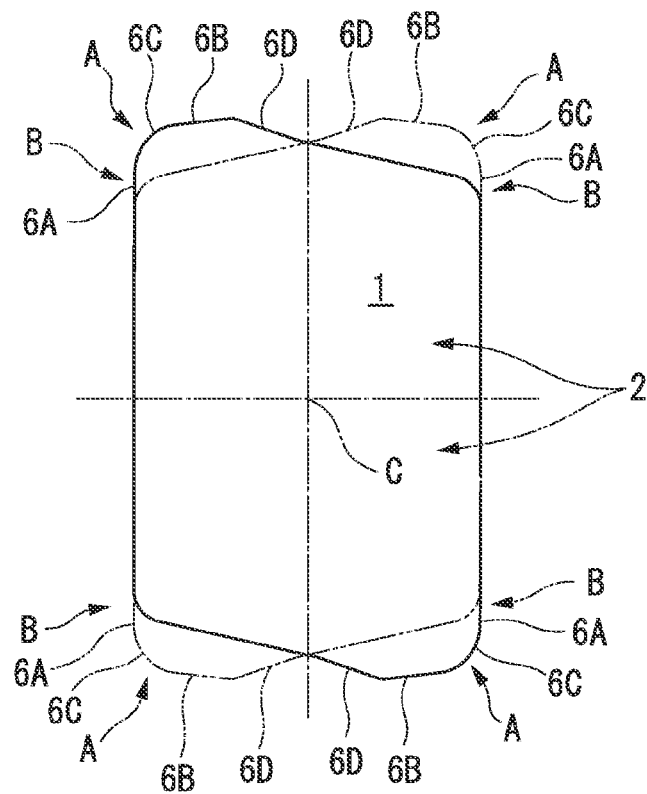
FIG. 26 is a plan view which shows contours obtained when a pair of polygonal faces are formed without being twisted in the embodiment shown in FIG. 1.

Moreover, as described above, where the major flank face 3A is formed in the shape of a twisted face, the major cutting edges 6A, each of which is formed substantially on a straight line when the parallelogram face 2 is viewed from the front thereof, are overlapped with each other on the pair of parallelogram faces 2, as shown in FIG. 26, for example. In this case, a flank angle with respect to the major cutting edge 6A of the major flank face 3A gradually increases in a positive angle side from the acute angle corner portion A of the major cutting edge 6A to the obtuse angle corner portion B thereof. Thereby, an amount of protrusion of the major flank face 3A gradually decreases to the outside of the insert main body 1 in the direction of the insert central line C.

Figure 27:
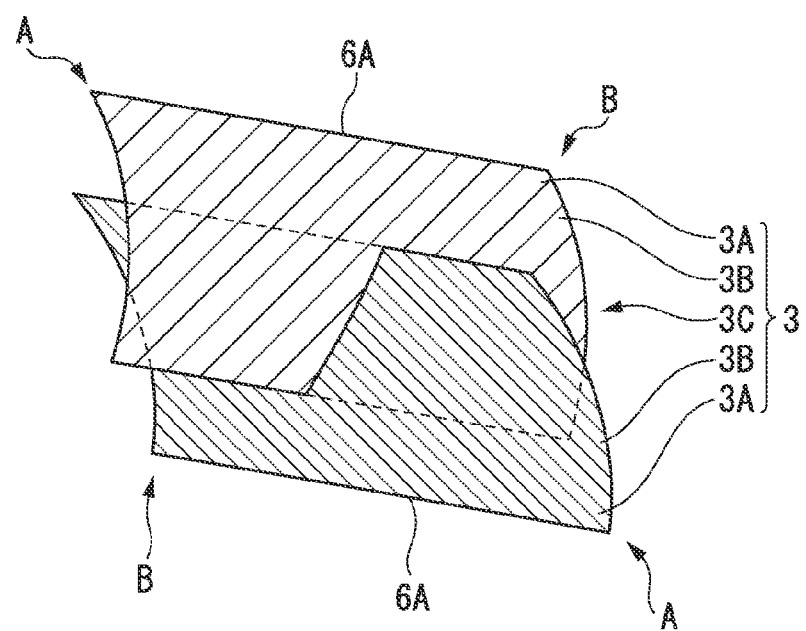
FIG. 27 is a schematic view which shows a flank face formed on one long side face as shown in FIG. 26.
Figure 28:
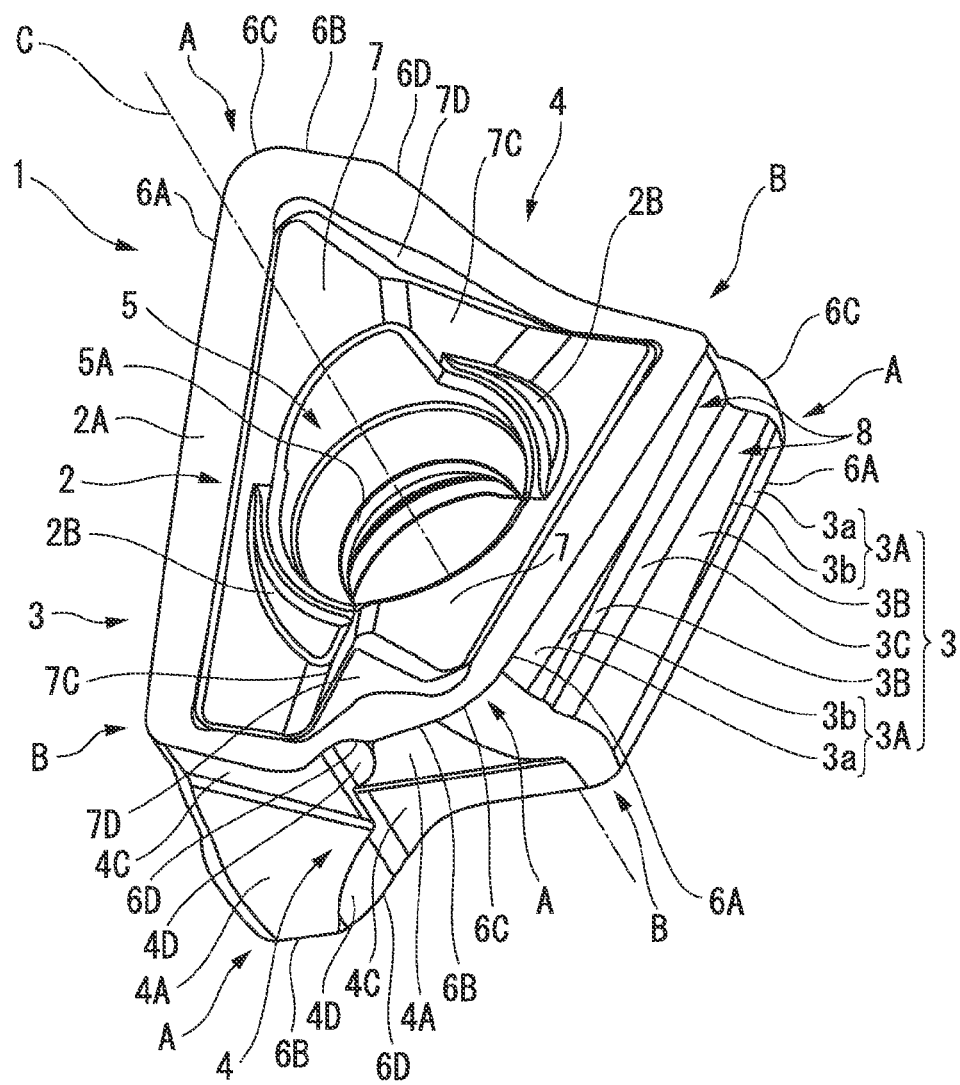
FIG. 28 is a perspective view which shows a cutting insert of a second embodiment of the present invention.
Figure 29:
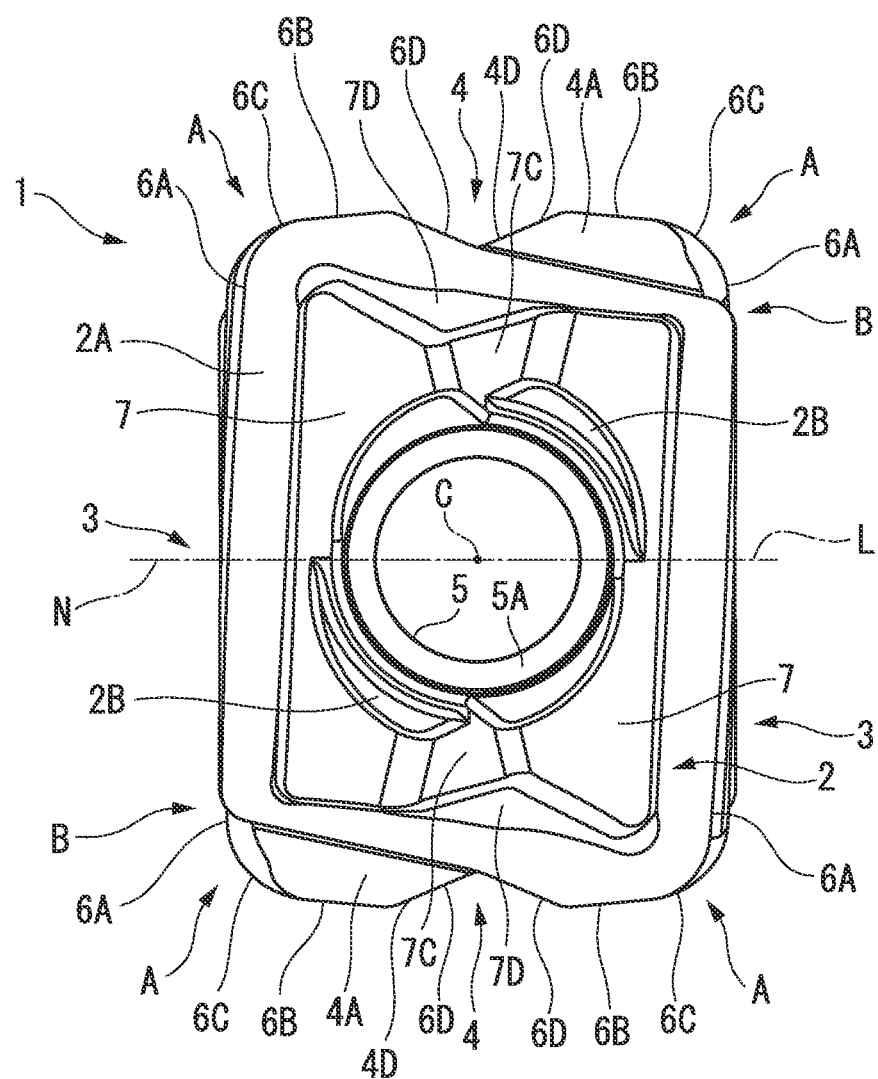
FIG. 29 is a plan view of the embodiment shown in FIG. 28.
Figure 30:
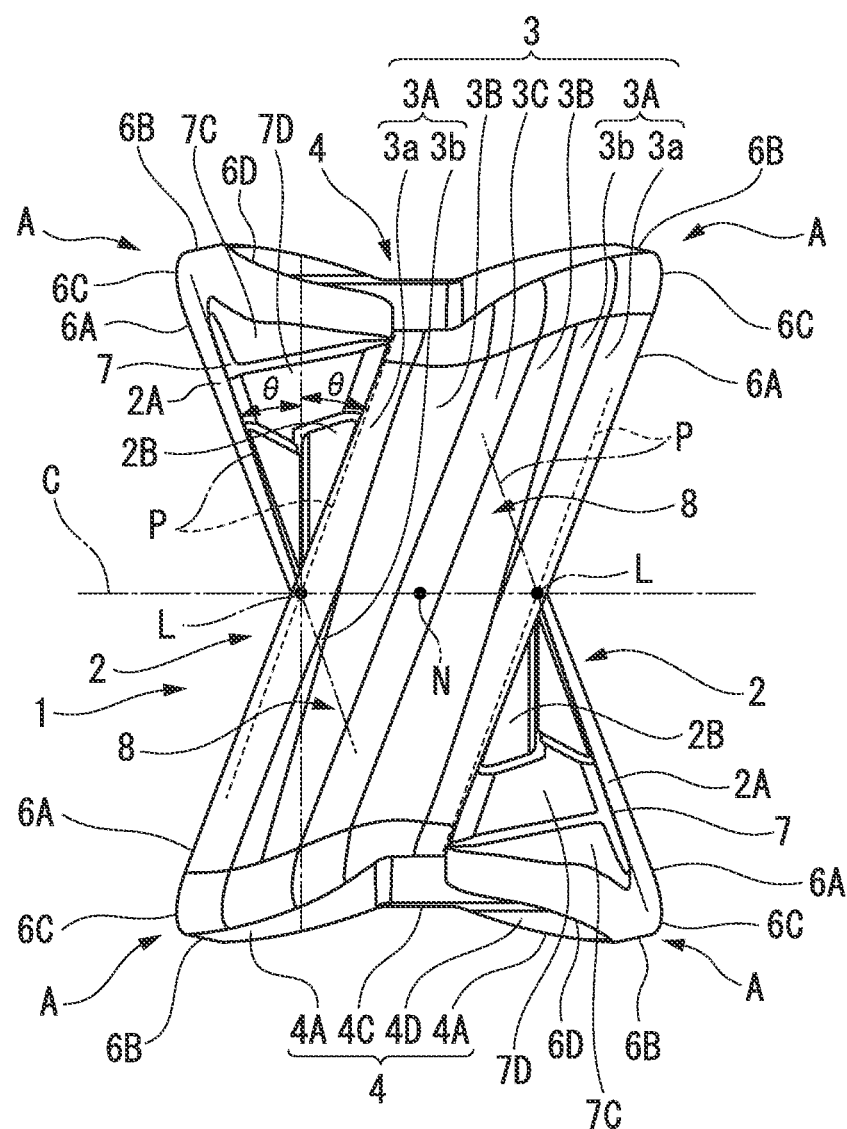
FIG. 30 is a side view of the embodiment shown in FIG. 28.
Figure 31:
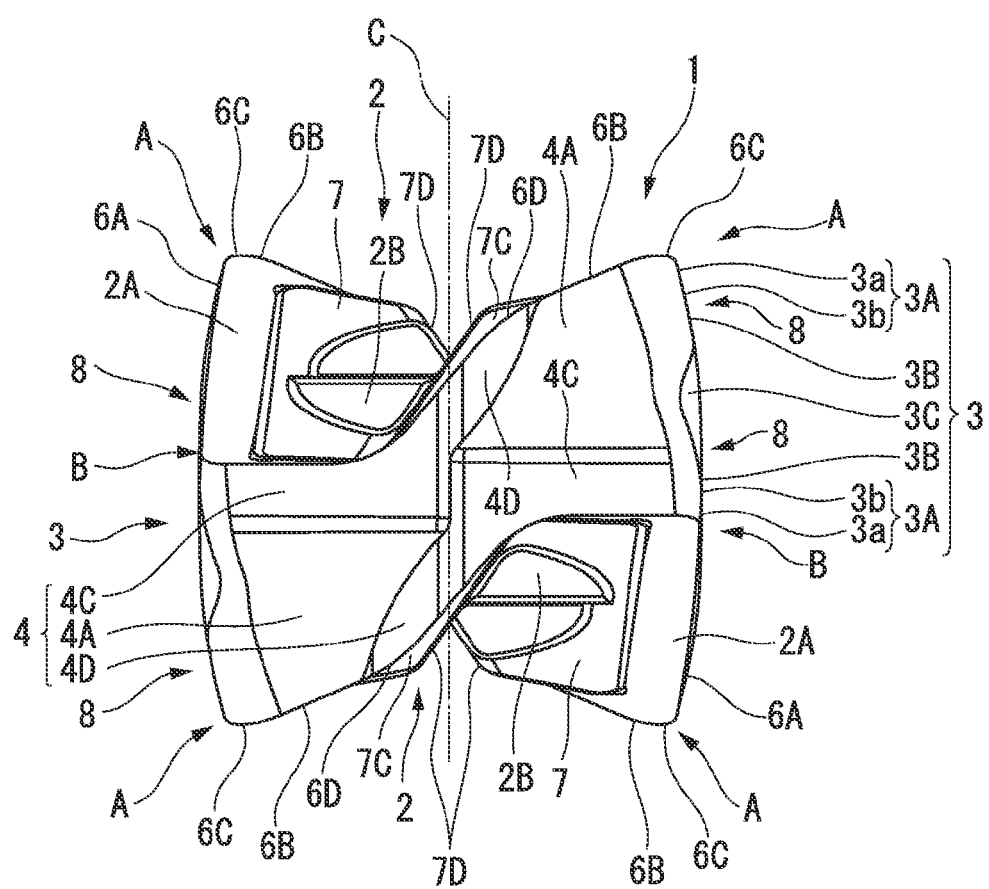
FIG. 31 is a front view which shows the embodiment shown in FIG. 28.
Figure 32:
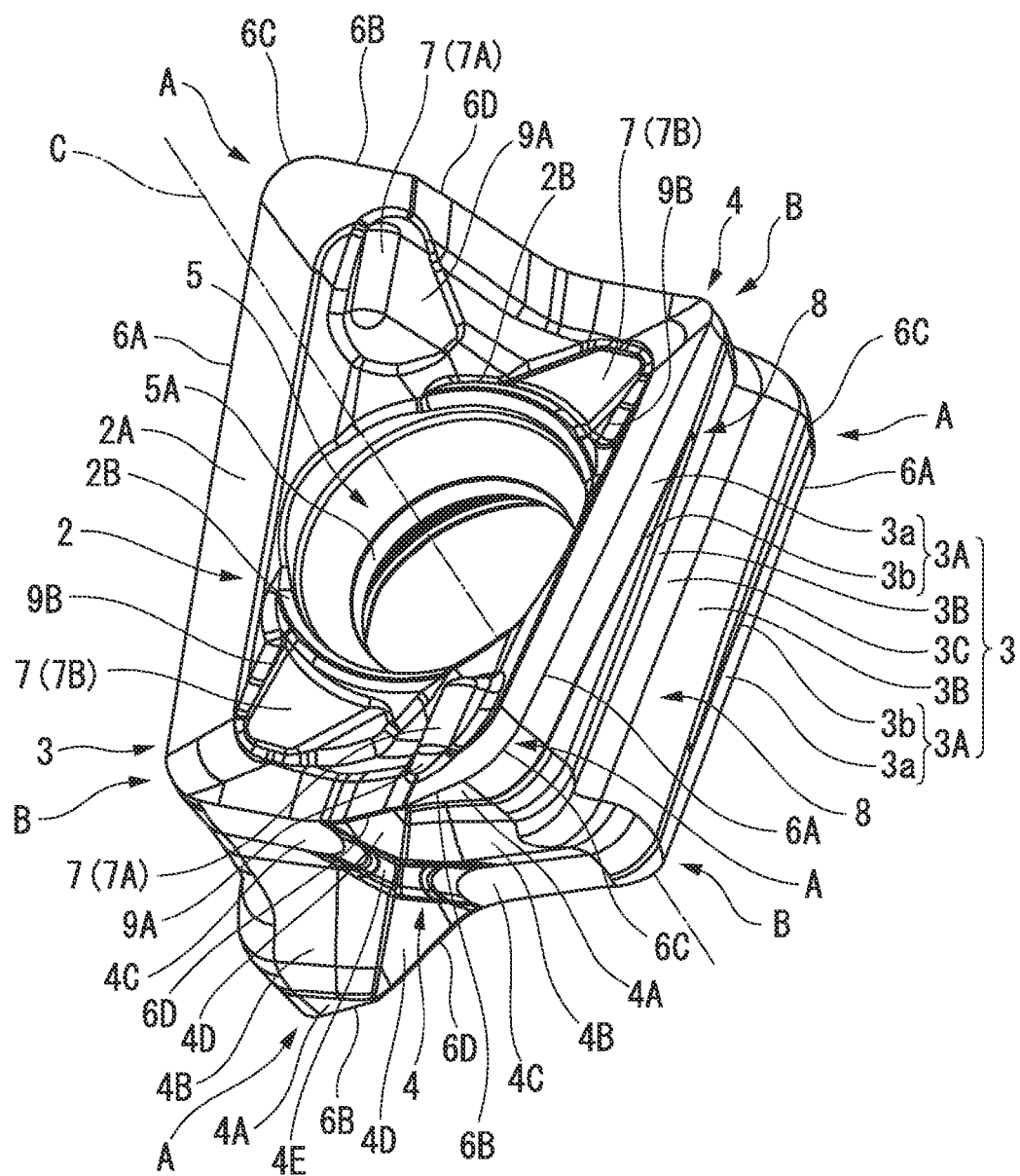
FIG. 32 is a perspective view of a cutting insert of a third embodiment of the present invention.
Figure 33:
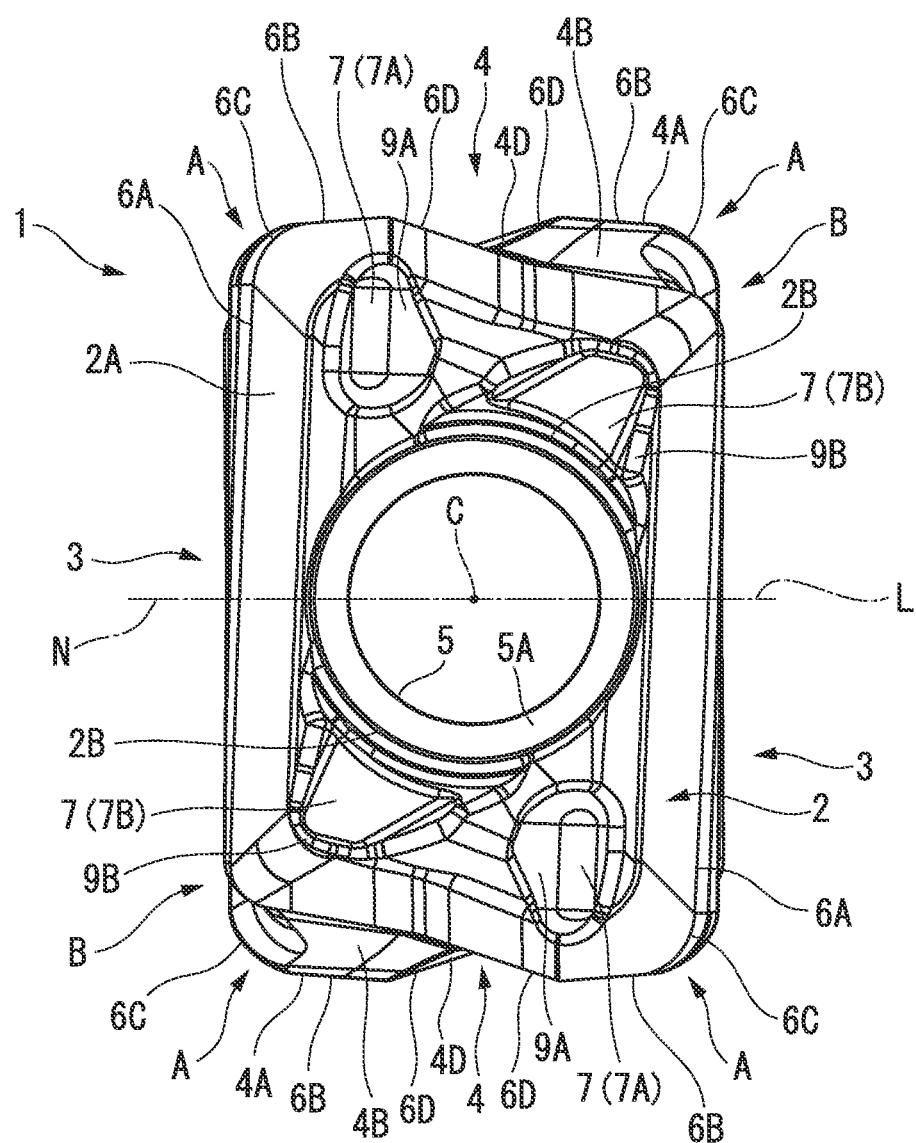
FIG. 33 is a plan view of the embodiment shown in FIG. 32.
Figure 34:
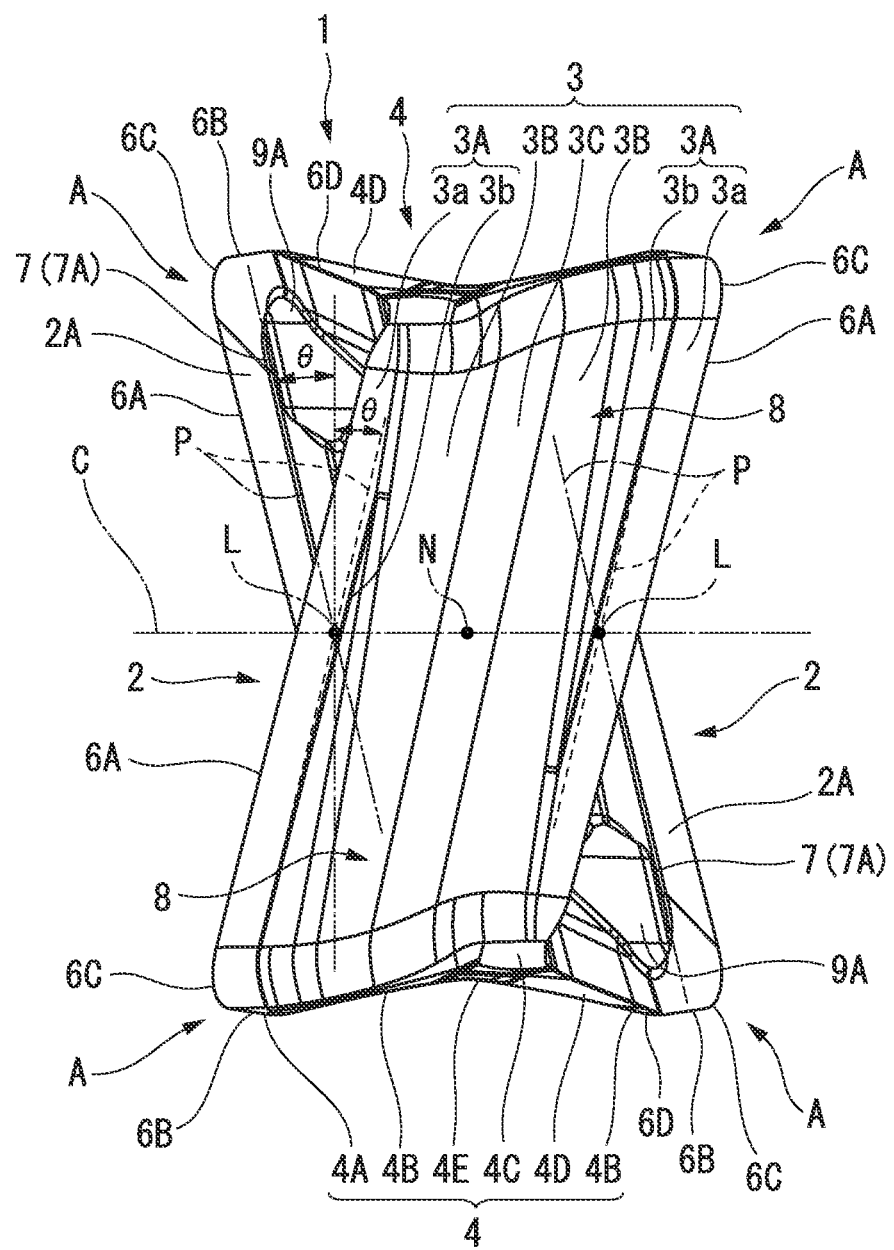
FIG. 34 is a side view of the embodiment shown in FIG. 32.

Therefore, in the above instance, as shown in FIG. 27, a convex curved surface portion 3B continuing to the major flank face 3A of the major cutting edge 6A at the acute angle corner portion A of one of the parallelogram faces 2 and a convex curved surface portion 3B continuing to the major flank face 3A of the major cutting edge 6A at the obtuse angle corner portion B of the other of the parallelogram faces 2 extend as they are. In this case, positions at which these convex curved surface portions 3B intersect each other in the longitudinal direction of the long side face 3 are deviated in the direction of the insert central line C. Therefore, in this case, a step is developed on the long side face 3, thus resulting in a failure of forming the long side face 3 smoothly. As described above, it is impossible to reliably keep substantially constant a flank angle β of the major flank face 3A over the entire length of the major cutting edge 6A where the insert main body 1 is attached to the tool main body 11. Thus, there is a fear that effects of reducing cutting resistance or others cannot be obtained with certainty.

Further, in the above case, there is a decrease in convex curved surface portion 3B continuing to the major flank face 3A of the major cutting edge 6A at the obtuse angle corner portion B. Moreover, depending on the case, there is a failure in forming the convex curved surface portion 3B at the obtuse angle corner portion B of the major cutting edge 6A. Therefore, accordingly, the contact portion 8 to be formed at the convex curved surface portion 3B becomes small or the contact portion 8 cannot be installed at the obtuse angle corner portion B. As a result, the area which is in contact with the contacted portion 20 is decreased. It may be, thereby, difficult to attach the insert main body 1 to the insert seat 13 stably.

On the other hand, if such an attempt is made that the major cutting edge 6A is formed at a ridge line portion between the twisted face-like major flank face 3A and the pair of parallelogram faces 2, while the width of the convex curved surface portion 3B is retained forcibly, it is necessary to change the curvature radius of the convex curved surface portion 3B in the longitudinal direction of the long side face 3 or to form the convex curved surface portion 3B in itself and the contacted portion 20 in the shape of a twisted face, depending on the case. As a result, there is a fear that the contact portion 8 of the insert main body 1 and the contacted portion 20 of the insert seat 13 will be complicated in shape.

In contrast, in the above-constituted cutting insert, as shown in FIG. 2 and FIG. 24, a pair of parallelogram faces 2 are formed as twisted by being slightly rotated around the insert central line C. Thereby, when the parallelogram face 2 is viewed from the front thereof, the major cutting edges 6A deviate from each other on the pair of parallelogram faces 2. That is, as shown in FIG. 24, when the parallelogram face 2 is viewed from the front thereof along the insert central line C, on each of the pair of parallelogram faces 2, the obtuse angle corner portion B of the other of the parallelogram faces 2 protrudes slightly outside the insert main body 1 from the major cutting edge 6A at the acute angle corner portion A of one of the parallelogram faces 2. In other words, a pair of long side ridge portions of the long side face 3 at which the major cutting edge 6A is formed are allowed to intersect with each other in such a manner that the obtuse angle corner portion (the other of the corner portions) B at one of the long side ridge portions protrudes outside the other of the long side ridge portions.

Therefore, in the thus constituted cutting insert, the major flank face 3A which is formed in the shape of a twisted face from the acute angle corner portion A to the obtuse angle corner portion B protrudes gradually less toward the outside of the insert main body 1 at the center of the long side face 3 in the direction of the insert central line C. However, at the obtuse angle corner portion B, the major cutting edges 6A are allowed to intersect with each other when seen in the direction of the insert central line C in such a manner that the major cutting edge 6A in itself protrudes slightly outside the insert main body 1 with respect to the major cutting edge 6A at the acute angle corner portion A on the opposite side of the parallelogram face 2. It is, therefore, possible to make positions at which the ridge lines between the major flank faces 3A and the convex curved surface portions 3B on both sides of the pair of parallelogram faces 2 protrude outside the insert main body 1 substantially equal to each other.

Therefore, the above-constituted cutting insert can be formed in such a manner that the major flank face 3A, the convex curved surface portion 3B and the recessed curved surface portion 3C are allowed to continue smoothly without developing, for example, a, on the long side face 3A and a flank angle with respect to the major cutting edge 6A of the major flank face 3A reliably increases in a positive angle side from the acute angle corner portion A to the obtuse angle corner portion B. Moreover, a flank angle β can be kept substantially constant, with the cutting insert attached to the tool main body 11, as described above. It is, therefore, possible to sufficiently secure a flank amount of the major cutting edge 6A and obtain the above-described effects of, for example, reducing the cutting resistance without fail.

Further, due to the above-described configuration, according to the cutting insert of the present embodiment, the contact portion 8 formed on the long side face 3 is allowed to be in contact with the contacted portion 20 formed on the wall face 15 of the insert seat 13 and attached thereto. In this case, as described above, even if the curvature radius of the convex curved surface portion 3B is kept substantially constant in the longitudinal direction of the long side face 3, it is possible to prevent the convex curved surface portion 3B from being excessively decreased in width at the obtuse angle corner portion B or to prevent a failure of installing the convex curved surface portion 3B. It is, thereby, possible to secure a contact area between the contact portion 8 and the contacted portion 20 and realize stable attachment to the insert seat 13. Further, there is no chance that the contact portion 8 of the insert main body 1 or the contacted portion 20 of the insert seat 13 is complicated in shape.

Still further, in the present embodiment, as described above, whereas the pair of parallelogram faces 2 are twisted around the insert central line C, the major cutting edge 6A and the minor cutting edge 6B which continue via the corner edge 6C are arranged in a direction intersecting at an obtuse angle when the parallelogram face 2 is viewed from the front thereof. Therefore, the minor cutting edge 6B of the other of the parallelogram faces 2 used as a seating face which faces the tip of the tool main body 11 inclines downward toward the rear side end of the tool main body 11, when moving to the inner circumference side of the tool main body 11 with respect to a flat face perpendicular to the axis line O at which placed is the minor cutting edge 6B of one of the parallelogram faces 2 used as a rake face which is arranged at the tip side of the tool main body 11 and used for cutting. It is, therefore, possible to reliably prevent the minor cutting edge 6B of the other of the parallelogram faces 2 from interfering with a finished face formed by the minor cutting edge 6B of one of the parallelogram faces 2. Thereby, it is possible to increase the accuracy of the finished face and also carry out ramping in which, for example, the tool main body 11 is fed in the direction of the axis line O as well to drill a workpiece obliquely.

In addition, in the present embodiment, the major cutting edge 6A is formed in such a manner as to incline downward from the acute angle corner portion A to the obtuse angle corner portion B with respect to the direction of the insert central line C and incline toward the other of the parallelogram faces 2 on the opposite side of the parallelogram face 2 on which the major cutting edge 6A is formed. As described above, the thread hole 14A formed on the base 14 of the insert seat 13 is slightly inclined toward the rear end side of the tool main body 11, when moving toward a hole bottom (at the rear end of the tool rotating direction T). Thereby, even where the insert main body 1 is attached so as to move to the rear end side of the tool main body 11, with the insert central line C also pointed at the parallelogram face 2 used as a seating face, it is possible to give a positive axial rake angle to the major cutting edge 6A used for cutting. Therefore, the insert main body 1 is attached in a state of being inclined, by which the minor cutting edge 6B of the parallelogram face 2 used as a seating face at the tip of the tool main body 11 is allowed to incline downward with respect to the flat face at which the minor cutting edge 6B used for cutting is placed. It is, therefore, possible to more reliably prevent interference with a finished face and also smoothly carry out ramping.

As shown in FIG. 24, a deviation angle γ between the pair of parallelogram faces 2 which are deviated as being twisted by rotation around the insert central line C is desirably in a range of 1° to 10°. Where the deviation angle γ is 1° or smaller, there is a fear that the above-described effects will not be obtained. On the other hand, where the angle is in excess of 10°, there is a fear that the obtuse angle corner portion B placed at the outer circumference side of the tool main body 11 on the other of the parallelogram faces 2 used as a seating face will interfere with a worked face of a workpiece formed by a major cutting edge 6A of one of the parallelogram faces 2 used as a rake face.

Further, when the pair of parallelogram faces 2 are twisted as described above and the parallelogram face 2 is viewed from the front thereof and where the pair of side ridge portions of the long side face 3 on which the major cutting edge 6A is formed are allowed to intersect with each other in such a manner that an obtuse angle corner portion B of one of the side ridge portions protrudes outside the other of the side ridge portions, the imaginary straight line L of the cutting insert is in a strict sense to be orthogonal to an imaginary long side face which is perpendicular to the symmetrical line N and circumscribed by an obtuse angle corner portions B of a pair of side ridge portions also when the parallelogram face 2 is viewed from the front thereof.

However, in the present embodiment, when the parallelogram face 2 is viewed from the front thereof, the imaginary straight line L of the cutting insert extends in a direction orthogonal to the long side face 3 or the imaginary long side face and overlaps on the symmetrical line N. It is also acceptable that the imaginary straight line L of the cutting insert inclines within a range of ±10° with respect to the symmetrical line N.

Further, as shown in FIG. 18, on a cross section orthogonal to the axis line O of the tool main body 11, a radial rake angle α of the major cutting edge 6A is desirably in a range of 0° to 20°. Still further, as shown in FIG. 18, the major flank face 3A is constituted with a first major flank face 3a in a convex circular arc shape and continuing to a major cutting edge 6A on a cross section orthogonal to the axis line O of the tool main body 11 and a second major flank face 3b having a straight line cross section continuing to the center of the first major flank face 3a in the direction of the insert central line C. In this case, it is desirable that a flank angle β1 of the first major flank face 3a formed by a tangent line in contact with the convex circular arc at a position of the major cutting edge 6A is in a range of 0° to 15°, a flank angle β2 of the second major flank face 3b is in a range of β1 to β1+20°, a radius R of the convex circular arc formed by a cross section of the first major flank face 3a is in a range of D/2 to 2×D with respect to an axis-line O-relative outer diameter (diameter) D of the major cutting edge 6A used for cutting of the cutting insert which is attached to the tool main body 11, and a width W of the first major flank face 3a is in a range of 0.03×D–0.15×D.

Further, in the above-constituted cutting insert, the insert main body 1 is formed in the shape of having front-back inversion symmetry which is 180° rotationally symmetrical with respect to the line of symmetry N passing through the center of the long side face 3 which is at least one side face in the present embodiment, and a major cutting edge 6A is formed at each of the pair of long side ridge portions of the long side face 3 intersecting with each of the pair of parallelogram faces 2. Therefore, the insert main body 1 is rotated reversely around the symmetrical line N and attached again to the insert seat 13, by which each of the pair of parallelogram faces 2 can be used as a rake face and a seating face alternately. Moreover, the major cutting edge 6A can be used at least twice in one insert main body 1.

Further, in the present embodiment, the insert main body 1 is formed in the shape of a rectangle (parallelogram) plate which is 180° rotationally symmetrical with respect to the insert central line C having the above-described pair of long side faces 3 which are arranged on opposite sides from each other and a pair of short side faces 4 which are arranged on the opposite side from each other. The major cutting edge 6A is formed at a total of four long side ridge portions intersecting with the pair of long side faces 3 of each of the pair of parallelogram faces 2. Therefore, as described above, in addition to reverse rotation of the insert main body 1 around the symmetrical line N, the insert main body 1 is rotated reversely around the insert central line C and again attached to the insert seat 13, by which the major cutting edge 6A formed at each of the long side ridge portions can be used four times in total in one insert main body 1.

However, in the present embodiment, the pair of polygonal faces are the parallelogram faces 2 which are 180° rotationally symmetrical with respect to the insert central line C. The present invention is applicable to a regular polygonal plate-like cutting insert, for example, such a cutting insert that a pair of polygonal faces are formed in a square shape which is rotationally symmetrical at every 90° with respect to the insert central line C or such that the polygonal faces are formed in a regular triangle which has rotationally symmetrical at every 120°. In the above case, it is difficult to constitute the cutting insert with a contact surface 7 and a contacted surface 19 in an X-letter shape as will be described later. The contact portion 8 formed at least on one side face, of remaining side faces other than the side face on which the major cutting edge 6A used for cutting is formed, is allowed to be in contact with the contacted portion 20 formed on the wall face 15 of the insert seat 13, thus making it possible to attach the cutting insert stably.

Still further, in the present embodiment, a minor cutting edge 6B is formed so as to continue to a major cutting edge 6A via a corner edge 6C. The minor cutting edge 6B is also inclined toward the parallelogram face 2 on the opposite side of the parallelogram face 2 on which the minor cutting edge 6B is formed, with inclining downward from the corner edge 6C toward a location separating away from the corner edge 6C with respect to the direction of the insert central line C when the short side face 4 is viewed from the front thereof. Thereby, in order to give a positive or zero-degree flank angle to the major flank face 3A of the major cutting edge 6A used for cutting, the symmetrical line N passing through the center of the long side face 3 is placed further to the side of the tool rotating direction T than a straight line in parallel with the symmetrical line N and intersecting with the axis line O. Even in this case, it is possible to prevent the minor cutting edge 6B from being increased in radial rake angle to a negative angle, thereby giving a large radial rake angle toward substantially zero degrees and a positive angle side as described above. It is also possible to prevent an increase in cutting resistance by the minor cutting edge 6B.

On the other hand, the cutting insert of the present embodiment is a cutting insert which is attached in a detachable manner to an insert seat of an indexable insert-type cutting tool and constituted with any one of the following, as has been described in detail.

(A) A cutting insert which is attached in a detachable manner to an insert seat of an indexable insert-type cutting tool, the cutting insert is provided with a polygonal plate-like insert main body having a pair of polygonal faces and a plurality of side faces arranged at the periphery thereof, wherein a cutting edge is formed on a side ridge portion of the polygonal face, and the insert main body is formed in the shape of having front-back inversion symmetry with respect to the pair of polygonal faces, of the pair of polygonal faces, when one polygonal face is used as a rake face, the other polygonal face is used as a seating face which is seated on a base of the insert seat, a pair of contact surfaces disposed along each of a pair of imaginary flat faces of the cutting insert are formed on each of the pair of polygonal faces, the pair of contact surfaces are allowed to be individually in contact with a pair of contacted surfaces formed on the base of the insert seat, when the polygonal face on which the pair of contact surfaces are formed is used as the seating face, the pair of imaginary flat faces of the cutting insert on which the pair of contact surfaces are disposed individually include one imaginary straight line of the cutting insert for the polygonal face extending on the polygonal face on which the pair of contact surfaces are formed and are also arranged in a direction intersecting with each other in an X-letter shape, with setting the imaginary straight line of the cutting insert as an intersection point, when seen in a direction along the imaginary straight line of the cutting insert, on the insert main body, there is formed an attachment hole at the center of the insert central line orthogonal to the imaginary straight lines of the cutting insert of the pair of polygonal faces, the insert central line passing through the centers of the pair of the polygonal faces, and of the side faces of the insert main body, on one of the side faces with respect to one of the polygonal faces which faces one direction of two directions at which the imaginary straight line of the cutting insert of the pair of contact surfaces extends, there is formed a contact portion which is allowed to be in contact with a contacted portion formed on one wall face rising to the base of the insert seat.

(B) In the above description (A), the insert main body is formed in the shape of 180° rotationally symmetrical with respect to the insert central line orthogonal to the imaginary straight lines of the cutting insert of the pair of polygonal faces, and on one of the other side faces for the polygonal face which faces the other direction of two directions at which the imaginary straight line of the cutting insert extends, there is formed the other contact portion which is allowed to be in contact with the contacted portion when the insert main body is rotated 180° around the insert central line.

(C) In the above description (B), each of the polygonal faces of the insert main body is formed in a quadrilateral shape, the insert main body is provided with a pair of long side faces which are arranged so as to face to each other and a pair of short side faces which are arranged so as to face to each other, a major cutting edge is formed at the side ridge portion of each of the polygonal faces, the side ridge portion being a portion intersecting each of the polygonal faces and each of the long side faces, and the imaginary straight line of the cutting insert extends in a direction intersecting with each of the long side faces when the polygonal face is viewed from the front thereof, and the contact portion is formed on the long side face.

(D) In the above description (C), the major cutting edge formed at the side ridge portion of the polygonal face gradually inclines toward the other corner portion of the polygonal face from one corner portion thereof and gradually inclines toward the opposite side of the polygonal face with respect to a direction of the insert central line, when the long side face is viewed from the front thereof.

(E) In the above description (C) or (D), the polygonal face of the insert main body is formed in the shape of a parallelogram having a pair of obtuse angle corner portions and a pair of acute angle corner portions, a corner edge continuing to the major cutting edge is formed at the acute angle corner portion of each of the polygonal faces, a minor cutting edge continuing to the corner edge is formed at the acute angle corner portion of the side ridge portion of each of the polygonal faces, the side ridge portion being a portion intersecting each of the polygonal faces and each of the short side faces, and the imaginary straight line of the cutting insert extends in a direction orthogonal to the long side face when the polygonal face is viewed from the front thereof.

(F) In the above description (E), the major cutting edge formed at the side ridge portion of the polygonal faces gradually inclines toward the obtuse angle corner portion of the polygonal face which is formed like a parallelogram from the acute angle corner portion thereof and gradually inclines toward the opposite side of the polygonal face with respect to a direction of the insert central line, when the long side face is viewed from the front thereof.

(G) In the above description of any one of (A) to (F), the pair of contact surfaces are formed inside the polygonal face, with an interval kept with respect to the side ridge portion.

(H) In the above description of any one of (A) to (G), each of the pair of contact surfaces is provided with a plurality of contact surface portions which are arranged along the pair of imaginary flat faces of the cutting insert and spaced away from each other.

It is noted that in place of the above description (H), the following configurations may be adopted, as will be described later.

(I) In the above description of any one of (A) to (G), each of the pair of contact surfaces continues along the pair of imaginary flat faces of the cutting insert.

Further, the indexable insert-type cutting tool of the present embodiment has the following configurations.

(J) An indexable insert-type cutting tool which is provided with a tool main body rotated around an axis line and any one of the cutting inserts (A) to (I) which is attached in a detachable manner to an outer circumference of the tool main body, wherein one or more of the insert seats are formed on the tool main body in such a manner that the base faces in the tool rotating direction and one wall face rises to the base facing in the tool rotating direction;

each of the pair of contacted surfaces in contact with each of the pair of contact surfaces on the polygonal face which is used as the seating face of the cutting insert is formed on the base of the insert seat along a pair of imaginary flat faces of the insert seat;

each of the pair of imaginary flat faces of the insert seat includes one imaginary straight line of the insert seat extending over the base to intersect with the one wall face and, when the one wall face is viewed from the front thereof along the imaginary straight line of the insert seat, each of the pair of imaginary flat faces of the insert seat is arranged in a direction intersecting with each other in an X letter shape complementary to an X letter shape, which is formed by the pair of imaginary flat faces of the cutting insert of the polygonal face used as the seating face when seen in a direction along the imaginary straight line of the cutting insert; and on the one wall face of the insert seat, there is formed a contacted portion which is in contact with a contact portion of the cutting insert.

In the cutting insert and the indexable insert-type cutting tool of the present embodiment, as described above, the insert main body 1 is restricted and fixed by a pair of contacted surfaces 19 formed on the base 14 of the insert seat 13 and a contacted portion 20 which is formed on a wall face 15 which faces an outer circumference side of the tool main body 11. Moreover, a wall face 16 of the insert seat 13, which faces the tip of the tool main body 11, will not be involved in attachment of the cutting insert. That is, in one direction of directions at which the imaginary straight lines L of the cutting insert extend on one parallelogram face 2, in the present embodiment, only one contact portion 8 of one long side face 3 is allowed to be in contact with one contacted portion 20 on the wall face 15 of the insert seat 13.

Figure 9:
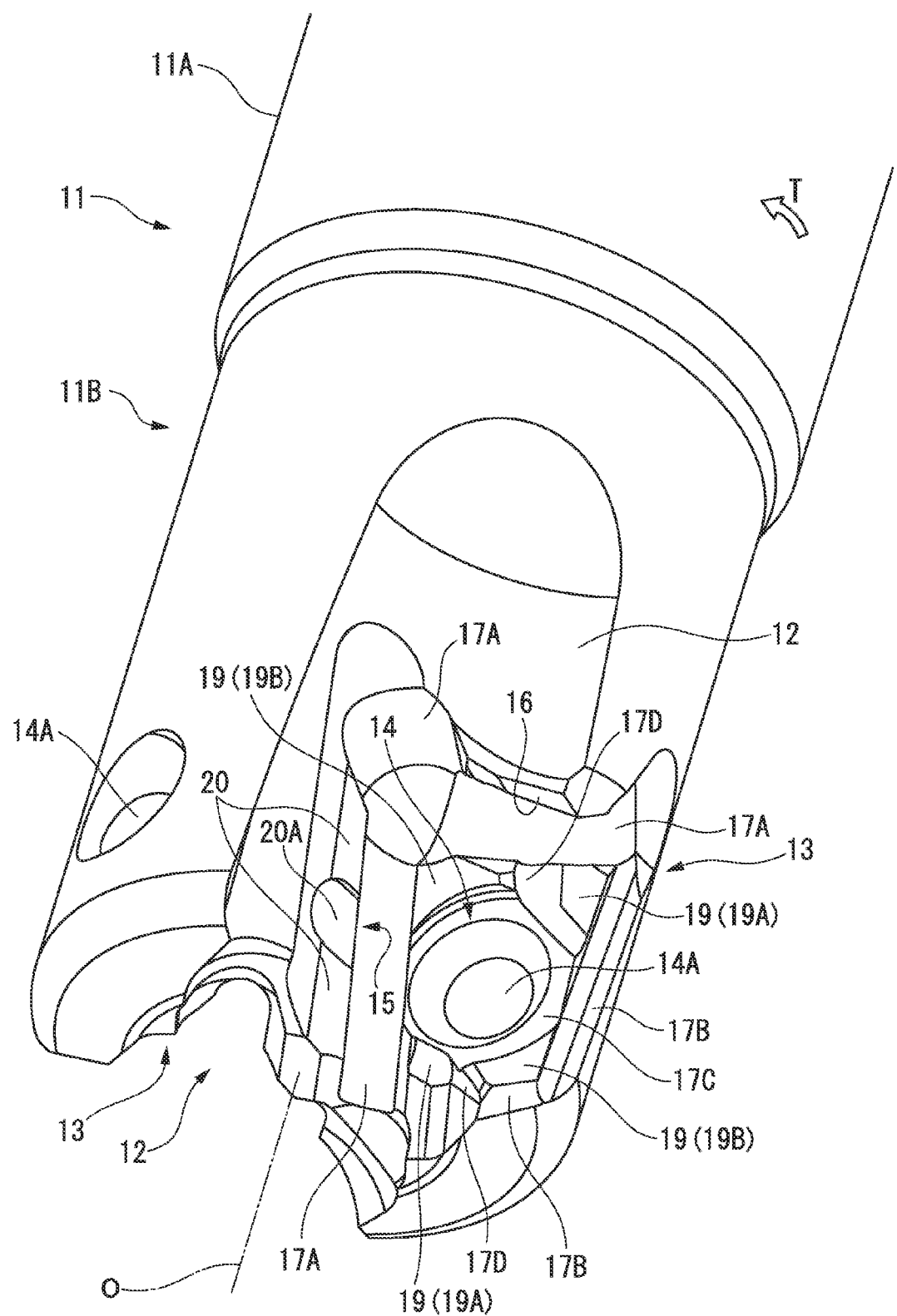
FIG. 9 is a perspective view of a tool main body in which the cutting insert is detached from the embodiment shown in FIG. 5.

Therefore, as shown in FIG. 9 to FIG. 11, a large chip pocket 12 is formed on the insert seat 13 at the rear end side of the tool main body 11. Thereby, no trouble will be caused on attachment of the cutting insert where the wall face 16 is decreased in dimension, as shown in FIG. 14, there is a space between the other of the short side faces 4 facing the rear end side of the tool main body 11 and the wall face 16, or depending on the case, the wall face 16 itself is not formed. As a result, it is possible to retain the cutting insert stably even on formation of the large chip pocket 12 and also to improve chip removing properties by the large chip pocket 12.

Further, in the indexable insert-type cutting tool of the embodiment shown in FIG. 5 to FIG. 17, only one insert seat 13 is formed at the cutting edge portion 11B of the tip portion of the tool main body 11 in a direction of the axis line O. However, the present invention is not limited thereto but able to provide a tool with multiple edges by forming one or a plurality of insert seats 13 at the rear end side of the insert seat 13. Even in this case, according to the cutting insert and the indexable insert-type cutting tool, as described above, the necessity of forming the wall face 16 at the rear end side of the insert seat 13 is eliminated. Thus, the insert seat 13 adjacent in the direction of the axis line O can be formed so as to be in close proximity.

For example, an insert seat 13 adjacent to the rear end side in the direction of the axis line O is formed so as to deviate rearward in a tool rotating direction T approximately by the thickness of an insert main body 1. Thereby, cutting inserts attached to an array of insert seats 13 can be used to form a cutting edge array having a continuous rotational locus of major cutting edges 6A. Therefore, it is possible to install a larger number of the above-described cutting edge arrays on one tool main body 11 and also improve the cutting efficiency.

Further, in the cutting insert of the present embodiment, as described previously, since the insert main body 1 is formed in the shape of having front-back inversion symmetry, the insert main body 1 can be rotated reversely and attached again to the insert seat 13. At this time, with regard to the parallelogram face 2 used as a new seating face, a contact portion 8 is formed at the convex curved surface portion 3B on the parallelogram face 2 used as a new rake face of a new long side face 3 placed on an inner circumference side of the tool main body 11 and allowed to be in contact with a contacted portion 20 on the wall face 15 of the insert seat 13. That is, as described above, the insert main body 1 is rotated in reverse, by which the contact portion 8 on the opposite side of the long side face 3 is allowed to be in contact with the contacted portion 20 on the wall face 15 of the insert seat 13.

Still further, in the present embodiment, as described above, the insert main body 1 is formed in the shape of 180° rotationally symmetrical with respect to the insert central line C as well. When the insert main body 1 is rotated 180° around the insert central line C and attached again, with regard to one of the other of the parallelogram faces 2 used as the seating face, in a direction at which the imaginary straight line L of the cutting insert extends, the contact portion 8 of the long side face 3 on the opposite side of the tip is allowed to be in contact with the contacted portion 20 on the wall face 15 of the insert seat 13. Therefore, when the insert main body 1 is rotated 180° around the insert central line C and attached to the insert seat 13 and when the insert main body 1 is attached, with the front and back faces being reversed, each of the contact portions 8 formed on a pair of convex curved surface portions 3B on the same long side face 3 is allowed to be in contact with the contacted portion 20.

That is, of the pair of parallelogram faces 2 on the front and back faces, one long side face 3, which faces one direction of the directions of the imaginary straight lines L of the cutting insert on one of the parallelogram faces 2, and one long side face 3, which faces the other direction of the directions of the imaginary straight lines L of the cutting insert on one of the other of the parallelogram faces 2, are the same long side face 3. The contact portion 8 is formed at each of the pair of convex curved surface portions 3B on the long side face 3.

In the cutting insert of the first embodiment, as described above, when the parallelogram face 2 is viewed from the front thereof, the imaginary straight line L of the cutting insert intersects with the long side face 3 of the insert main body 1, by which the contact portion 8 is formed on the long side face 3. Moreover, in the indexable insert-type cutting tool of one embodiment, the imaginary straight line M of the insert seat is allowed to intersect with the wall face 15 of the insert seat 13 which faces to an outer circumference side of the tool main body 11, thereby forming the contacted portion 20. It is acceptable that the imaginary straight line L of the cutting insert is allowed to intersect with a short side face 4 of the insert main body 1, thereby forming the contact portion 8 on the short side face 4, and at the insert seat 13 as well, the imaginary straight line M of the insert seat is allowed to intersect with the wall face 16 which faces to the tip of the tool main body 11, thereby forming the contacted portion 20 on the wall face 16.

In this case, the wall face 15 of the insert seat 13 which faces to the outer circumference side of the tool main body 11 is allowed not to be involved in attachment of the cutting insert. Therefore, the wall face 15 can be made smaller, the wall face 15 on the inner circumference side of the tool main body 11 can be reduced in thickness, a space is given between the wall face 15 and the long side face 3, or there is eliminated a necessity of the wall face 15 itself, depending on the case. Therefore, it is possible to secure a greater capacity of the chip pocket 12 on the inner circumference side of the insert seat 13 for improvement in chip removing properties. Even an indexable insert-type cutting tool with a very small diameter is provided with many insert seats 13 in a circumferential direction to have a larger number of cutting inserts, thus making it possible to enhance the cutting efficiency.

However, in particular, in a indexable insert-type cutting tool, or the end mill of the above-described embodiment, cutting loads acting on the inner circumference side of the tool main body 11 from the major cutting edge 6A facing the outer circumference side of the tool main body 11 become greater than cutting loads acting on the rear end side of the tool main body 11 from the minor cutting edge 6B arranged the tip side of the tool main body 11. Thus, in order to attach and keep the cutting insert more stably, it is desirable that greater cutting loads are received by the long side face 3 of the insert main body 1 capable of securing a larger contact area and by the contact portion 8 and the contacted portion 20 formed on the wall face 15 of the insert seat 13 which faces to the outer circumference side of the tool main body 11.

Further, in the cutting insert of the first embodiment, the pair of contact surfaces 7 are formed on a pair of imaginary flat faces P of the cutting insert intersecting with each other in an X-letter shape when seen along the imaginary straight line L of the cutting insert and individually disposed astride the imaginary straight line L of the cutting insert on both sides thereof. In the indexable insert-type cutting tool of the embodiment as well, the pair of contacted surfaces 19 of the insert seat 13 are formed on a pair of imaginary flat faces Q of the insert seat intersecting with each other in an X-letter shape complementary to the imaginary flat face P of the cutting insert, when seen along the imaginary straight line M of the insert seat, and also disposed astride the imaginary straight line M of the insert seat on both sides thereof.

Therefore, the contact surface 7 is allowed to be in contact with the contacted surface 19 on both sides of the imaginary straight line L of the cutting insert and the imaginary straight line M of the insert seat, thus making it possible to align the imaginary straight line L of the cutting insert with the imaginary straight line M of the insert seat at high accuracy. Accordingly, it is possible to improve attachment accuracy of the insert main body 1 to the insert seat 13 and also facilitate highly accurate cutting. Further, since the pair of contact surfaces 7 disposed in the above-described X-letter shape are supported by the pair of contacted surfaces 19 on both sides of the imaginary straight line L of the cutting insert, it is possible to improve attachment stability of the insert main body 1.

Further, in the cutting insert of the present embodiment, whereas the contacted portion 20 formed on the wall face 15 of the insert seat 13 is, as described above, formed in the shape of an inclined flat face, the contact portion 8 of the insert main body 1 is formed to give a convex curved surface portion 3B which extends in the longitudinal direction of the long side face 3 and has a cross section constant in curvature radius. Thus, for example, even when the insert main body 1 is attached in a slightly inclined manner around the symmetrical line extending substantially in parallel with the long side face 3 due to, for example, manufacturing errors, the inclination is found along the curvature of the convex curved surface portion 3B. Therefore, the contact portion 8 is allowed to be reliably in contact with the contacted portion 20.

Still further, in the cutting insert of the first embodiment, each of the contact surfaces 7 is constituted with a plurality of contact surface portions 7A, 7B which are spaced away from each other along the imaginary flat face P of the cutting insert. Therefore, for example, in a case where the insert main body 1 is small in dimension, resulting in a limited area of the pair of parallelogram faces 2 and even where, as described in the present embodiment, an attachment hole 5 for fixing the insert main body 1 on the insert seat 13 is opened on a parallelogram face 2, each of the pair of contact surfaces 7 (contact surface portions 7A, 7B) can be arranged reliably on both sides of the imaginary straight line L of the cutting insert. Thereby, the above-described insert main body 1 can be improved in attachment accuracy and attachment stability.

However, where a large area can be secured on a parallelogram face 2 due to a large dimension of the insert main body 1, as found in the cutting insert of a second embodiment of the present invention shown in FIG. 28 to FIG. 31, it is acceptable that each of the pair of contact surfaces 7 is formed continuously along the pair of imaginary flat faces P of the cutting insert. In the second embodiment, components corresponding to those of the first embodiment will be given the same reference numerals, and an explanation thereof will be omitted here.

In the cutting insert of the second embodiment, each of the pair of contact surfaces 7 continuing to the inside of the positive rake face 2A on the pair of parallelogram faces 2 of the insert main body 1 is formed so as to run along a major cutting edge 6A formed on each of the pair of long side ridge portions, when the parallelogram face 2 is viewed from the front thereof. These contact surfaces 7 also gradually incline downward to an obtuse angle corner portion B of the parallelogram face 2 from an acute angle corner portion A thereof with respect to the direction of the insert central line C in compliance with inclination of an adjacent major cutting edge 6A, as with the first embodiment.

It is noted that a step face 7C is formed between a part protruding in a direction of the insert central line C and a part inclining downward in a direction of the insert central line C on the contact surfaces 7 with each other. Further, at a part of the acute angle corner portion A where the contact surface 7 protrudes in the direction of the insert central line C, a step face 7D is formed also between the positive rake face 2A and the part. On the other hand, on a side where the contact surface 7 inclines downward in the direction of the insert central line C, as with the first embodiment, a boss portion 2B is formed between an opening part of the attachment hole 5 and the side. Further, in the second embodiment, from a minor cutting edge 6B on a short side face 4, only a first minor flank face 4A, which inclines downward while forming a convex curved surface toward inside in the direction of the insert central line C, is formed and allowed to intersect with a negative face 4C, without formation of a second minor flank face 4B. It is noted that a ramping flank face 4D is formed on a ramping edge 6 so as to continue.

The above-described cutting insert of the second embodiment also can be attached to the insert seat 13 formed on the tool main body 11 of the indexable insert-type cutting tool of one embodiment. In this case, since each of the pair of contacted surfaces 19 of the insert seat 13 is constituted with a plurality of contacted surface portions 19A, 19B which are spaced away from each other, the contact surface 7 is contacted at a plurality of sites which are spaced away from each other.

However, it is acceptable that where a large area can be secured at the base 14 of the insert seat 13, the pair of contacted surfaces 19 are those that are continued along the imaginary flat face Q of the insert seat. On attachment of the cutting insert of the second embodiment to the insert seat 13, a contact area between the cutting insert and the insert seat can be increased to further improve the attachment stability. It is also acceptable that the cutting insert of the first embodiment is attached to the insert seat 13 having the contacted surface 19 which continues in the above-described manner.

Moreover, in a indexable insert-type cutting tool to which the above-described cutting insert is attached, in particular, in a indexable insert-type end mill, not in a case where the tool main body 11 is fed in a direction perpendicular to the axis line O to carry out ordinary groove machining etc., but in a case where the above-described tool main body 11 is fed in a direction of the axis line O as well to carry out ramping performing an oblique drilling of a workpiece, of a side ridge portion intersecting with the short side face 4 of the parallelogram face 2 used as a rake face which faces the tip side of the tool main body 11, a side ridge portion continuing to the opposite side of the corner edge 6C of the minor cutting edge 6B used for cutting is to be used for cutting as a ramping edge 6D.

However, where a side ridge portion continuing to the opposite side of the corner edge 6C of the minor cutting edge 6B is used as the ramping edge 6D, and if a ramping flank face 4D continuing to the ramping edge 6D on the short side face 4 is a negative flank face in parallel with the insert central line C as found in the first embodiment, it is impossible to secure a great flank angle of the ramping flank face 4D with respect to a rotational locus of the ramping edge 6D around the axis line O of the tool main body 11. Thus, depending on the feed speed in the direction of the axis line O, a worked face formed on a workpiece by the ramping edge 6D is interfered by the ramping flank face 4D, thus resulting in a fear that cutting resistance will be increased or the ramping flank face 4D will wear out.

Therefore, in the above case, as with the cutting insert of a third embodiment shown in FIG. 32 to FIG. 35, it is desirable that, of short side face 4, the ramping flank face 4D continuing to the ramping edge 6D is spaced away from the ramping edge 6D and inclined so as to gradually incline downward toward inside the insert main body 1 while the ramping flank face 4D becoming close to the parallelogram face 2 on the opposite side of the parallelogram face 2 on which the ramping edge 6D is formed. In this case, in the third embodiment shown in FIG. 32 to FIG. 35 as well, components corresponding to those of the first embodiment shown in FIG. 1 to FIG. 4 are given the same reference numerals.

In the cutting insert of the third embodiment, the pair of parallelogram faces 2 and the pair of long side faces 3 are constituted in the same manner as those of the first embodiment but the pair of short side faces 4 are constituted to be different from those of the first embodiment and second embodiment. A first minor flank face 4A continuing to a minor cutting edge 6B is parallel with the insert central line C. A ridge line portion between the first minor flank face 4A and a second minor flank face 4B extends in a direction substantially perpendicular to an insert central line C, when seen in a lateral view in which the short side face 4 is viewed from the front thereof.

Further, a ramping flank face 4D is spaced away from a ramping edge 6D to which the ramping flank face 4D continues and gradually incline downward toward inside the insert main body 1 by being recessed while the ramping flank face 4D becoming close to the other parallelogram face 2 on the opposite side of the parallelogram face 2 on which the ramping edge 6D is formed in a direction of the insert central line C. In the third embodiment, an inclination angle at which the ramping flank face 4D inclines downward is kept substantially constant on a cross section orthogonal to the ramping edge 6D. Thereby, the ramping flank face 4D is inclined downward toward inside the insert main body 1 while the ramping flank face 4D becoming close to the parallelogram face 2 on the opposite side also on a cross section orthogonal to the ramping edge 6D when the parallelogram face 2 is viewed from the front thereof along the insert central line C.

Figure 35:
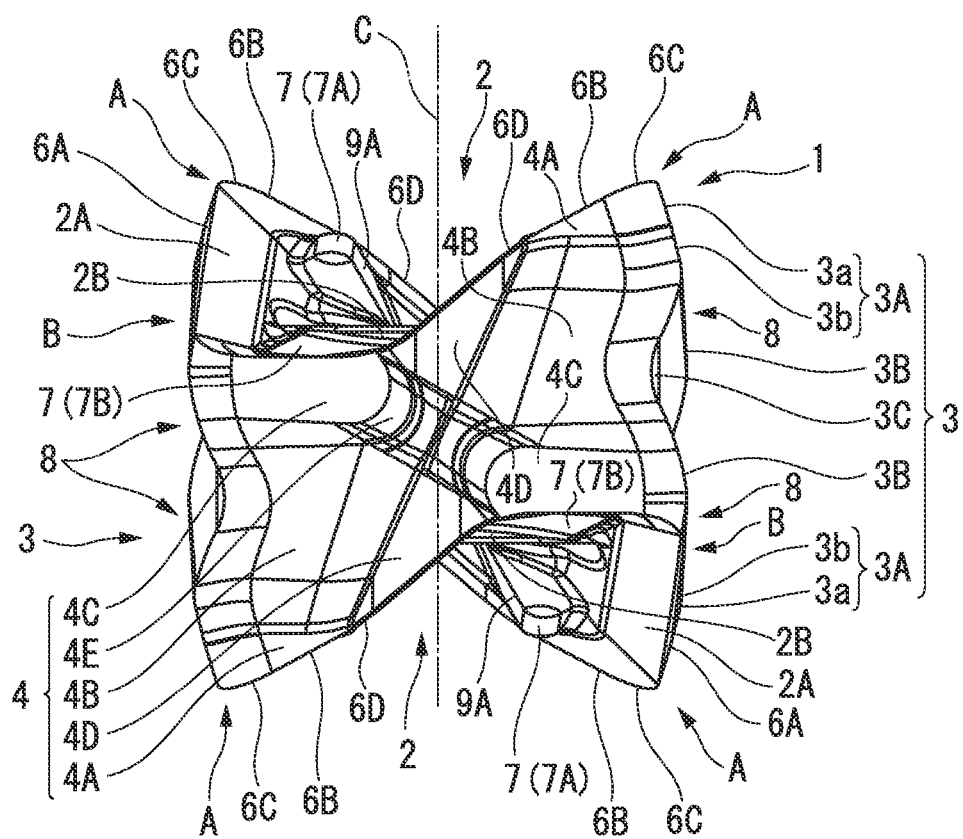
FIG. 35 is a front view of the embodiment shown in FIG. 32.

Further, a ridge line portion between the ramping flank face 4D and the second minor flank face 4B is inclined so as to move in the insert central line C when moving from an intersection point of the ramping edge 6D with the minor cutting edge 6B toward the opposite side of the parallelogram face 2 as shown in FIG. 35, when seen in a lateral view in which the short side face 4 is viewed from the front thereof. Ridge line portions between the ramping flank faces 4D on both sides of the pair of parallelogram faces 2 and the second minor flank faces 4B are formed to be a substantially straight line when seen in the lateral view. A recessed curved surface portion 4E which is recessed inside the insert main body 1 is formed between a pair of ramping flank faces 4D which are formed on one short side face 4. A recessed curved surface portion 4E extends in a direction orthogonal to a ridge line portion between the ramping flank face 4D and the second minor flank face 4B in such a manner as to connect a pair of negative faces 4C which are also formed on one short side face 4, when seen in a lateral view in which the short side face 4 is viewed from the front thereof.

According to the above-described cutting insert of the third embodiment, where the insert seat 13 is attached so as to move toward the rear end side of the tool main body 11 while the insert central line C becoming close to the parallelogram face 2 used as a seating face at an inclination equal to that of the first embodiment, as compared with a case that the ramping flank face 4D extends in parallel with the insert central line C as found in the first embodiment, the ramping flank face 4D which is a part of the short side face 4 continuing to the ramping edge 6D can largely escape with respect to the rotational locus of the ramping edge 6D. Therefore, it is possible to reliably prevent the ramping flank face 4D from interference with a workpiece on ramping. It is possible to prevent an increase in cutting resistance and wear of the ramping flank face 4D resulting from the interference and to carry out ramping more smoothly.

In the first embodiment to third embodiment, the short side face 4 is not involved in attachment of an insert. Therefore, where the minor cutting edge 6B and the corner edge 6C which are formed at a ridge line portion between the first minor flank face 4A of the short side face 4 and a pair of parallelogram faces 2 are different in shape and dimension, they can be attached to the insert seat 13 as they are. Therefore, as described above, where a plurality of insert seats 13 are formed in the direction of the axis line O, a cutting insert to be attached at the leading tip of the insert seat 13 is attachable also as a cutting insert in which, for example, a first and a second minor flank faces 4A, 4B come out to a greater amount in the longitudinal direction to form a corner edge 6C greater in radius. That is, a plurality of cutting inserts, each of which has a corner edge 6C different in radius, can be attached to one tool main body 11. Thus, even where a corner with a different radius is formed when a shoulder milling is performed, a cutting insert at the leading tip is only exchanged to a corner edge 6C with a radius corresponding to the above radius, by which side milling can be carried out using one tool main body 11.

A description has been so far given of the embodiments of the present invention. Individual configurations and a combination thereof shown in the embodiments are just examples. The present invention may be subjected to addition of the configuration, omission, replacement and other modifications within a scope not departing from the gist of the present invention. The present invention shall not be restricted to the above description but will be restricted only by the scope of the attached claims.

INDUSTRIAL APPLICABILITY

As described so far, according to the cutting insert and the indexable insert-type cutting tool of the present invention, even when a pair of flank faces formed on a side face of an insert main body are formed in the shape of a twisted face, a step can be prevented from developing at a space between flank faces to form the side face smoothly, thereby securing a sufficient flank amount over an entire length of a cutting edge. Further, where the side face is supported on a wall face of an insert seat, the cutting insert can be attached stably. Thus, industrial applicability can be attained.

DESCRIPTION OF THE REFERENCE SIGNS

1: insert main body
2: parallelogram face
2A: positive rake face
3: long side face
3A: major flank face
3a: first major flank face
3b: second major flank face
3B: convex curved surface portion 3C: recessed curved surface portion
4: short side face
4A: first minor flank face
4B: second minor flank face
4C: negative face
4D: ramping flank face
5: attachment hole
6A: major cutting edge
6B: minor cutting edge
6C: corner edge
6D: ramping edge
7: contact surface
7A, 7B: contact surface portion
8: contact portion
11: tool main body
13: insert seat
14: base of insert seat 13
14A: thread hole
15, 16: wall face of insert seat 13
18: clamp screw
19: contacted surface
19A, 19B: contacted surface portion
20: contacted portion
A: acute angle corner portion (one of the corner portions)
B: obtuse angle corner portion (the other of the corner portions)
C: insert central line
L: imaginary straight line of the cutting insert
M: imaginary straight line of the insert seat
N: symmetrical line passing through the center of long side face 3
P: imaginary flat face of the cutting insert
Q: imaginary flat face of the insert seat
O: axis line of tool main body 11
T: tool rotating direction

What is claimed is:

1. A cutting insert which is attached in a detachable manner to an insert seat of an indexable insert-type cutting tool, the cutting insert comprising:
a polygonal plate-like insert main body having a pair of polygonal faces and a plurality of side faces arranged on the periphery of the pair of polygonal faces,
wherein of the pair of polygonal faces, one polygonal face is used as a rake face and the other polygonal face is used as a seating face seated on a base of the insert seat;
a cutting edge is formed on each of a pair of side ridge portions of at least one of the side faces, the pair of side ridge portions being a portion intersecting the side face and the pair of polygonal faces;
the insert main body is formed in the shape of having front-back inversion symmetry which is 180° rotationally symmetrical with respect to a line of symmetry passing through the center of at least one of the side faces;
on at least one of the side faces, a flank face adjacent to the cutting edge is formed on the side face in the vicinity of each of the pair of polygonal faces, when the pair of polygonal faces are used as rake faces;
each of the flank faces is formed in the shape of a twisted face in which a flank angle with respect to the cutting edge gradually increases in a positive angle side while each of the flank faces becoming close to a second corner portion from a first corner portion, the first corner portion and the second corner portion being alternately located in a circumferential direction of the pair of polygonal faces in at least one of the side faces; and the pair of side ridge portions of the side face on which the cutting edge is formed intersect each other in such a manner that the second corner portion of one side ridge portion protrudes outside the other side ridge portion, in a top view of the cutting insert.

2. The cutting insert according to claim 1, wherein
each of the polygonal faces of the insert main body is formed in a rectangular shape;
the insert main body is provided with a pair of long side faces arranged so as to face each other and a pair of short side faces arranged so as to face each other;
a major cutting edge is formed at each of the pair of side ridge portions of the pair of long side faces, each of the pair of side ridge portions being a portion intersecting the pair of long side faces and the pair of polygonal faces; and
each flank face adjacent to the major cutting edges is formed in the shape of a twisted face and the pair of side ridge portions on which the major cutting edge is formed intersect each other in the top view of the cutting insert.

3. The cutting insert according to claim 2, wherein
the major cutting edge gradually slopes downward toward the second corner portion of the polygonal face from the first corner portion thereof with respect to a direction of an insert central line passing through the centers of the pair of polygonal faces, and inclines toward the other polygonal face on the opposite side of the polygonal face on which the major cutting edge is formed, when the long side face is viewed.

4. The cutting insert according to claim 2, wherein
the polygonal face of the insert main body is formed in the shape of a parallelogram which has a pair of obtuse angle corner portions and a pair of acute angle corner portions;
a corner edge continuing to the major cutting edge is formed at each of the acute angle corner portions on each of the polygonal faces;
a minor cutting edge continuing to the corner edge is formed at each of the acute angle corner portions of a side ridge portion of each of the polygonal faces, the side ridge portion being a portion intersecting each of the polygonal faces and each of the short side faces;
the flank face is formed in the shape of a twisted face in which a flank angle with respect to the major cutting edge gradually increases in a positive angle side while the flank face becoming close to the obtuse angle corner portion from the acute angle corner portion; and
the pair of side ridge portions on which the major cutting edge is formed intersect each other in such a manner that the obtuse angle corner portion of one side ridge portion protrudes outside the other side ridge portion in the top view of the cutting insert.

5. The cutting insert according to claim 4, wherein
the major cutting edge gradually slopes downward toward the obtuse angle corner portion of the polygonal face formed in the shape of a parallelogram from the acute angle corner portion thereof with respect to a direction of the insert central line passing through the centers of the pair of polygonal faces, and inclines so as to move toward the other polygonal face on the opposite side of the polygonal face on which the major cutting edge is formed, when the long side face is viewed.

6. The cutting insert according to claim 4, wherein
the minor cutting edge gradually slopes downward from the corner edge toward a location separating from the corner edge with respect to the direction of the insert central line passing through the centers of the pair of polygonal faces, and inclines toward the other polygonal face on the opposite side of the polygonal face on which the minor cutting edge is formed, when the short side face is viewed.

7. The cutting insert according to claim 4, wherein
of the side ridge portion of each of the polygonal faces, the side ridge portion being a portion intersecting each of the polygonal faces and each of the short side faces, a part continuing to the opposite side of the corner edge of the minor cutting edge is used as a ramping edge, and
of the short side face, a part continuing to the ramping edge gradually inclines toward inside the insert main body while the part extending away from the ramping edge and becoming close to the other polygonal face on the opposite side of the polygonal face on which the ramping edge is formed.

8. The cutting insert according to claim 1, wherein
the insert main body is formed in the shape of 180° rotationally symmetrical with respect to the insert central line passing through the centers of the pair of polygonal faces and provided with at least the pair of side faces on which the cutting edge is formed, and
of the pair of side faces, when the cutting edge of one side face is used for cutting, a contact portion which is in contact with a contacted portion formed on a wall face of the insert seat is formed on the other side face.

9. The cutting insert according to claim 1, wherein
the insert main body is formed in the shape of rotationally symmetrical with respect to the insert central line passing through the centers of the pair of polygonal faces and provided with at least the two side faces on which the cutting edge is formed, and
of the side faces, when the cutting edge of one of the side faces is used for cutting, a contact portion in contact with a contacted portion formed on a wall face of the insert seat is formed on at least one side face of remaining side faces.

10. The cutting insert according to claim 8 or claim 9, wherein
a convex curved surface portion continuing to a flank face adjacent to the cutting edge and a recessed curved surface portion continuing to the convex curved surface portion are formed on the side face,
the convex curved surface portion is curved in the shape of a convex curved surface which is raised outside the insert main body,
the recessed curved surface portion is curved in the shape of a recessed curved surface which is recessed inside the insert main body,
the contact portion is formed on the convex curved surface portion, and
a curvature radius of the convex curved surface portion is kept constant in a direction at which the cutting edge extends.

11. An indexable insert-type cutting tool comprising:
a tool main body rotating around an axis; and
the cutting insert described in claim 1 which is attached in a detachable manner to an outer circumference of a tip portion of the tool main body, wherein
one or more of the insert seats to each of which the cutting insert is attached are formed on the tool main body, with the base facing in a tool rotating direction, and
the cutting insert is attached to the insert seat in such a manner that at least one of the side faces faces in an outer circumference direction of the tool main body, the first corner portion of a side ridge portion of the side face is arranged at the tip of the tool main body, the side ridge portion of the side face being a portion intersecting the side face and the polygonal face used as a rake face, the cutting edge formed at the side ridge portion is given a positive axial rake angle, and a side ridge portion of the side face in which the side face and the polygonal face used as a seating face intersect is arranged inside a rotational locus around the axis line of the cutting edge.

12. The indexable insert-type cutting tool according to claim 11, wherein
the cutting edge gradually inclines toward the opposite side of the polygonal face in the direction of the insert central line passing through the centers of the pair of polygonal faces while the cutting edge becoming close to the second corner portion of the polygonal face from the first corner portion thereof, when at least one of the side faces is viewed, and
the cutting insert is attached to the insert seat in such a manner that the insert central line inclines toward the rear end side of the tool main body while the insert central line becoming close to the polygonal face used as a seating face.

13. The cutting insert according to claim 1, wherein
the at least one of the side faces of which each of the pair of side ridge portions has the cutting edge includes: the pair of flank faces of the cutting edges; and a recessed curved surface portion provided between the pair of flank faces and extending along a direction in which cutting edges extend.

14. The cutting insert according to claim 13, wherein
a pair of convex curved surface portions are provided between the recessed curved portion and each of the pair of the flank faces, each of the convex curved surface portion being continuous to the flank face at an opposite side of the cutting edge and extending along the direction in which cutting edges extend.

15. The cutting insert according to claim 13, wherein
a curvature radius of the recessed curved surface portion is constant in the direction in which cutting edges extend.

16. The cutting insert according to claim 14, wherein
curvature radii of the recessed curved surface portion and the convex curved surface portion are individually constant in the direction in which cutting edges extend.

17. The cutting insert according to claim 13, wherein
the recessed curved surface portion extends from a first end to a second end of the cutting edges.

18. The cutting insert according to claim 14, wherein
the recessed curved surface portion and the convex curved surface portion extend from a first end to a second end of the cutting edges.

19. The cutting insert according to claim 1, wherein
one of the pair of side ridge portions of the side face on which the cutting edge is formed offsets from the other of the pair of side ridge portions by a rotated degree around an insert central line passing through the centers of the pair of polygonal faces in such a manner that the second corner portion of one side ridge portion protrudes outside the other side ridge portion.

20. The cutting insert according to claim 19, wherein
the rotated degree between the pair of side ridge portions on which the major cutting edge is formed is in a range of 1° to 10°.

* * * * *